(12) United States Patent
Sharp et al.

(10) Patent No.: US 6,273,571 B1
(45) Date of Patent: Aug. 14, 2001

(54) DISPLAY ARCHITECTURES USING AN ELECTRONICALLY CONTROLLED OPTICAL RETARDER STACK

(75) Inventors: Gary D. Sharp, Boulder; Kristina M. Johnson, Longmont, both of CO (US)

(73) Assignee: ColorLink, Inc., Boulder, CO (US)

( * ) Notice: Subject to any disclaimer, the term of this patent is extended or adjusted under 35 U.S.C. 154(b) by 0 days.

(21) Appl. No.: 09/410,098

(22) Filed: Oct. 1, 1999

Related U.S. Application Data

(63) Continuation-in-part of application No. 09/164,774, filed on Oct. 1, 1998, now abandoned, which is a continuation of application No. 09/085,971, filed on May 27, 1998, which is a continuation-in-part of application No. 08/853,461, filed on May 9, 1997, now Pat. No. 5,999,240, and a continuation-in-part of application No. 08/645,580, filed on May 14, 1996, now Pat. No. 5,822,021, which is a continuation-in-part of application No. 08/447,522, filed on May 23, 1995, now Pat. No. 5,751,384.

(51) Int. Cl.[7] .................................................. G03B 21/14
(52) U.S. Cl. .............................. 353/122; 353/84; 349/5; 348/742
(58) Field of Search ................................. 353/31, 34, 37, 353/122, 84, 20; 349/5, 18; 348/742

(56) References Cited

U.S. PATENT DOCUMENTS

| | | | |
|---|---|---|---|
| 2,493,200 | 1/1950 | Land | ........................ 88/112 |
| 4,003,081 | 1/1977 | Hilsum et al. | .................... 358/64 |
| 4,019,808 | 4/1977 | Scheffer | ..................... 350/160 LC |

(List continued on next page.)

FOREIGN PATENT DOCUMENTS

| | | |
|---|---|---|
| 56137307A | 10/1981 | (JP) . |
| 63182987A | 7/1988 | (JP) . |
| 03028823A | 2/1991 | (JP) . |
| 04207774A | 7/1992 | (JP) . |
| 7-84218 | 3/1995 | (JP) . |

OTHER PUBLICATIONS

Scheffer, T.J., "New multicolor liquid crystal displays that use a twisted nematic electro–optical cell," J., Appl. Phys. (1973) 44(11):4799–4803.

Carlsen, W.J. and Buhrer, C.F., "Flat Passband Birefringent Wavelength–Deivision Multiplexers," Electronics Letters (1987) 23(3):106–107.

(List continued on next page.)

*Primary Examiner*—William Dowling
(74) *Attorney, Agent, or Firm*—Fleshner & Kim, LLP

(57) ABSTRACT

A system architecture for a display system with electronically controlled optical retarder stacks. The system uses only one spatial light modulator and a color filter to determine what the color of the image created by the modulator will be when projected onto a display surface. In one embodiment, the color filter passes one of red, green or blue light at any give time. The color filter can be placed between the light source and the modulator optics, between the modulator optics and the modulator, between the modulator and the projection optics, or made part of the projection optics itself. The retarder stack for transforming at least partially polarized input light can include a first retarder and a second retarder. The first retarder has a first retardance and a first orientation and the second retarder has a second retardance and a second orientation, both orientations with respect to the partially polarized light. The first retardance, first orientation, second retardance, and second orientation can be arranged to yield the desired polarization transformed light which includes a first spectrum and a second spectrum. The polarization of the first spectrum and the polarization of the second spectrum can be made orthogonal to each other. The polarizations can be linear or elliptical. If the polarization transformed light is linear, the directions of polarizations are different and in one case can be made perpendicular. If the polarization of the polarization transformed light is elliptical, then the polarizations are different and in on case can be made orthogonal in the general sense of orthogonality of polarization states.

20 Claims, 41 Drawing Sheets

U.S. PATENT DOCUMENTS

| | | | |
|---|---|---|---|
| 4,025,164 | 5/1977 | Doriguzzi et al. | 350/160 LC |
| 4,232,948 | 11/1980 | Shanks | 350/347 |
| 4,367,924 | 1/1983 | Clark et al. | 350/334 |
| 4,416,514 | 11/1983 | Plummer | 350/335 |
| 4,448,823 | 5/1984 | Clifford | 428/1 |
| 4,497,543 | 2/1985 | Aoki et al. | 350/337 |
| 4,575,193 | 3/1986 | Grievenkamp, Jr. | 350/401 |
| 4,582,396 | 4/1986 | Bos et al. | 350/347 |
| 4,635,051 | 1/1987 | Bos et al. | 340/757 |
| 4,652,087 | 3/1987 | Bos et al. | 350/332 |
| 4,668,086 | 5/1987 | Redner | 356/33 |
| 4,758,818 | 7/1988 | Vatne | 340/701 |
| 4,759,612 | 7/1988 | Nakatsuka et al. | 350/337 |
| 4,770,500 | 9/1988 | Kalmanashi et al. | 350/347 E |
| 4,770,525 | 9/1988 | Umeda et al. | 353/122 |
| 4,796,978 | 1/1989 | Tanaka et al. | 350/337 |
| 4,834,508 | 5/1989 | Fergason | 350/339 F |
| 4,867,536 | 9/1989 | Pidsosny et al. | 350/337 |
| 4,917,464 | 4/1990 | Conner | 350/335 |
| 4,917,465 | 4/1990 | Conner et al. | 350/335 |
| 4,966,441 | 10/1990 | Conner | 350/335 |
| 5,032,007 | 7/1991 | Silverstein et al. | 350/335 |
| 5,033,825 | 7/1991 | Ishikawa et al. | 350/339 |
| 5,050,965 | 9/1991 | Conner et al. | 359/53 |
| 5,122,887 | 6/1992 | Mathewson | 349/97 |
| 5,126,864 | 6/1992 | Akiyama et al. | 359/53 |
| 5,179,459 | 1/1993 | Plesinger | 359/74 |
| 5,220,447 | 6/1993 | Yokokura et al. | 349/119 |
| 5,237,435 | 8/1993 | Kurematsu et al. | 359/41 |
| 5,243,455 | 9/1993 | Johnson et al. | 359/93 |
| 5,249,071 | 9/1993 | Yoshimizu et al. | 349/102 |
| 5,268,782 | 12/1993 | Wenz et al. | 359/81 |
| 5,299,039 | 3/1994 | Bohannon | 359/53 |
| 5,337,174 | 8/1994 | Wada et al. | 349/119 |
| 5,347,378 | 9/1994 | Handschy et al. | 359/53 |
| 5,369,513 | 11/1994 | Akatsuka et al. | 349/118 |
| 5,422,756 | 6/1995 | Weber | 359/487 |
| 5,469,279 | 11/1995 | Sharp et al. | 359/53 |
| 5,528,393 | 6/1996 | Sharp et al. | 359/53 |
| 5,559,634 | 9/1996 | Weber | 359/638 |
| 5,565,933 | 10/1996 | Reinsch | 348/742 |
| 5,574,580 | 11/1996 | Ansley | 359/41 |
| 5,585,950 | 12/1996 | Nishino et al. | 349/118 |
| 5,608,551 | 3/1997 | Biles et al. | 359/95 |
| 5,627,666 * | 5/1997 | sharp et al. | 349/74 |
| 5,658,490 | 8/1997 | Sharp et al. | |
| 5,686,931 | 11/1997 | Funfschilling et al. | 345/88 |
| 5,689,317 | 11/1997 | Miller | 349/97 |
| 5,739,881 | 4/1998 | Xu et al. | 349/118 |
| 5,751,384 | 5/1998 | Sharp | 349/18 |
| 5,774,264 | 6/1998 | Konno et al. | 359/497 |
| 5,777,709 | 7/1998 | Xu | 349/120 |
| 5,822,021 * | 10/1998 | Johnson et al. | 349/18 |
| 5,999,240 * | 12/1999 | Sharp et al. | 349/119 |

OTHER PUBLICATIONS

Wright, H., et al., "Active filters enable color imaging," Laser Focus World (May 1996) 85–90.

Cambridge Research & Instrumentation, Inc., "Liquid Crystal Tunable Filter," Cambridge, MA, 2 pages.

Displaytech, Inc. (Jan., 1996), "Switchable Color Filter", Boulder, CO, 4 pages.

Title, A.M. and Rosenberg, W.J., "Turnable birefringent filters," Opt. Eng., (1981) 20(6):815–823.

Solc, Ivan, "Birefringent Chain Filters, " J. Opt. Soc. Am. (1965) 55(6):621–625.

Wu, Shin–Tson, "Birefringence dispersions of liquid crystals," Physical Review A, (1986) 33(2):1270–1274.

Harris, S.E., et al., "Optical Network Synthesis Using Birefingent Crystals, I. Synthesis of Lossless Networks of Equal– Length Crystals," J. Opt. Soc. America (1964) 54(10):1267–1279.

Amman, E.O., "Optical Network Synthesis Using Birefringent Crystals, III., Some General Properties of Lossless Birefringent Networks," J. Opt. Soc. America (1966) 56(7):943–951.

Amman, E.O. and Yarborough, J.M., "Optical Network Synthesis Using Birefringent Crystals V. Synthesis of Lossless Networks Containing Equal–Length Crystals and Compensators," J. Opt. Soc. America (1966) 56(12):1746–1754.

Sharp, G.D., et al., "P–60: Color Switching Using Ferroelectric Liquid Crystals, "Society for Information Display, International Symposium, Digest of Technical Papers, vol. XXIV, Seattle, Washington, May 18–20, 1993.

Kondo, et.al., "Ferroelectric Liquid Crystal Materials Applied to Guest–Host Type Displays," Ferroelectrics (1988) 85:361–373.

Billings, BH., "A Tunable Narrow–Band Optical Filter," J. Opt. Soc. America (1947) 37:738–746.

John Wiley & Sons, "Optical Waves In Layered Media," Pochi Yeh, A. Wiley–Inetrscience Publication (1988).

Pezzaniti, J.L. and Chipman, R.A., "Phase–only modulation of a twisted nematic liquid crystal TV by use of the eigenpolarization states," Optics Letters, vol. 18, No. 18 (1993), pp. 1567–2569.

Shannon, P.J., et al., Patterned Optical Properties in Photo-Polymerized Surface–Aligned Liquid–Crystal Films, Nature (1994). vol. 368, pp. 532–533.

Schadt, Martin, et al., Photo–Generation of Linearyl Polymerized Liquid Crystal Aligned Layers Comprising Novel, Integrated Optically Patterned Retarders and Color Filters, Jpn., J. Appl., Phys. (1995), vol. 34, pp. 3240–3249.

Sharp, Gary Dean, "Chiral smectic liquid crystal tunable optical filters and modulators", 1992.

* cited by examiner

DISPLAY ARCHITECTURES USING AN ELECTRONICALLY CONTROLLED OPTICAL RETARDER STACK

This application is a continuation-in-part of U.S. Ser. No. 09/164,774, filed Oct. 1, 1998, now abandoned, which is a continuation of U.S. Ser. No. 09/085,971, filed May 27, 1998, the contents of which are incorporated herein by reference in their entirety.

This application is also a continuation-in-part of U.S. Ser. No. 08/853,461, filed May 9, 1997, now U.S. Pat. No. 5,999,240 which is a continuation-in-part of U.S. Ser. No. 08/447,522, filed May 23, 1995 (U.S. Pat. No. 5,751,384), and Ser. No. 08/645,580, filed May 14, 1996 (U.S. Pat. No. 5,822,021), the contents of which are incorporated herein by reference in their entirety.

BACKGROUND OF THE INVENTION

1. Field of the Invention

This invention relates to display system architectures using a device for selectively transforming partially polarized light, more particularly to a retarder stack for transforming at least partially polarized light for input into various optical devices such as electro-optic modulators, magneto-optic modulators or other optical components.

2. Background of the Related Art

Display systems create color in a number of different ways. In a typical cathode ray tube system, the colors are a result of phosphors being excited by an electron gun, causing them to become luminous. The choice of material from which the phosphor is made helps determine which color is viewed when the phosphor is activated. Additionally, they can have more than one gun, where the nature of the electron beam is changed to form a certain color.

Systems that do not use cathode ray tubes, such as spatial light modulator based systems, use other methods. Spatial light modulator based systems include liquid crystal device (LCD) systems, digital micromirror device (DMD) systems, and grating light valve systems, among others. These systems typically project an image from an array of individual elements, each corresponding to a picture element (pixel) dot on the displayed image.

One method in which they create color images is by having one array for each color, typically red, green and blue. The red image is created by activating the appropriate elements on the array to project an image of red (ON elements) and dark or black spots (OFF elements), at the display surface, while doing the same for green and blue. The three images are projected and converged into one image on the display surface, creating the colored image. The mix of red, green and blue to achieve the right colors is achieved by controlling the amount of time each color is ON for each pixel.

Another method is to use one array and have some type of filtering of the source light from which the image is created. This has the advantage over the three device system in that it requires fewer components and is therefore cheaper and can be made more compact. The typical method illuminates the array in a color sequence, relying upon the human eye to integrate the colors into the proper mix, as in the three device system. Each image for each color is projected to the display surface in the same place as the other colors' images, allowing for the same integration effects as in the three device systems.

However, the color filter can be problematic. A typical solution is to use a color wheel divided into thirds, one for each color, and to place it between the light source and the array. As the color wheel spins, each color illuminates the array while the data for that color is being displayed.

This sequence is fixed and cannot be changed easily if events such as channel changes occur, requiring extra processing and adjustments to allow the system to continue to function. The transitions between the colors in sequence require the light to be turned off while the color changes. The amount of time the light is off depends upon the size of the wheel and the rate at which it rotates. This time can even be longer than the amount of time it takes to load data into the array, reducing the system efficiency.

Additionally, color wheels require motors and a controller to operate and with their own bulk contribute to the size and weight of the display system, as well as the cost. Therefore, a solution is needed that provides color sequential systems with a means for filtering light that is smaller, lighter and faster than the present solutions.

The manipulation or transformation of polarized or partially polarized light is essential in a wide variety of optical systems. Especially with the onset of integrated optics and the processing of optical signals, it is necessary to predictably manipulate the polarization of light before that light proceeds to the next stage in an optical system.

Many optical systems require input light be completely or nearly completely polarized and have a known bandwidth and polarization such as input light from lasers or light emitting diodes (LEDs). It is important, however, to be able to selectively transform portions of relatively wide bandwidth light for eventual use in optical systems. For example, it is desirable to be able to selectively shift a certain band of frequencies within a wide band of frequencies comprising white light.

Color display and color filters are examples of optical systems which utilize wide bandwidth light such as white light to function.

Color Displays

Color display is generally provided by spatial or temporal multiplexing of the additive primary colors, red, green and blue. In a spatial multiplexed display, each color pixel is divided into three subpixels, one for each primary color. Ideally the pixels are small enough compared to the viewing distance from the eye that the colors are spatially integrated into a single full-color image. As a result of subdividing each pixel, the spatial resolution of the display is reduced by a factor of at least three. In temporal multiplexing, colors are sequentially switched between the three primary colors, and if the switching rate is fast enough the eye temporally integrates the three images to form a single full-color image. In both cases, the color filter is typically combined in series with a binary or display capable of generating a gray scale which is spatially aligned and temporally synchronized with the color filter to modulate the intensity of each color. To display white with spatial multiplexing, all three subpixels simultaneously transmit a primary; with temporal multiplexing the three primaries are sequentially transmitted. In either case, at best only one third of the input intensity can be displayed.

In subtractive display, color is produced by stacking three monochrome displays (for example Plummer, U.S. Pat. No. 4,416,514 and Conner et al., U.S. Pat. No. 5,124,818). Polarization components are placed between each display panel, such that each panel ideally independently controls the transmission of an additive primary color. Subtractive displays have the advantage that every pixel is a three-color pixel and that the display does not, in principle, suffer the throughput loss associated with spatial or temporal multiplexing. However, previous implementations generally could not completely independently modulate each color. Additionally, they utilized pleochroic dye polarizers as the only color selective polarization components between each display panel. Due to the poor performance of pleochroic dye polarizers, including poor color contrast, high insertion loss and shallow transition slopes, the benefits of subtractive displays have not before been realized.

Color Filters

There are two basic classes of liquid crystal color switching filters: polarization interferences filters (PIFs) and switched-polarizer-filters (SPFs). The basic unit of an SPF is a stage, consisting of a color polarizer and a two-state neutral polarization switch. This class is intrinsically binary tunable, such that each filter stage permits switching between two colors. Stages are cascaded in order to provide additional output colors. Color polarizers used in SPFs include single retardation films on neutral linear polarizers and pleochroic color polarizing filters. The polarization switch can be a liquid crystal (LC) polarization switch preceding a static polarization analyzer. The switch optimally provides neutral polarization switching. The chromatic nature of the active element degrades performance and is ideally suppressed in an SPF.

Shutters based on color polarizer consisting of a neutral-polarizer followed by a single retarder are well reported in the art (for example in U.S. Pat. No. 4,002,081 to Hilsum, U.S. Pat. No. 4,091,808 to Scheffer and U.S. Pat. No. 4,232,948 to Shanks). While the polarizer/retarder structure can be described as a complementary color polarizer in the sense that it is possible to produce two distinct hues by rotating the polarizer through 90 degrees, using this type of color polarizer in an SPF does not result in saturated colors.

Shutters based on pleochroic color polarizers are also well reported (for example in U.S. Pat. No. 4,582,396 to Bos, U.S. Pat. No. 4,416,514 to Plummer, U.S. Pat. No. 4,758,818 to Vatne and U.S. Pat. No. 5,347,378 to Handschy). Pleochroic color polarizers are films that function as linear polarizers in specific wavelength bands. They are formed by doping a polymer with long-chain pleochroic dyes. Incident white light polarized along one axis is fully transmitted, but is selectively absorbed along the orthogonal axis. For instance, a cyan color polarizer functions as a linear polarizer by absorbing the red along one axis. A color polarizer that passes a primary color (either additive or subtractive) along each axis can be formed as a composite consisting of two films with crossed axes. Colors are typically selected using crossed complementary color (e.g. red/cyan) polarizer films coupled with a switchable polarizer. A full-color device can comprise five polarizing films (one neutral), and two switching means. The resulting structures provide poor overall peak transmission.

Polarization Interference Filters

The simplest PIFs are essentially two-bean interferometers, where a uniaxial material induces a phase shift between orthogonally polarized field components. Color is generated by interfering these components with an analyzing polarizer. Color switching is accomplished by changing the phase shift between the arms. The most rudimentary color switches comprise a single variable retarding means between neutral polarizers. Single stage devices can also incorporate passive bias retarders with variable birefringence devices. However, these single stage PIFs are incapable of providing saturated color.

PIFs often comprise cascaded filter units in a Lyot structure, each performing a distinct filtering operation to achieve improved selectivity. A polarization analyzer is required between each phase retarder, reducing transmission. Though adequate color saturation is obtained, multiple-stage birefringent filters are by definition incapable of functioning as color polarizer. This is quite simply because color polarizers must transmit both orthogonal polarizations, which does not permit internal polarizers.

Tuning is accomplished by varying the retardance of active elements in each stage, maintaining specific relationships between retardances, in order to shift the pass-band. PIFs use LC elements as variable retarders in order to shift the transmission spectrum. As such, in contrast to SPF, the chromaticity of the active element retardance is not only acceptable, it is often an integral aspect of the design. In PIF designs, an analyzing polarizer is a static component and tuning is accomplished by changing the retardance of the filter elements. When multiple active stages are used, the retardances are typically changed in unison to shift the pass-band, while maintaining the basic design. Variable birefringence PIFs can be tuned to provide peak transmission at any wavelength. By contrast, SPFs do not provide tunable color.

Šolc filters (Šolc (1965),J. Opt. Soc. Am. 55:621) provides high finesse spectra using a cascade of identical phase retarders, with complete elimination of internal polarizers.

The Šolc filter is a specific example of a much broader class of filters. In this generalization, Harris et al. (Harris et al. 1964),J. Opt. Soc. Am 54:1267) showed that any finite impulse response (FIR) filter transmission function can in principle be generated using a stack of properly oriented identical retardation plates. Numerous researchers have used the network synthesis technique, along with standard signal processing methods, to generate FIR filter designs. These designs have focused on high resolution as opposed to broad pass-bands. Tunability, when mentioned, requires that all retardances are varied in unison.

The above references are incorporated by reference herein where appropriate for appropriate teachings of additional or alternative details, features and/or technical background.

SUMMARY OF THE INVENTION

One aspect of the invention is a display system architecture using electronically controlled color filters. The filters can be placed in several positions within the display system. These positions include between the illumination optics and the spatial light modulator's optics, between the spatial light modulator's optics and the spatial light modulator, and between the spatial light modulator and the projection optics. The architecture can be adjusted to allow use of more than one modulator.

Another aspect of the invention is a method for using pi-cells to create the proper mix of color, depending upon the architecture of the system. The method includes polarizing colors with different horizontal or vertical polarities, such that different mixes of light are achieved by energizing the pi-cell or leaving it unenergized.

It is an advantage of the invention that the filters are small and have no extra hardware.

It is a further advantage of the invention that the filters are programmable, allowing the sequencer to be changed as necessary.

It is a further advantage of the invention that the filters can change state quickly, increasing the efficiency of the system.

The present invention relates more specifically to display systems having a retarder stack which transforms at least partially polarized light. The retarder stack includes a first retarder having a first retardance and a first orientation with respect to the partially polarized light and a second retarder which has a second retardance and a second orientation with respect to that partially polarized light. The first retarder and second retarder are oriented and have first and second retardances which produce polarization transformed light. In one approach, the at least partially polarized light includes a first spectrum and a second spectrum and the first retarder and second retarder are arranged so that the polarizations of the first spectrum and the second spectrum are not equal. In another orientation, the first retarder and second retarder are arranged with respect to the at least partially polarized light to output a first spectrum and a second spectrum which are complements of each other. In yet another approach, the first retarder and second retarder are arranged and selected to yield a first spectrum and a second spectrum of polarized light which are orthogonal to each other. A particular implementation of this involves a case in which the polarizations of the first and second spectrum are linear and perpendicular to each other. Alternatively, the first and second spectrum can elliptically polarized and still orthogonal to each other in the general sense of orthogonality of polarization states. The light can be visible and/or non visible light.

In other embodiments, one retarder stack can be used instead of two retarder stacks.

The retarders can be polymer retarders, liquid crystal polymer retarders, or made of a polymer birefringent material. Additionally, either retarder can be a birefringent crystal such as calcite, quartz, or $LiNbO_3$, or a liquid crystal.

The first and second retardances can be approximately equal or different. If the input light is not even partially polarized, i.e., if the input light is uniformly unpolarized, then a polarizer can be used to provide at least partially polarized light for inputting into the first and second retarders.

The present invention can be used with a color selective polarization modulator and a high brightness color filter or display system. Color separation is accomplished with nearly lossless retarder films, providing high color contrast between transmission and extinction, with steep transition slopes. Each filter stage is a color selective light valve which varies the transmission (or reflection) of one color without modulating the complementary color. A stage can switch between transmitting white (or black) and transmitting a filtered spectrum. Two or more stages can be used in series, each stage independently controlling the transmission of a primary color. In a preferred embodiment each stage can control the analog intensity control of the primary color at each pixel, thus eliminating the need for an external gray-scale pixilated display. One preferred embodiment eliminates internal polarizers between stages, thereby providing a full-color display with only an input polarizing means and an output polarizing means.

The color selective polarization modulator can be for example an electro-optic or magneto-optic modulator having a modulation state of polarization and an isotropic state of polarization, and a retarder stack comprising one or more retarders. The modulation state of polarization is an input polarization for which the transmitted state of polarization depends on the voltage applied to the modulator. The isotropic state of polarization is an input polarization for which the transmitted state of polarization is substantially independent of the voltage applied to the modulator. The retarder stack chromatically preconditions the light such that a first spectrum is placed in the modulation state of the modulator and a second, complementary, spectrum is placed in the isotropic state. The modulator thereby modulates the state of polarization of the first spectrum, but leaves the polarization of the complementary spectrum substantially unmodulated. In a preferred embodiment the spectra are additive and subtractive primary spectra.

A filter is formed by combining the color selective polarization modulator with a polarization analyzer. The polarization analyzer can be a second retarder stack in combination with a neutral polarizer, or it can be a color selective polarizer such as a linear or circular colored polarizing filter, examples of which are pleochroic dye polarizers, and cholesteric liquid crystals, and cholesteric liquid crystal polymers, respectively.

For the case where the polarization analyzer is a second retarder stack in combination with a neutral polarizer, the second retarder stack echoes the first retarder stack, having the same sequence of retardances but in reverse order. The orientation of the second stack is also rotated with respect to the first stack. As a result, in one switching state of the modulator the second stack appears to be crossed with the first stack, undoing the polarization transformation caused by the first stack and, for parallel input and output polarizing means, transmitting white light. For crossed polarizers, the transmission is black. In a second switching state the two stacks are seen as a unit in which the second retarder stack completes the transformation started by the first stack and orthogonally polarizes the first and second spectra. In this state the filter transmits a filtered spectrum.

In the two-stack filter, the polarizers and stacks can be oriented so that the filter is either normally white, i.e. white in the absence of the modulator, or normally filtered. In the former, the action of the modulator is to produce a filtered output, while the latter uses the modulator to generate the white state. In either case, the voltage applied to the modulator controls the "presence" of the compound stack, i.e. the extent to which the two stacks cooperate rather than canceling. If the modulator is capable of analog modulation, the voltage controlled presence of the compound stack is also analog. Analog control of the voltage produces variable throughput of the filtered spectrum.

Each retarder stack has one or more retarders. In order for two stacks to cancel one another in one switching state, if the first stack of retarders have retardances $\Gamma_1, \Gamma_2 \ldots \Gamma_n$ and orientations $\alpha_1, \alpha_2 \ldots \alpha_N$, then the second retarder stack has retardances $\Gamma_N \ldots \Gamma_2, \Gamma_1$ and orientations $90\pm\alpha_N \ldots 90\pm\alpha_2, 90\pm\alpha_1$. For parallel polarizers the filter is normally white when the second stack retarders are oriented at $90+\alpha_N$, and it is normally filtered when the second stack retarders are oriented at $90-\alpha_N$.

Suitable two-stack designs can be generated by choosing the number of retarders N, stepping through a range of values for $\Gamma_N$ and $\alpha_N$, applying the above rules of retarder orientation to define the second stack, calculating the transmission of the filtered spectrum, and selecting filter designs that produce the desired spectra, typically additive or subtractive primary spectra. Alternatively, certain classes of filter designs can be employed which lend themselves to the white/filtered structure. In particular fan and folded Šolc filters can be adapted to fit the orientation requirements, as can split-element filters.

In addition to the retarder stacks, additional polarization transforming elements can be included between the input and exit polarizers, for example to resolve compatibility issues between the polarizers and the type of modulator. For polarized light sources, no input polarizer is required. In embodiments having no internal polarizers, the filters can be operated in polarization diversity configurations having polarization separators/combiners for the input and exit polarizers. The filters can also employ reflection-mode designs.

Hybrid filters can be made using the filter of this invention in combination with other active or passive filters. The color filter of this invention can be combined with passive filters, such as retarder based notch filters and dichroic filters for blocking UV, IR or other bands of light. It can be used with other active filters, such as polarization interference filters and switched polarizer filters.

The spectral filters of this invention are particularly useful in the visible spectrum as color filters. They can also be fabricated for use in other wavelength bands for spectroscopy, spectrometry night vision filtering, or wavelength division multiplexing applications. The color filters of this invention can be used in many applications, particularly in the areas of recording and displaying color images. They can be arranged in a multi pixel array, can be spatially or temporally multiplexed, and can be optically addressed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 7, comprising

FIG. 22, comprising

FIG. 23, comprising

FIG. 25, comprising

FIG. 30, comprising

FIG. 31, comprising

FIG. 32, comprising

FIG. 35, comprising

DETAILED DESCRIPTION OF PREFERRED EMBODIMENTS

Spatial light modulators create color by overlaying single color images at the display surface such that corresponding pixels of each color are projected to the same spot. This technique relies upon the integration abilities of the human eye to resolve these separate color images into one color. The blend of color is determined by the amount of time each color is projected for any given pixel.

In systems using less than three modulators, the colors must be sequenced on one of the devices. With three modulators, it is possible to have one color for each device, and the use of color filters would then be inefficient and unnecessary. However, color filters or some other method of using one device for at least two colors will be necessary in either one device or two device systems.

Figure 1A:
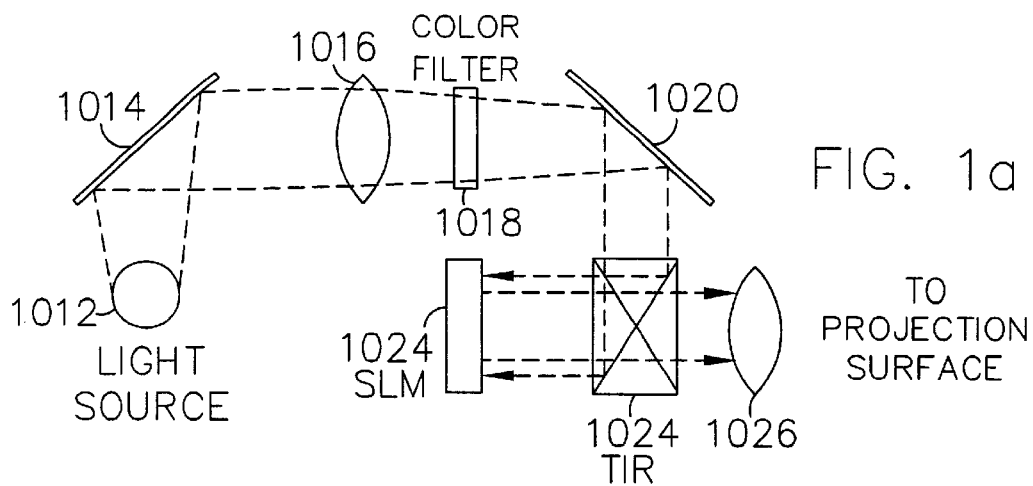
FIGS. 1a–1c show embodiments of a one reflective modulator system using electronically controlled color filters.

One example of an architecture using color filters with one device is shown in FIG. 1a. The light source 1012 is used to illuminate a spatial light modulator 1024, which creates the image to be sent to the display surface. Note that this architecture assumes a reflective modulator, but could be used in a transmissive modulator system as well. The architecture would have to be changed by moving the projection lens 1026 to the other side of the modulator 1024, and using a different optical component than the TIR prism shown at 1022.

In the following examples, the light path is shown as folded using a first fold mirror 1014, and a second fold mirror 1020. Additionally, it uses TIR prism 1022 to transmit the light to the modulator 1024 and from the modulator 1024 to the projection lens 1026. These are not necessary components in these exact configurations. However, one of the advantages of this invention is that it makes the optical system smaller and more compact.

The use of a TIR prism, such as that shown as 1022 in FIG. 1a is also an optional design choice. For purposes of discussion the TIR prism will be referred to as modulator optics, since it passes light to the spatial light modulator. The projection lens 1026 will represent the projection optics, and the light source 1012, the fold mirror 1014 and the lens 1016 will be referred to as the illumination optics.

Figure 1B:
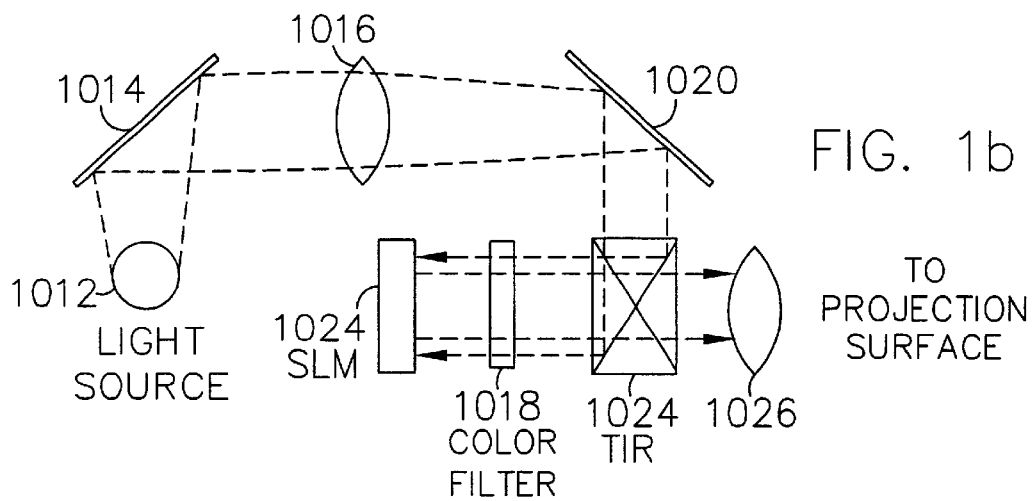
Figure 1C:
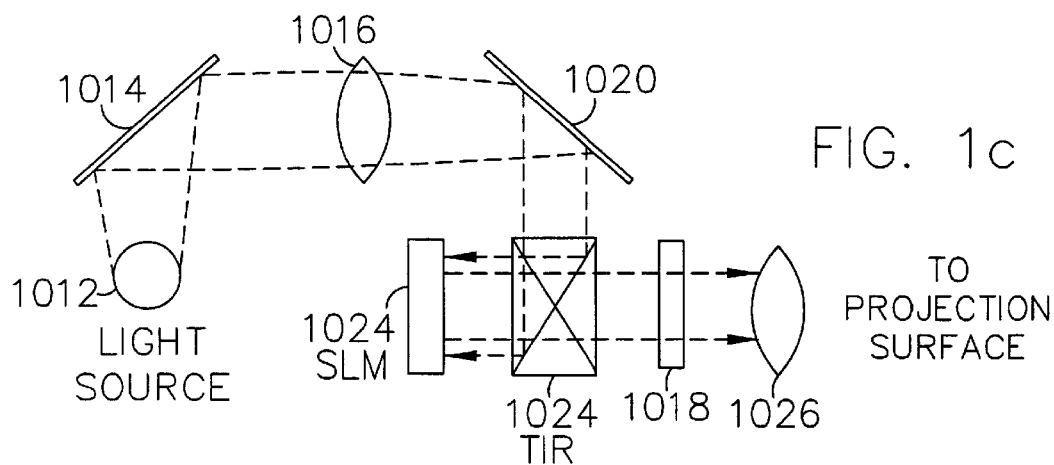

The color filter 1018 can be placed between the illumination optics and the modulator optics as shown in FIG. 1a. Additionally, it can be placed between the modulator optics and the spatial light modulator as shown in FIG. 1b. It can also be placed between the spatial light modulator and the projection optics as shown in FIG. 1c. Each of these positions have different considerations.

Placing the filter 1018 in the illumination path prior to the modulator optics as in FIG. 1a has the advantage of not adding additional path length between the projection lens 1026 and the modulator 1024 and not having the filter structure in the imaging path. The embodiment in FIG. 1b places the filter 1018 just in front of the modulator 1024. This has the advantage of requiring a color filter only slightly larger than the modulator. However, the light would have to pass through the structure twice, possibly reducing the transmission efficiency. The embodiment in FIG. 1c, where the filter 1018 is just before the projections optics 1026, has the advantage of producing the lowest optical power density incident on the color filter and the simplest illumination configuration.

Figure 2A:
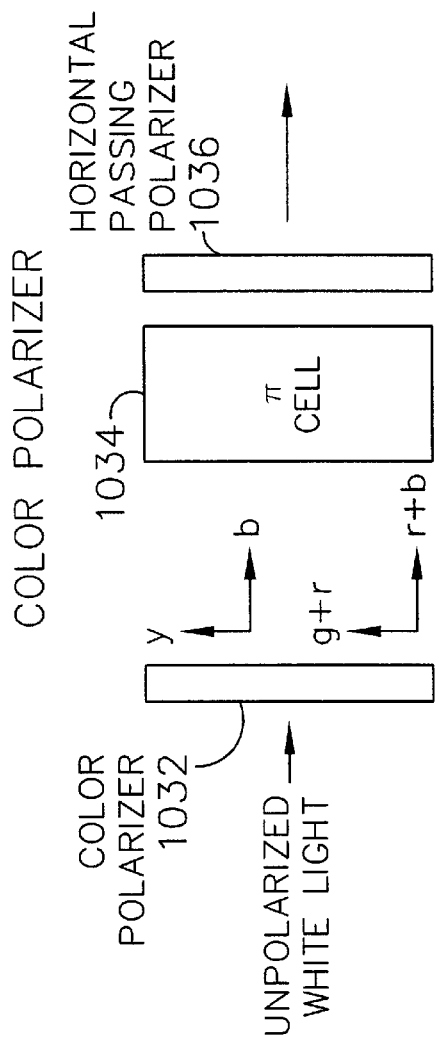
FIGS. 2a and 2b show embodiments of a color filter that can be used in display systems having less than one modulator per color.
Figure 2B:
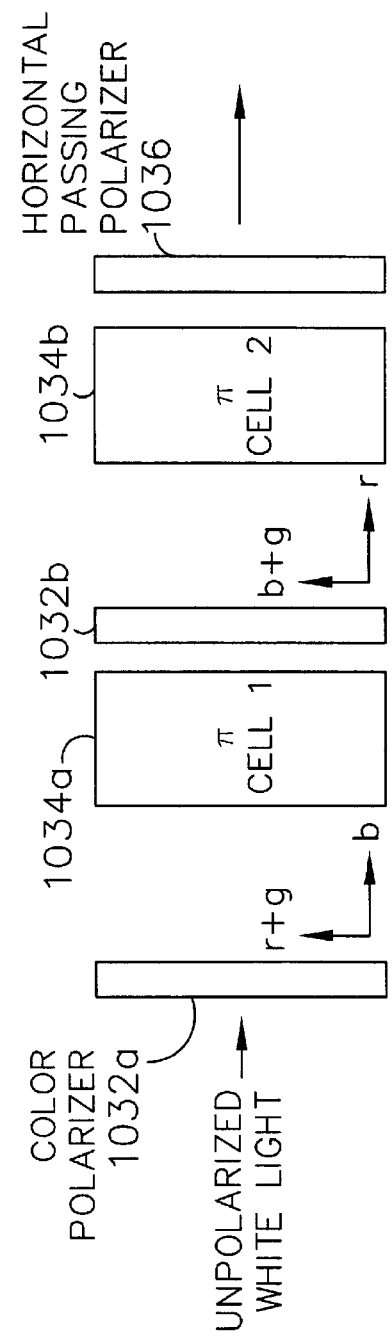

Examples of pi-cells that could be used in these system architectures are shown in FIGS. 2a and 2b. In FIG. 2a there are several possible configurations of the filter. In a first configuration, unfiltered light enters the filter as shown by the arrow and encounters color polarizer 1032. In this configuration, the filter 1032 passes only the horizontal polarization of blue light and only the vertical polarization of yellow light. If the pi-cell 1034 is not energized, this light distribution passes through the cell and then through a horizontal passing polarizer. The resulting transmitted light is only blue. If the cell 1034 is energized, the light polarization is rotated and the yellow light becomes horizontally polarized, which allows it to pass through the polarizer 1036, resulting in yellow light out of the filter. In summary, if the pi-cell 1036 is off, blue is output, if it is on, yellow is output.

In a second possible configuration, the first filter 1032 passes both polarizations of red light while passing only the vertical polarization of green light and the horizontal polarization of blue light. When the pi-cell 1034 is off, the final horizontal polarizer 1036 will pass red and blue, resulting in magenta. If the pi-cell 1034 is on, the polarizations rotate and the horizontal polarizer passes red and green, resulting in yellow. In summary, if the cell is on, magenta is output, if it is off, yellow is output.

A red, green and blue structure is shown in FIG. 2b. The structure is more complex having two color polarizers 1032a and 1032b, two pi-cells 1034a and 1034b, and one horizontal passing polarizer 1036. The first color polarizer, 1032a, passes the vertical polarization of yellow light (red and green) and the horizontal polarization of blue light. After the light passes through the first pi-cell 1034a, the second color polarizer passes vertically polarized cyan light (blue and green) and horizontally polarized red light. The light then passes through the second pi-cell, 1034b, and then through the horizontal polarizer 1036. The table below summarizes and indicates the color of the transmitted light, remembering that the final polarizer passes only horizontal light. With both cells unenergized, no light passes through the filter structure. Note that in the table, the passed light from each polarizer has to match to produce a color.

| Polarizer 1 Passes | | Polarizer 2 Passes | | |
| --- | --- | --- | --- | --- |
| state | horizontal | state | horizontal | Result |
| OFF | BLUE | OFF | RED | NONE |
| ON | RED + GREEN | OFF | RED | RED |
| OFF | BLUE | ON | BLUE + GREEN | BLUE |
| ON | RED + GREEN | ON | BLUE + GREEN | GREEN |

These types of electronic filters are merely examples of those that could be used in the system architectures discussed above. Typically, the filter shown in FIG. 2b which is a red/green/blue filter, will be used with a one device system. One device systems require all three colors on the one device, so the blue/yellow or yellow/magenta configurations of the filters discussed relative to FIG. 2a will not be helpful.

Figure 3A:
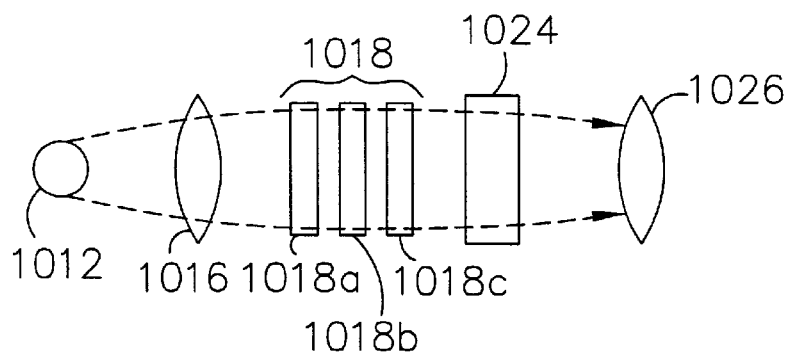
FIGS. 3a–3c show embodiments of a one transmissive modulator system using electronically controlled color filters.
Figure 3B:
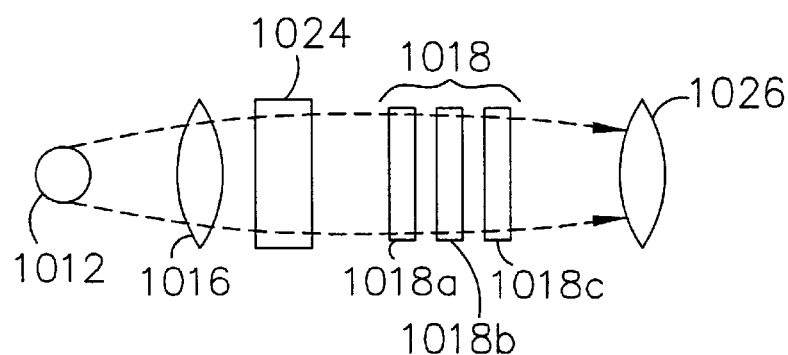
Figure 3C:
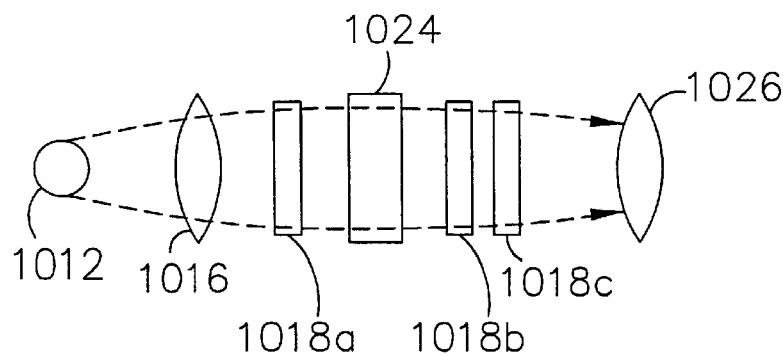

FIGS. 3a–3c show three examples of systems of the invention using transmissive spatial light modulators. FIG. 3a shows the spatial light modulator 1024 located optically between the electronically controlled spectral sequencer (color filter) 1018 and the projection lens 1026. The spectral sequencer 1018 is shown in FIGS. 3a–3c as having three sequencing units 1018a, 1018b and 1018c. In preferred embodiments, each of the sequencing units comprises an electronically controllable single pixel modulator between two retarder stacks, as described more completely below.

FIG. 3b shows a system similar to that shown in FIG. 3a except that, in FIG. 3b, the spatial light modulator 1024 is located optically between the lens 1016 and the spectral sequencer 1018.

FIG. 3c shows a system similar to those of FIGS. 3a and 3b, except that, in FIG. 3c, the spatial light modulator 1024 is located optically between sequencing units 1018a and 1018b. It is noted that the spatial light modulator can alternatively be located between sequencing units 1018b and 1018c. It is also noted that, although FIGS. 3a–3c do not show the use of mirrors, mirrors or other devices can be used to change the physical relationship of the elements of the systems.

Any of the above embodiments can be used to create a spatial light modulator based display using sequential color that is more compact, lighter and uses fewer components. Additionally, the elimination of the color wheel allows the system to operate more efficiently.

Using a color filter such as a pi-cell, the switching time of the filter is in the range of 50 microseconds. Spatial light modulators normally take longer than that to load their data, so the modulator does not have to wait for the filter to switch. Additionally, the filters can be switched in random sequence making the system more flexible and can help reduction of artifacts. Finally, the sequence could be adjusted, providing the ability to balance the color of the final image.

Thus, although there has been described to this point a particular embodiment for a projection display architecture, it is not intended that such specific references be considered as limitations upon the scope of this invention.

Figure 4A:
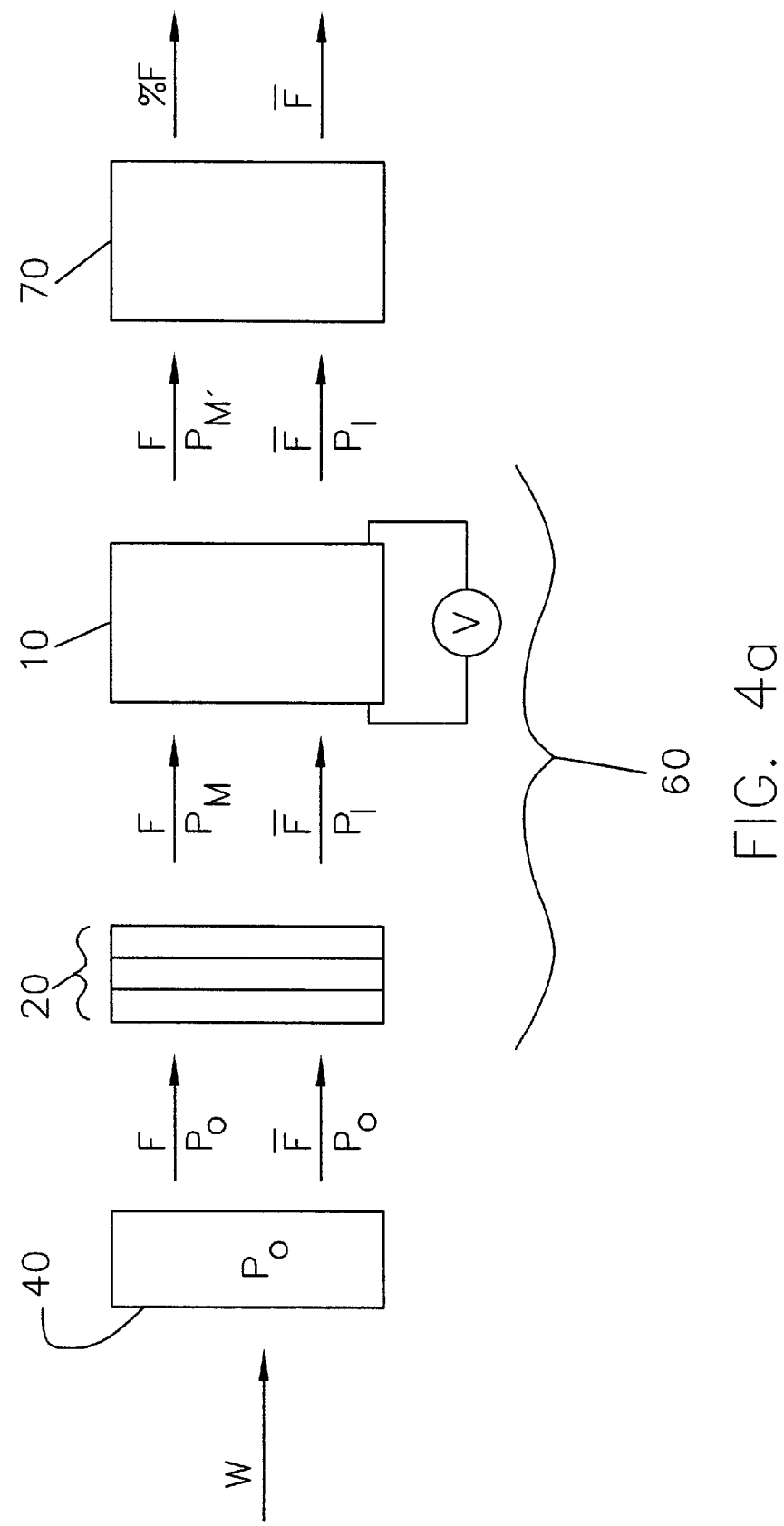
FIG. 4a, shows a filter using a color selective polarization modulator in combination with a polarization analyzer.

The one color selective polarization modulator used in some embodiments of this invention is illustrated in FIG. 4a. Polarization modulator 60 is formed by modulator 10 in combination with retarder stack 20. The polarization modulator uses polarized input light, in this case polarization $P_o$ is provided by polarizer 40. The polarization modulator can be combined with polarization analyzer 70 to form a filter.

As shown in FIG. 4a, incident white light can be considered to be the combination of light with spectrum F and light with the complementary spectrum $\overline{F}$. Retarder stack 20 transforms the polarization of light in spectrum F into the modulation state of polarization, $P_M$, of modulator 10, and transforms light in spectrum $\overline{F}$ into the isotropic state of polarization, $P_I$. For one of the spectra the transformation can be an identity transformation, i.e. the polarization can be unchanged. Light of polarization $P_I$ is transmitted by modulator 10 with a polarization which does not vary with the voltage applied. Light with polarization $P_M$ is modulated as a function of the applied voltage into polarization $P_{M'}$. In this way the polarization of one portion of the input light is modulated and the rest is not.

The modulator is a device which controls the state of polarization of transmitted light with the application of a voltage. The modulator has both a modulation state of polarization and an isotropic state of polarization, i.e. there is a state of polarization of input light for which the transmitted state of polarization depends on the voltage applied to the modulator, and a state of polarization for which it is substantially independent thereof. For the isotropic state typically the polarization is unchanged, but it some systems the polarization can have a voltage-independent transformation such as 90° rotation of linear light or handedness reversal of circular light. The terms polarization and state of polarization are used interchangeably.

One class of suitable modulators is the electro-optic variable retarder having fixed orientation and voltage controlled retardance. The isotropic states of polarization are parallel and perpendicular to the plane of the optic axis. In this case they are the Eigen modes, or ordinary and extraordinary waves, of the retarder. There is a voltage controlled phase shift between the ordinary and extraordinary polarizations. This does not affect the transmitted polarization in either of the isotropic states. However, the transmitted polarization is changed when the input light has projections in both isotropic states. The preferred modulation state is the linear polarization that bisects the two isotropic polarizations. It has maximum modulation depth because the projections along the two isotropic states have equal amplitude. Electro-optic modulators including $LiNbO_3$, quartz, and liquid crystals such as, zero-twist nematics, including homogeneously aligned electrically controlled birefringence (ECB), homeotropically aligned optically controlled birefringence (OCB), hybrid aligned nematic (HAN), and pi-cell/surface mode nematics, are one of the preferred embodiments of this group of electro-optic modulators.

Optically active devices are another group of suitable electro-optic modulators. Optically active devices are polarization rotators, with the rotation being independent of the orientation of the polarization of the incident light. The isotropic states are left and right handed circular polarizations. The modulator performs voltage controlled phase shifting of the circular polarizations, which does not affect the circular state of polarization. However, for linear states, which can be decomposed into equal amplitudes of the circular polarizations, the transmitted polarization is linear and the orientation is determined by the phase shift between the circular states. Thus optically active modulators act as polarization rotators for linear states, and the modulation state of polarization is any linear state.

Chiral Smectic Liquid Crystal (CSLC) retarders reflect polarization through an axis rather than rotating polarization, but they are like optically active devices in their isotropic and modulation states of polarization. In contrast to zero-twist nematics, CSLCs are rotatable retarders having fixed retardance and optic axis orientation determined by the applied voltage. For a half-wave retardance, CSLCs have circular isotropic states and linear modulation states. The voltage controlled orientation of the optic axis of the CSLC determines the transmitted orientation of linear light.

There are also electro-optic modulators that have intermediate modulation and isotropic states, such as twisted nematic devices. It has been shown that a twisted nematic device is an elliptical retarder with elliptical Eigenpolarization states. Like the linear retarder, the phase shift is substantially determined by one particular helicity of polarization state. (J. L. Pezzaniti and R. A. Chipman, (1993), "Phase-only modulation of a twisted nematic liquid-crystal TV by use of the eigenpolarization states," Opt. Lett. 18, 1567–1569.)

Suitable nematic liquid crystal cells for use in the electro-optic modulator include twisted nematic (TN), super twist nematic (STN), electrically controlled birefringence, hybrid field effect, pi-cell and surface mode, zero-twist mode, hybrid aligned nematic liquid crystal retarders. Suitable smectic liquid crystal cells include chiral smectic, ferroelectric, SmC*, surface stabilized SmC*, volume stabilized SmC*, binary SmC*, analog SmC*, SmA*, electroclinic, distorted helix ferroelectric, anti-ferroelectric, flexoelectric, and achiral ferroelectric liquid crystal retarders. If lateral electrodes on one of the device substrates are used rather than transparent electrodes deposited on opposing device substrates, nematic liquid crystals can operate as rotatable retarders with fixed retardance, and smectic liquid crystal can operate as variable retarders with fixed orientation.

Compound retarders utilizing a liquid crystal active retarder in combination with one or more passive retarders can be used in the electro-optic modulator. Particularly useful are achromatic compound retarders as described in U.S. patent application Ser. No. 08/419,593, and achromatic polarization rotators as described in U.S. patent application Ser. No. 08/549,963, both of which are incorporated by reference in their entirety herein. The achromatic compound retarder comprises a liquid crystal rotatable half-wave retarder flanked by passive retarders, wherein the orientations and retardances of the passive retarders are such that the compound retarder is achromatic. The achromatic polarization rotator comprises a liquid crystal rotatable half-wave retarder in combination with a passive half-wave retarder.

For compatibility between the retarder stacks and the electro-optic modulator, passive retarders can be included in the electro-optic modulator. For example, if the retarder stacks prepare the light in two linear polarizations separated by 45°, these are the modulation and isotropic states of polarization for a variable retarder with fixed orientation. A passive quarter-wave retarder oriented parallel to one of the polarization states converts the two linear polarizations into one linear and one circular polarization, which are the modulation and isotropic states of polarization for a rotatable retarder with fixed retardance. Thus if the electro-optic modulator includes a passive quarter-wave retarders on either side of a CSLC, stacks designed for a variable retarder can instead be used with a rotatable retarder.

Retarder stack 20 includes one or more passive retarders. For N retarders, the orientations are $\alpha_1$, through $\alpha_N$ and the retardances are $\Gamma_1$ through $\Gamma_N$. Any retardation material can be employed in the retarder stacks. Retarder materials preferably provide the following: high optical clarity, uniform retardance, range in retardance sufficient for the design requirements (this depends upon range of induced birefringence and practical range in thickness), environmental durability, and in many cases large area and low cost.

Retarder stacks can be constructed using, for example, layers of form-birefringence devices, liquid crystal polymer films, stretched polymer retarder sheets, or crystalline retarders. Stretched polymer films are available in arbitrary retardances (0–2,000 nm), using a variety of materials with unique birefringence dispersion characteristics. Large sheets can be purchased at a low cost, permitting large clear aperture filters. The characteristics of z-stretched polymers (Nitto NRZ) permit large view angles with small retardance shifts. Several other polymer materials are useful in producing filters, including but not limited to, poly-vinyl alcohol, polycarbonate, mylar, polypropylene, polystyrene, triacetate (tri-butyl-acetate), and polymethylmethacrylate.

Liquid crystal polymer films, particularly UV crosslinkable polymer nematic linear retarders, are particularly suitable for forming retarder stacks. An attractive feature is the ability to produce thin high-order retarders, since the material can have very high birefringence. This can permit the fabrication of multi-layer stacks on a single substrate with low cost. Liquid crystal polymers are particularly well suited to fabricating retarder stacks containing two or more retarders. To fabricate liquid crystal polymer layers, an alignment layer is first deposited on the substrate and then photopolymerized with polarized light. The orientation of the polarized light governs the orientation of the alignment layer and the subsequently deposited liquid crystal polymer layer. Since the polarization of the photopolymerizing light is readily controlled, stacks of liquid crystal polymer retarders can be manufactured with controlled alignment of each retarder in the stack. This is particularly advantageous for oblique relative orientations, i.e. relative orientations other than 0 or 90°, for which alignment of sheet retarders is more difficult.

Conventional crystalline retarder materials, such as quartz, mica and calcite, are well suited to applications requiring higher resolution than is feasible with polymer films. They are also useful for applications requiring low wavefront distortion, and/or high power handling requirements. They are more expensive than polymer retarders and do not lend themselves to large area, particularly when low retardances are required.

Using Poincaré sphere analysis, suitable orientations for the retarders were calculated for the case wherein the modulator has isotropic states which are linear polarizations at 0 or 90° and modulation states which are linearly polarized at ±45° (eg. a zero twist nematic, ZTN). If all the retarders have the same retardance the orientations are related by, $$\alpha_N - \alpha_{N-1} + \ldots \alpha_2 + \pi_1 = \pi/8\pi + m/4 \qquad \text{Eq. 1}$$

where m is an integer. For example, if there is one retarder, it can be oriented at $\pi/8$, $3\pi/8$, $5\pi/8$, ... for m=0, 1, 2, ... For two retarders, once $\alpha_1$ is chosen, $\alpha_2$ can be determined. For example, for $\alpha_1=\pi/16$, Eq. 1 gives $\alpha_2=3\pi/16+\pi m/4$, which is $3\pi/16$ for m=0. The orientations can similarly be determined for more that two retarders. Poincaré analysis can also be used to calculate retarder orientations for other choices of isotropic and modulation polarizations.

Combining polarization modulator 60 with polarization analyzer 70 creates a filter which intensity modulates the first spectrum, having an output labeled %F in FIG. 1, but has a constant output for spectrum $\overline{F}$. Depending on the analyzer, the output of $\overline{F}$ is fixed somewhere between 0 and 100%. The polarization analyzer can be a second retarder stack in combination with a polarizer. A second retarder stack is not required when the analyzing polarizer is isotropic to spectrum $\overline{F}$. Thus linear or circular colored polarizing filters can be used as the polarization analyzer.

Figure 4B:
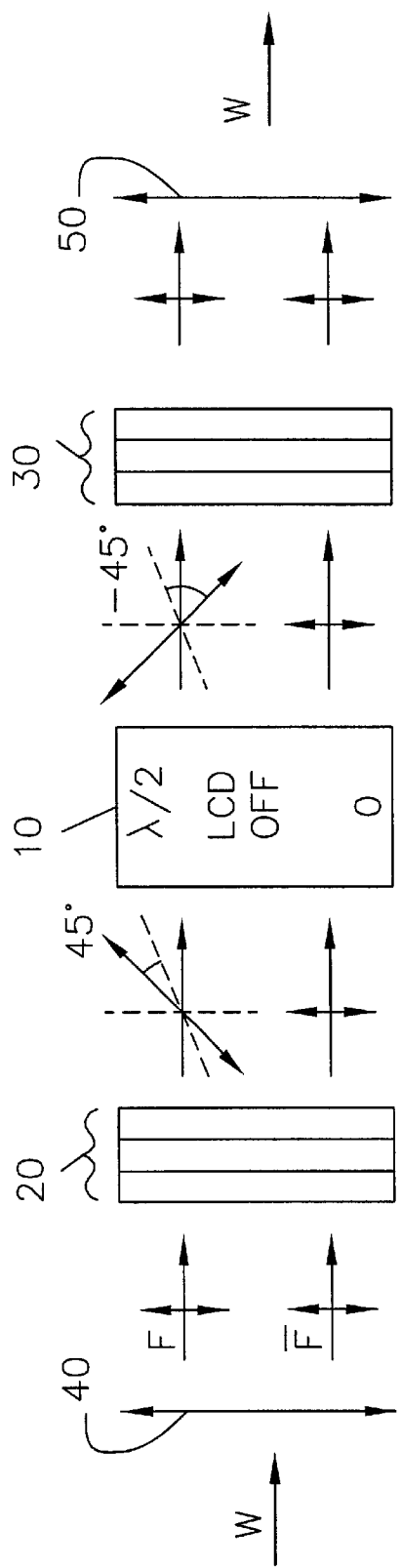
FIGS. 4b–4c, show a filter in which the polarization analyzer is a retarder stack in combination with a neutral polarizer, transmitting (b) white in a first switching state of the modulator and (c) a filtered spectrum in a second switching state.
Figure 4C:
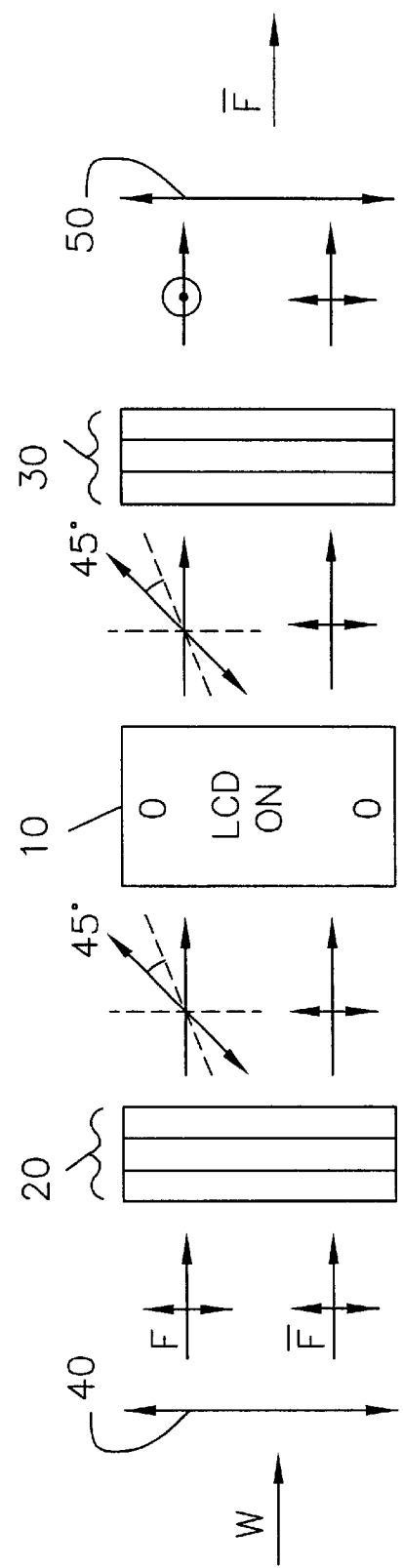

A filter wherein the polarization analyzer includes a second retarder stack is illustrated in FIGS. 4b and 4c. It is formed by modulator 10 positioned between first retarder stack 20 and second retarder stack 30. The modulator changes the apparent orientation of the second stack so that, in one switching state of the modulator the two stacks cooperate in filtering the spectrum of input light, and in another switching state the retarders essentially vanish, resulting in an unfiltered or white output spectrum (FIG. 4b).

The filter includes input polarizer 40 and analyzing polarizer 50 which can be neutral polarizers. Orientation angles are defined with respect to the polarization of input light, in this case defined by polarizer 40. If the light source provides polarized light, an input polarizer is not required. The filter can be coupled with a separate polarizing device which can serve as the analyzing polarizer. In this embodiment the filter is illustrated with linear polarizers. In general they can be linear, circular or elliptical polarizers. Suitable polarizers include absorption, dichroic, dye-based, non-absorptive, polarizing dielectric film, polarizing beamsplitter, calcite, quartz, scattering, prismatic, cholesteric and stacked cholesteric polarizers. The polarizer can include additional polarization conditioning elements, such as a quarter-wave retarder to convert between linear and circular polarization.

The filter is illustrated with a zero-twist nematic modulator switched between half-wave retardance (4b) and zero retardance (4c). Retarders are represented by boxes with the retardance labeled at the top and the orientation with respect to the input polarization, in degrees, at the bottom. The retarders have the specified retardance at a design wavelength, which is typically within the operating range of the filter and which can be tailored to optimize filter performance. All orientations given herein are approximate and can be adjusted by several degrees to tailor the filter output.

In the filter of FIGS. 4b and 4c, modulator 10 is an electro-optic, zero-twist nematic liquid crystal oriented at 0° with retardance which varies between $\lambda/2$ when no field is applied ("off") and ideally zero when the fully "on" field is applied. For this modulator the isotropic states are linear polarizations at 0 or 90° and the modulation states are linearly polarized at plus and minus 45°. In this embodiment the modulator is a liquid crystal display (LCD), where the term LCD is used for any liquid crystal device which contains a liquid crystal cell having one or more pixels. The LCD is typically a multi pixel array of liquid crystal cells where each pixel can be independently controlled. The filters can be implemented with a multi pixel LCD or a nonpixelated electro-optic modulator. The retardances of a single pixel of an LCD are labeled in FIGS. 4b and 4c.

In the illustrated embodiment white light is incident on polarizer 40. For filters designed to operate outside of the visible spectrum the "white" light is all of the input wavelengths of light, for example in infrared wavelength division multiplexing it would be all the infrared channel wavelengths. The white light can be thought of as being composed of a first spectrum labeled F, and a second, complementary, spectrum labeled $\overline{F}$.

The retarders in stack 20 have retardances and orientations such that spectrum F is output or transmitted in the modulation state of 45° linear polarization and spectrum $\overline{F}$ is output or transmitted in the isotropic state of 0° linear polarization. In a first switching state (FIG. 4b) the modulator has ideally retardance $\lambda/2$, whereby the polarization of the spectrum seeing the modulation state is switched to −45°. The isotropic state is unchanged. In a second switching state (FIG. 4c) the modulator has zero retardance and the polarization of the light output from the modulator is unchanged for both the modulation and isotropic states.

Second retarder stack 30 follows the modulator. When the modulator is in the first switching state the second stack undoes the transformation of the first stack, thereby transmitting both F and $\overline{F}$ linearly polarized at 0°. Polarizer 50 transmits both spectra and the filter output is white light. In the second switching state, the second stack completes the transformation which orthogonally polarizes F and $\overline{F}$. Polarizer 50 blocks the light having spectrum F, and the output is filtered light with spectrum $\overline{F}$. If polarizer 50 were oriented at 90°, the filter would switch between black and the F spectra, the complements of white and $\overline{F}$. Because the output is filtered in the second state, wherein the modulator is not "seen", the filter is called normally filtered (NF). A filter that transmits (or blocks) the entire spectrum with the LCD removed is called normally white (NW). In general, the normal state is listed first in naming a primary/white or white/primary filter, but the term white/primary is also used generically for both.

In a preferred embodiment the filter is a color filter and spectra F and $\overline{F}$ correspond to an additive primary (red, green or blue) and the complementary subtractive primary (cyan, magenta or yellow). Either the F or the $\overline{F}$ spectrum can be the additive primary. In the visible, the filter is therefore a primary/white filter for parallel polarizers, or a primary/black filter for crossed polarizers. The filter is generally described herein for the case of color filtering, though in general it can be used as a white/filtered switch wherein the filtered spectrum is not limited to a primary color spectrum. The filter is named for the spectrum it transmits rather than the spectrum it modulates. Thus the filter of FIGS. 4b and 4c is a $\overline{F}/W$ filter, even though it is the F spectrum which is modulated by for example, an electro-optic modulator.

Polymers are chemical compounds or mixtures of compounds consisting of repeating structural units formed by a chemical reaction where two or more small molecules combine to form larger molecules.

Liquid Crystal Polymers (LCP) are a class of polymers wherein liquid crystal monomers are incorporated into the macromolecular structure along the mainchain (backbone) or as side chain units.

LCP's can be aligned by either mechanically rubbed surfaces, shearing, or more recently it has been shown by optical means. Optical methods include first applying linear photo-polymerizable (LPP) films or azo-based dyes either in a polymer alignment layer. In the former (see Schadt, et al, Jpn. J. Appl. Phys. Vol. 34, pg. 3240–3249, 1995), the LPP materials are deposited on a substrate and then cured at elevated temperature. The cured film is then subjected to polarized UV light. LCP's are then spun-on or coated onto the same substrate, and align with the orientation of the LPP film. The LCP's are then cross-linked by exposure to unpolarized UV light. In the latter, (Shannon et al, Nature, vol. 368, pg. 532–533, 1994), azo-dye molecules intercalated into the polymide alignment layer, (or layers) which are deposited onto various substrates (including glass, silicon, and others). A liquid crystalline monomer or polymer is either deposited onto one substrate, or sandwiched in between two substrates. The LC molecular director orients perpendicular to the direction of the polarized UV light which previously illuminated the alignment layer. Subsequent exposure will reorient the liquid crystals, which may be disadvantageous for some applications.

Polarizer 40 can be a holographic polarizer which is a hologram that sees one polarization state and not the other. Holographic polarizer defracts light of a first state of polarization and does not defract light of another state of polarization. Polarizer 40 can also be an EM Industries Transmax polarizer.

FIGS. 4b and 4c illustrate the two extreme switching states of the modulator. If the LCD pixel has a retardance other than 0 or $\lambda/2$, the $\overline{F}$ spectrum still retains the 0° polarization orientation and is fully transmitted. However light in the F spectrum is transformed to an elliptical polarization having a projection in the 0° polarization state which is between 0% (FIG. 4c) and 100% (FIG. 4b). Analog control of the modulator voltage therefore provides analog modulation of the F spectrum.

Figure 4D:
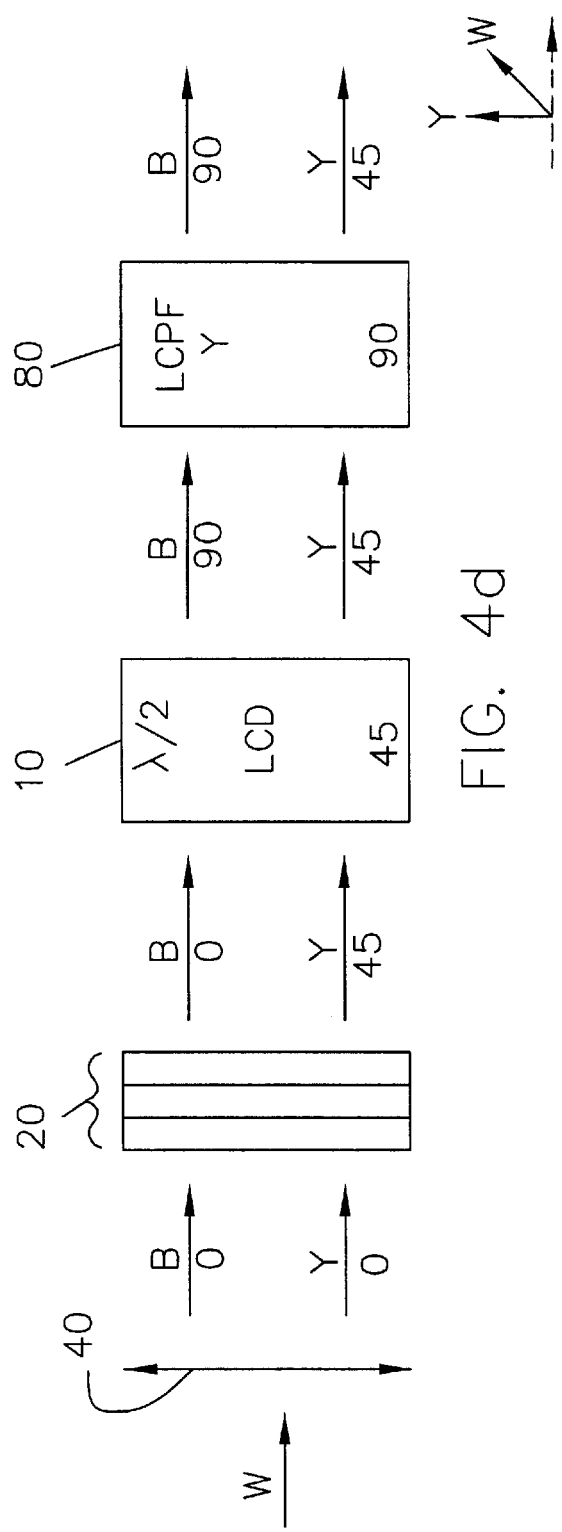
FIGS. 4d and 4e, show a filter in which the polarization analyzer is a linear colored polarizing filter, transmitting (d) white in a first switching state of the modulator and (e) yellow in a second switching state.
Figure 4E:
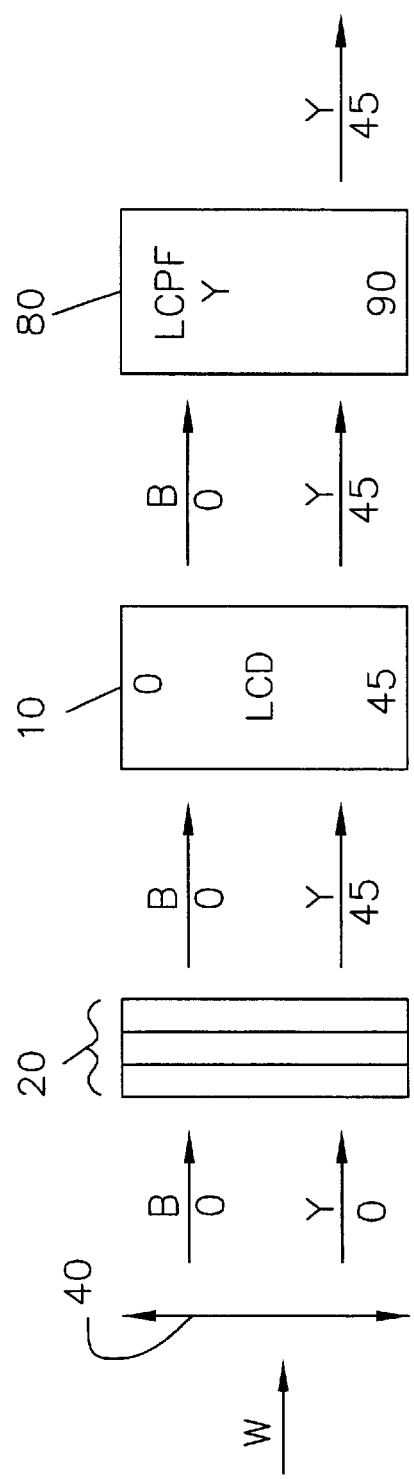

A Color Selective Polarizing (CSP) filter for example, a pleochroic dye polarizer, for the analyzing polarizer is illustrated in FIGS. 4d and 4e. Light propagation is illustrated with arrows having the color labeled on top and the orientation on the bottom. In the specific embodiment illustrated, retarder stack 20 prepares blue light at 0° and yellow light at 45°. Electro-optic modulator 10 is a ZTN oriented at 45°, for which a linear polarization at 0° is modulated and a linear polarization at 45° is isotropic. Analyzing polarizer 80 is a yellow (CSP) oriented at 90°, which transmits yellow light at 0° and all wavelengths at 90°. When the ZTN has half-wave retardance (FIG. 4d), the blue light is rotated to 90° and is transmitted by the (CSP) filter. When the ZTN has zero retardance (FIG. 4e), the blue light remains at 0° and is transmitted by the (CSP). For intermediate retardances, the blue transmission is varied between 0 and 100%.

Figure 4F:
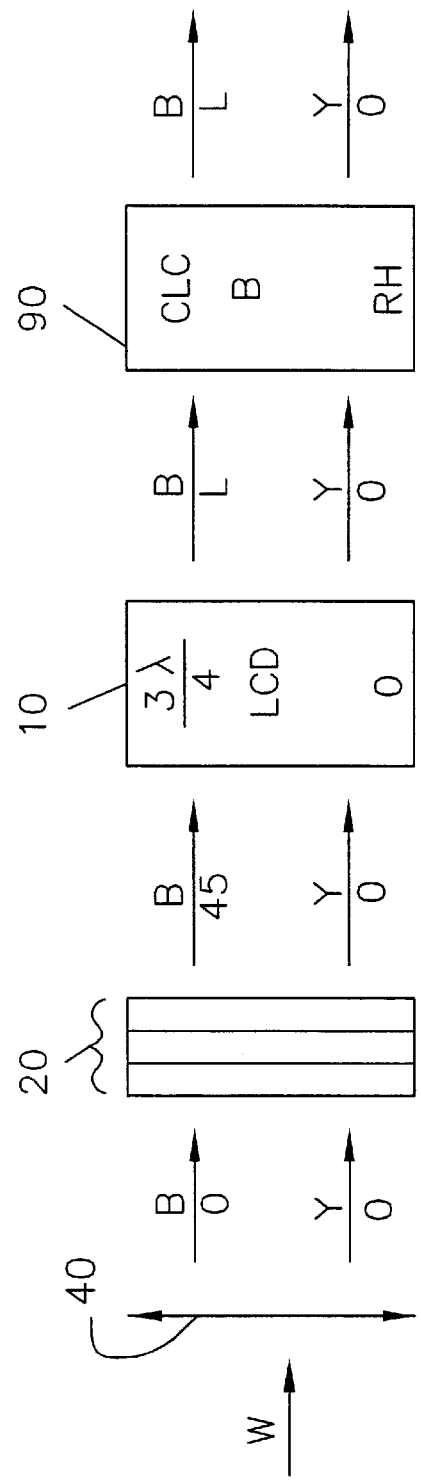
FIGS. 4f and 4g, show a filter in which the polarization analyzer is a cholesteric liquid crystal, transmitting (f) white in a first switching state of the modulator and (g) yellow in a second switching state.
Figure 4G:
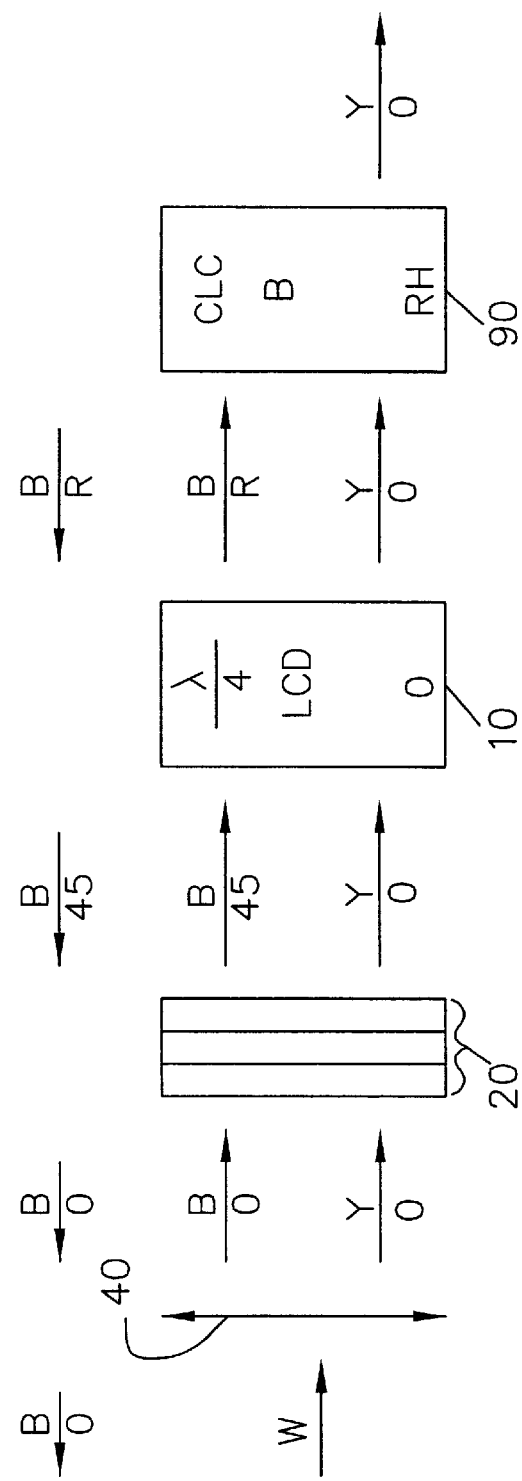

A filter having a circular color polarizer, in this case a cholesteric liquid crystal (CLC) or CLC Polymer, is illustrated in FIGS. 4f and 4g. Retarder stack 20 transmits blue light at 45° and yellow light at 0°. Electro-optic modulator 10 is a ZTN oriented at 0° and having retardance switchable between $3\lambda/4$ (FIG. 4f) and $\lambda/4$ (FIG. 4g). For the blue light at 45°, the polarization is therefore modulated between left-handed and right-handed circular polarizations. For intermediate retardances, intermediate elliptical polarizations are produced. Component 90 is a right-handed blue CLC, which reflects right-handed blue light, transmits left-handed blue light, and transmits other wavelengths regardless of polarization. Because the CLC reflects rather than absorbing the non-transmitted polarization, this filter provides variable blue output both in transmission and reflection mode.

Figure 5:
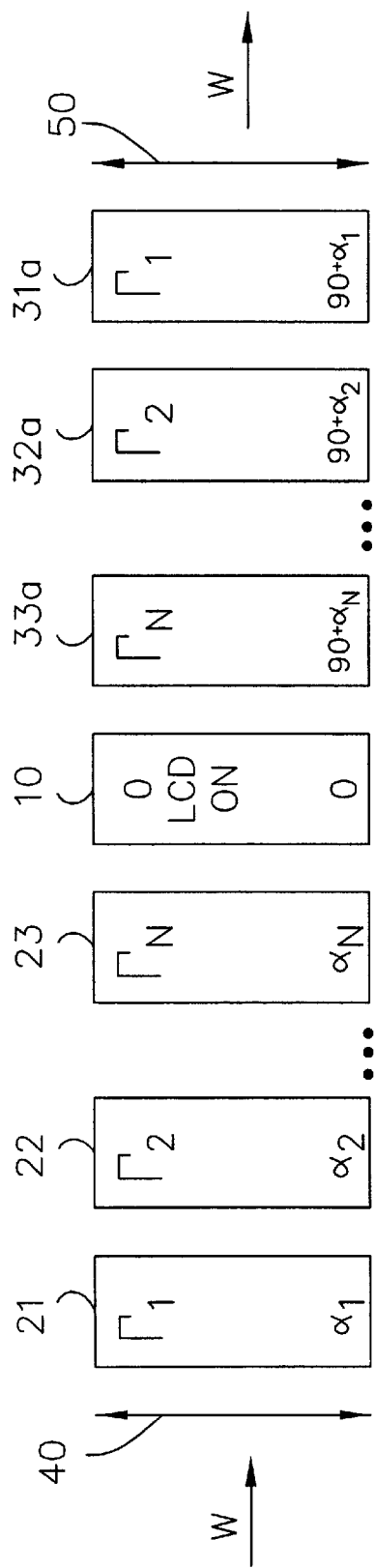
FIG. 5 is a normally white embodiment of the FIGS. 4b and 4c filter.

The remainder of the description is addressed primarily to the two retarder stack filter, although much of it can be generalized to any polarization analyzer. In order for the second stack to undo the transformation of the first stack, the retarders of the two stacks are related to each other as shown in FIG. 5 for a normally white filter and in FIG. 6 for a normally filtered filter. In both figures modulator 10 is shown in the switching state in which it is not seen, so that it illustrates the normal transmission of the filter. The first stack has retarders 21, 22 and 23 having retardances $\Gamma_1$, $\Gamma_2 \ldots \Gamma_N$ and orientations $\alpha_1, \alpha_2 \ldots \alpha_N$. For equal retardances, the orientations are related according to Eq. 1. The second stack contains retarders 33a,b, 32a,b and 31a,b having the same retardances as the first stack but with the order reversed. The retarders of the second stack are rotated with respect to the first stack to orientations of $90+\alpha_N$ for NW and $90-\alpha_N$ for NF. In the NW configuration, the Jones matrices for the first and second stacks are inverses of one another.

When modulator 10 is switched to half-wave retardance, the NW structure provides a filtered spectrum and the NF structure provides a white spectrum. If the LCD were completely achromatic, the filter of FIG. 5 would, in the switched state, provide the same spectrum as the FIG. 6 filter, and vice versa. The main difference between the NW and NF configurations is a result of the chromatic effects of the LCD. In the NW configuration the white state is ideal, but the chromaticity of the LCD can degrade the color contrast of the filtered state. For the NW subtractive white/primary filters (W/C, W/M or W/Y) the LCD need only be achromatic over the bandwidth of the modulated additive primary (R, G or B). Conversely, NW designs for W/R, W/G or W/B filters give best result when the LCD is achromatic over the bandwidth of the modulated subtractive primary. The LCD is preferably optimized for switching of the modulated band, for example by having the LCD design wavelength within the modulated band. This is most challenging for normally white W/G filters, in which the modulated band is the subtractive primary magenta, which contains both red and blue bands.

In NF configurations the white state can suffer from chromaticity. However, since at least one additive primary band is always transmitted regardless of the LCD retardance, the LCD retardance can be selected to optimally pass the modulated subtractive primary band. Chromaticity in the white state is less detrimental than in the filtered state because the resulting loss of throughput in the white state impacts color quality less than leakage in the filtered state. Thus, in terms of chromaticity, a G/W filter can perform better than a W/G filter.

Useful stack designs can be generated by starting from filter designs, such as Šolc or split-element filters, having structures which happen to naturally fit the constraints. Alternatively, filter designs having useful transmission spectra can be generated, for example using the network synthesis technique (see Harris et al. (1964), J. Opt. Soc. Am. 54:1267; Ammann et al. (1966), J. Opt. Soc. Am. 56:1746; Ammann (1966), J. Opt. Soc. Am. 56:943; and U. S. patent application 08/447,522, filed May 23, 1995, all of which are incorporated by reference herein in their entirety), and then screened for the subset conforming to the design requirements. A third approach is to systematically evaluate all the designs that fit the design requirements to locate those with useful spectral profiles.

This third approach is illustrated in FIG. 7. The illustrated filters following the NF design requirements of FIG. 6. The LCD modulators are switchable between two retardances; both are listed and are separated by a comma. For analog modulators, the retardance is continuously tunable between these extreme values. FIG. 7a shows the simplest filter design, having only one retarder in each of stacks 20 and 30, for a total of two retarders. FIGS. 7b–d show designs having a total of four retarders each. For the special case where $\alpha_2=45°$, in the normal state it is equivalent to a three retarder filter having a center retarder with retardance $2\Gamma_2$ and orientation 45°.

In the illustrated filters, the retarders in each stack have either equal retardances or retardances differing by a factor of two, thereby providing real impulse response functions. This is not a requirement, the retardances can be unrelated, resulting in complex impulse response functions. Equal retardances can facilitate fabrication. These examples are by no means a complete set of useful designs. They simply show one group of structures that yield useful filters of either additive or subtractive primary bands.

Filter designs based on FIG. 7 were generated by incrementing through values of $\alpha_1$ (5, 10, 15, 20 . . . ) and, for each value of $\alpha_1$, incrementing through values of $\alpha_2$. The transmission spectrum of each filter was calculated and useful spectra were identified. The spectra can be calculated using Mueller or Jones matrices. Preferred spectra for display applications have a duty ratio matching the desired spectrum and have a rectangular looking profile. Preferably the filter has a steep transition slope, with a relatively flat transmission band and a relatively flat blocking band. Relatively flat bands can be achieved by having a series of distributed high-contrast nulls or peaks in the spectrum. Near ideal transmission spectra can be produced by increasing the number of retarders. In practice, acceptable transition slopes and side-lobe amplitudes/locations must be judiciously chosen to optimize saturation with a limited number of components.

The filter resolution must be sufficiently low to sustain peak transmission throughout the primary band. From a saturation standpoint, the pass-band resolution must be sufficiently high to isolate only the desired primary band. Designs which produce sufficiently low resolution, along with steep transition slopes (or multiple peaks in the passband), are preferred.

Some of the useful designs are shown in Table I. The retarders for both stacks are listed in the table as they would appear in the normal switching state, wherein the LCD is not seen. The total number of retarders, M, is listed. Note that for equal retardances the orientations follow Eq. 1. Suitable designs obtained by stepping through $\alpha_1$ and $\alpha_2$ can be improved by fine tuning of the angles. After identifying the basic design, the retardance Γ can be selected to produce the desired subtractive or additive primary modulation.

Figure 6:
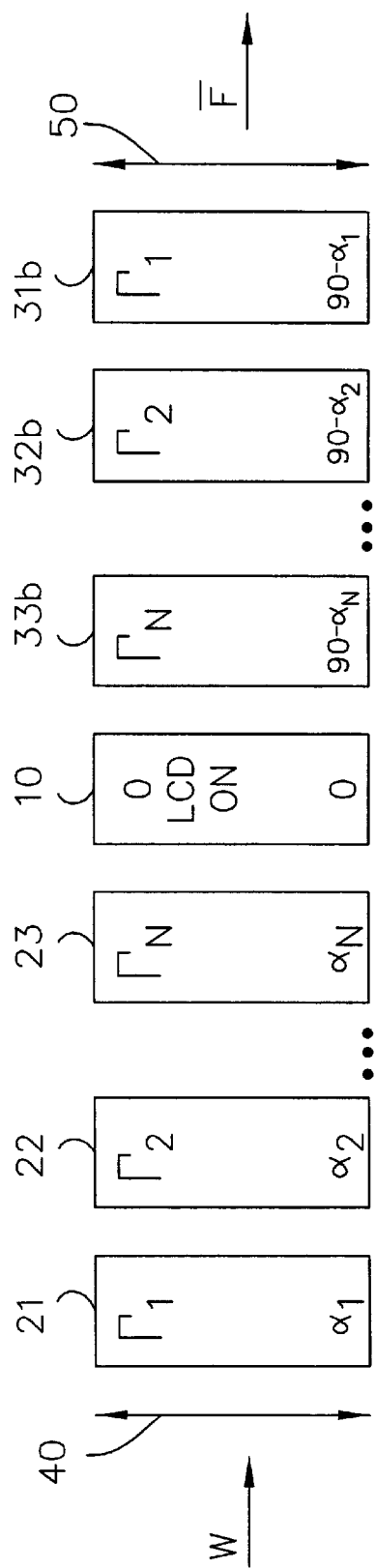
FIG. 6 is a normally filtered embodiment of the FIGS. 4b and 4c filter.
Figure 7A:
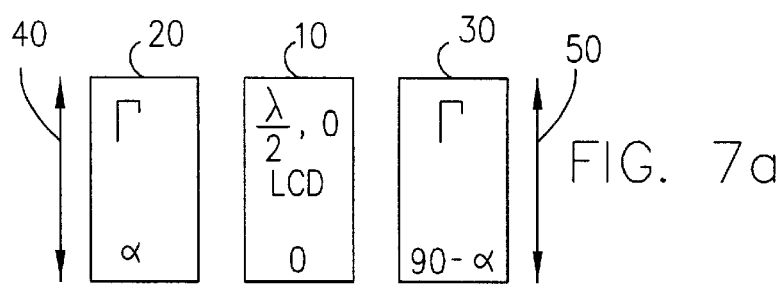
FIGS. 7a–d, show filters with a total of (a) two retarders and (b–d) four retarders.
Figure 7B:
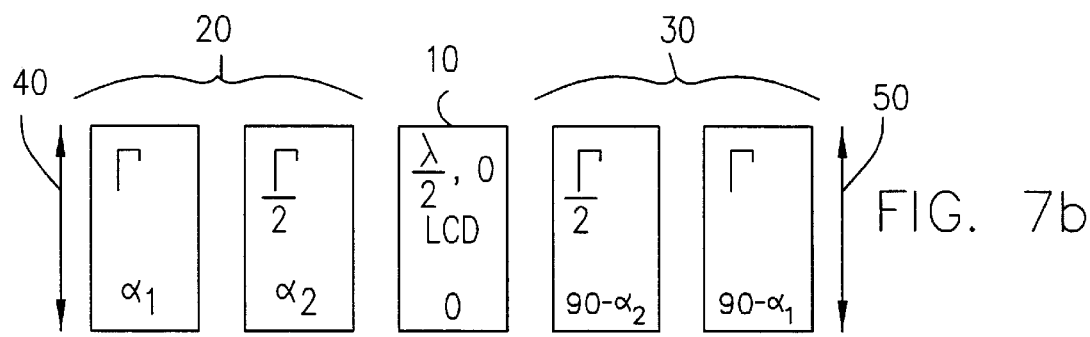
Figure 7C:
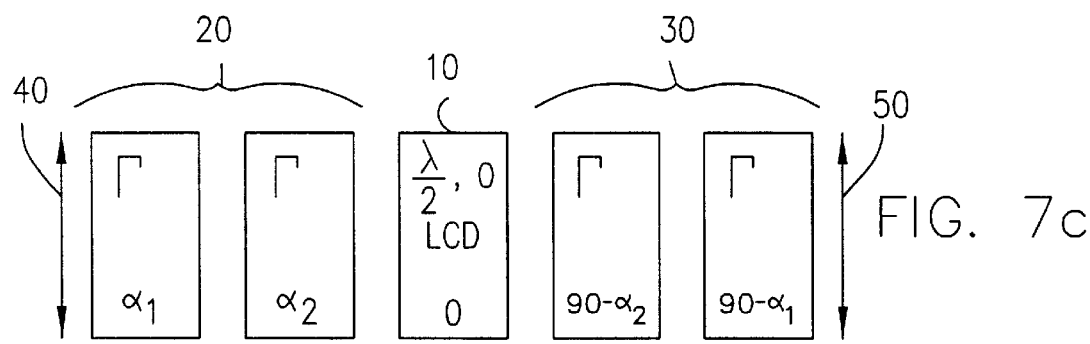
Figure 7D:
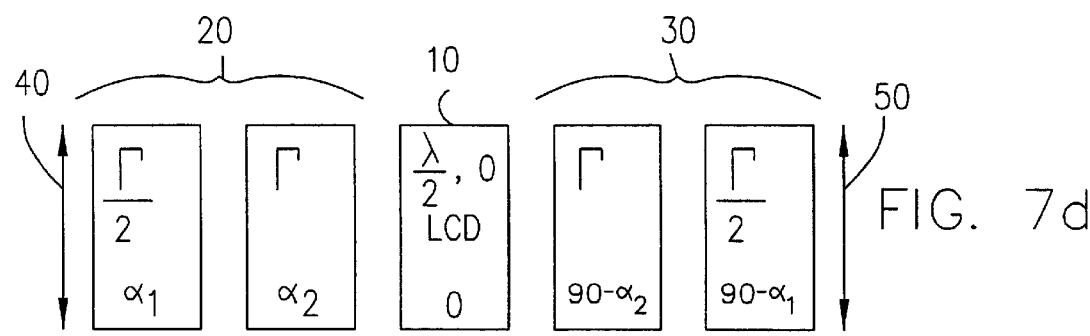
Figure 8:
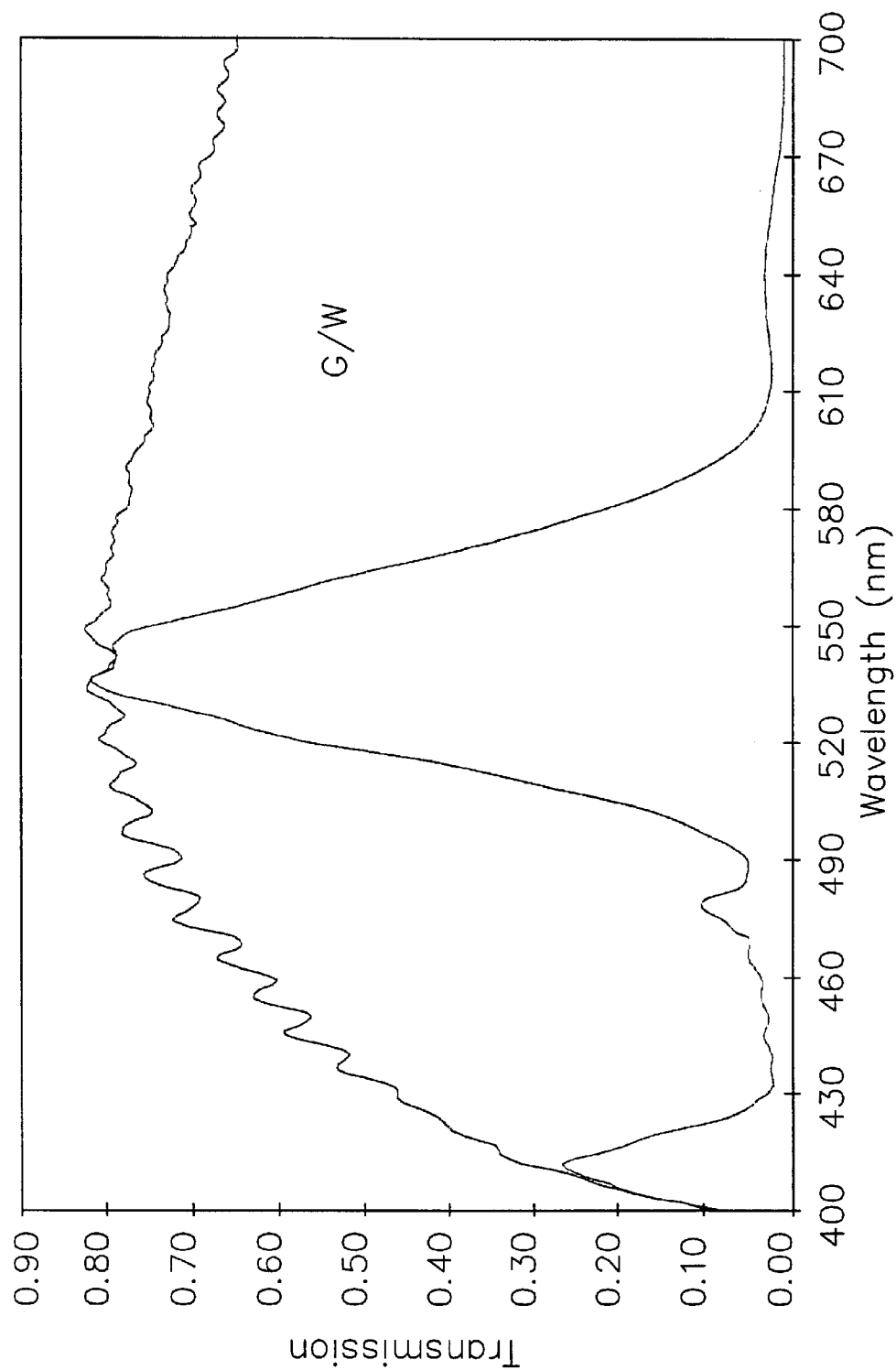
FIG. 8 is the measured transmission of a G/W filter.
Figure 9:
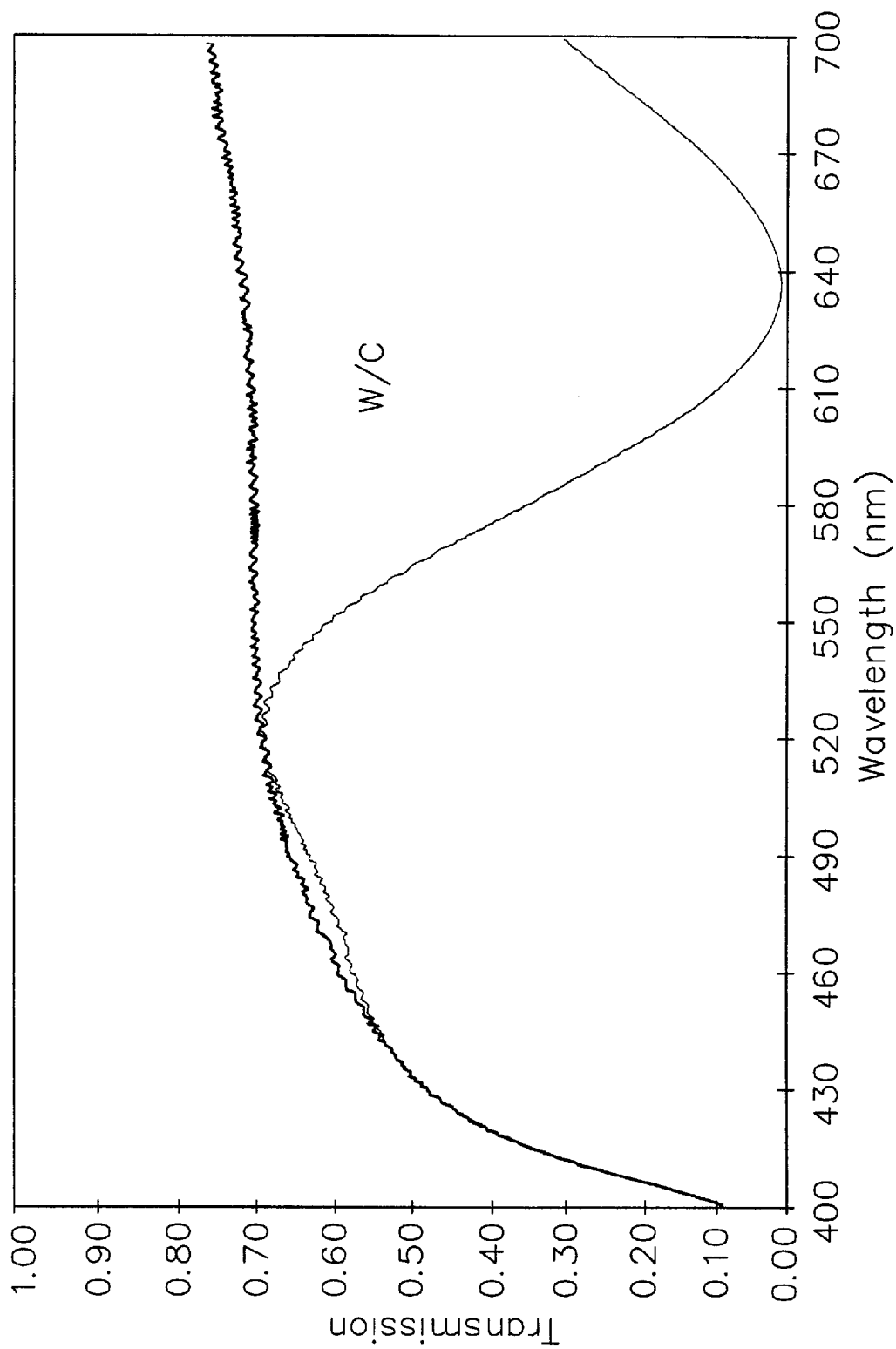
FIG. 9 is the measured transmission of a W/C filter.

Fan Šolc filters are a family of structures that happen to conform to the design requirements of FIG. 6. This conformation is a fortuitous coincidence and is in no way a deliberate feature of the Šolc design. Šolc filters are described in U.S. Pat. No. 5,469,279, and U.S. patent application Ser. No. 08/661,498 filed Jun. 11, 1996, which are incorporated by reference herein in its entirety. A Šolc filter requires a series of identically thick retarders which are full-wave or half-wave retarders at the design wavelength for fan and folded designs, respectively. For fan Šolc filters the retarders are oriented at $\alpha$, $3\alpha$, $5\alpha$, . . . (i.e. $\alpha_N=(2N-1)\alpha_1$). For folded Šolc filters they are oriented at alternating rocking angles $\alpha$, $-\alpha$, $\alpha$, . . . (i.e. $\alpha_N=(-1)^{N+1}\alpha_1$).

Table II shows fan Šolc designs according to these requirements. Note that the fan Šolc designs coincidentally fit the requirements of FIG. 6. When M is odd, the center retarder in a fan Šolc design is oriented at 45°, at which angle $\alpha=90-\alpha$. Thus the center retarder is simply split in half, and half is included in each retarder stack. The total number of retarders M is listed in quotation marks as "3" or "5" for cases where, in the normal state, the center two retarders are equivalent to a single retarder. The retarder orientation is a function of the total number of retarders, where $\alpha=\pi/4M$.

In the case of the fan Šolc filter, the filter naturally fits the criteria of the white/primary filter of the present invention. The folded Šolc filter, on the other hand, does not fit the present criteria. The retardances meet the constraints but the orientations do not obey $\alpha_N=90\pm\alpha_N$. The folded Šolc design can be modified into a quasi-folded Šolc design which does meet the criteria, as shown in Table III. The term quasi-folded Šolc design is used for all designs wherein the retarders all have the same retardance and wherein, within each stack, they are all oriented at approximately the same angle but with alternating sign.

In a classical folded Šolc filter, as in the fan filter, $\alpha=\pi/4M$. For example, the classical folded Šolc filter with N=6 retarders calls for $\alpha=8°$. For the quasi-folded Šolc filter there are no limitations on the angle $\alpha$. As shown in Table III it can be varied substantially while still producing useful spectral responses. Tables I–III show NF designs. To make NW designs the sign of the angle for each retarder in the second stack is reversed.

Like the Šolc filter, the split-element filter naturally fits the requirements of FIGS. 5 and 6. A split-element filter suitable for color display is described in U.S. Pat. No. 5,528,393, which is incorporated by reference herein in its entirety. It comprises first and second matched retardance split-element retarders oriented at ±45° with respect to the entrance polarization, and a center retarder oriented at 0°. For parallel split-elements the filter is NF, and for crossed split-elements it is NW.

To form a white/primary filter of this invention, the split-element retarders form the stacks and the center retarder can be positioned between the LCD and one of the split-element retarders. In this asymmetric case the retarders on either side of the LCD are not matched, but the stacks can be considered to each comprise a single retarder, the split-element retarder, and the center retarder can be considered an addition element not included in either stack. Because the center retarder is oriented parallel or perpendicular to the electro-optic modulator the lack of symmetry does not prevent the attainment of a white switching state. The referred embodiment is shown in Table IV. In the table the center retarder is listed along with the Stack 1 retarder. For the retardances shown, the filter transmission approximates a two-stage Lyot filter. Because of the quarter-wave retardance added to each split-element retarder, the design belongs to the set of complex impulse response filters.

For all the designs described above, once the orientations have been selected for the optimum profile, the retardances can then be selected to provide optimum color saturation at each primary. The design parameters can be analyzed with standard Mueller matrix techniques, which include a dispersion fit to specific retarder materials. The criteria for evaluating filter designs is based on considerations of saturation, hue, and throughput. The saturation and hue can be evaluated using the CIE chromaticity diagram. The quality of color generated by a particular filter output can be characterized by calculating a series of overlap integrals, including the transmission function for a specific filter state, the power spectrum of the source, and the CIE color matching functions.

Saturated primary colors are generated by maximizing the ratio between source power transmitted in the desired primary band to that transmitted outside of the primary band. The filter design can be matched to the source characteristics to make optimization quite specific. For example, true white sources, such as a 6000 K black body, place greater demand on filter performance than distributed sources, such as a CRT phosphor. The spectral positions of nulls in the blocking band depends upon the retardance of the components. It is advantageous to strategically place nulls at out-of-band power spectral maxima of the light source. Similarly, it is advantageous to place side-lobe maxima away from out-of-band power spectral maxima. Passive filters can be inserted to reject bands that lie outside of the primary color bands to increase saturation.

Measured spectra of white/primary filters are shown in FIGS. 8–11. The structures of the filters are given in Table V. The switches use a 3TN cell with an unenergized half-wave retardance center wavelength as listed in the table. The polarizers are Nitto-Denko EG1425 with only a hard-coat. The transmission therefore includes two Fresnel losses. The retarders are sheets of NRZ retarder, each having the design retardances listed in the table. For the NW designs the losses in the white state are associated with the polarizers, absorption by ITO electrodes on the LCD, external reflections, and any LC residual retardance. The latter is typically about 20 nm. The spectra were scanned using an ANDO optical spectrum analyzer, automatically normalized by the source spectrum with parallel Glan-Thompson polarizers.

The design wavelengths of the passive and LCD retarders are given in Table V. For both active and passive retarders, the design wavelength is the wavelength at which the retarders give the specified retardance. For the passive retarders it is the wavelength at which they are full-wave retarders, except for the W/M filter in which they are 2λ retarders. The retarder stack design wavelength is chosen to place the modulated blocking peak in the desired color band. The design wavelength of the LCD is the wavelength at which the retardance is λ/2 in the unenergized state. Note that, in order to minimize the effect of LCD chromaticity, the design wavelength is chosen to fall in the center of the modulated band.

The G/W, W/C and W/M filters are quasi-folded Șolc designs. The G/W design is the same as the third design in Table III. The W/M design is the same as the second design in Table III, except that since it is normally white rather than normally filtered the orientations of the retarders in the second stack have reversed signs. In the W/C design the orientations of the retarders have been adjusted to increase steepness of the transition. The W/Y design can be recognized as the fifth design in Table I, where retardance $\Gamma=2\lambda$.

Note the excellent passband transmission, stopband blocking and steep transition edge of the filter spectra of FIGS. 8–11. The reduced filter transmission in the blue is due to the use of sheet polarizers which are have losses in the blue, and not to the retarders or filter design. Transmission can be improved with the use of improved polarizers.

A benefit of this invention is that the LCD has no mechanism for inducing color shift. That is, the transition bandwidths are defined by the retarder stacks independent of the state of the LCD. As such, changes in view angle (or LCD chromaticity) have very little effect on filter transmission. Features such as transition band center wavelengths, defined by the stacks, are preserved to the extent that the stacks are angle independent. Changes in view angle produce only a slight loss in density of the blocked color and no shift in band position.

Figure 10:
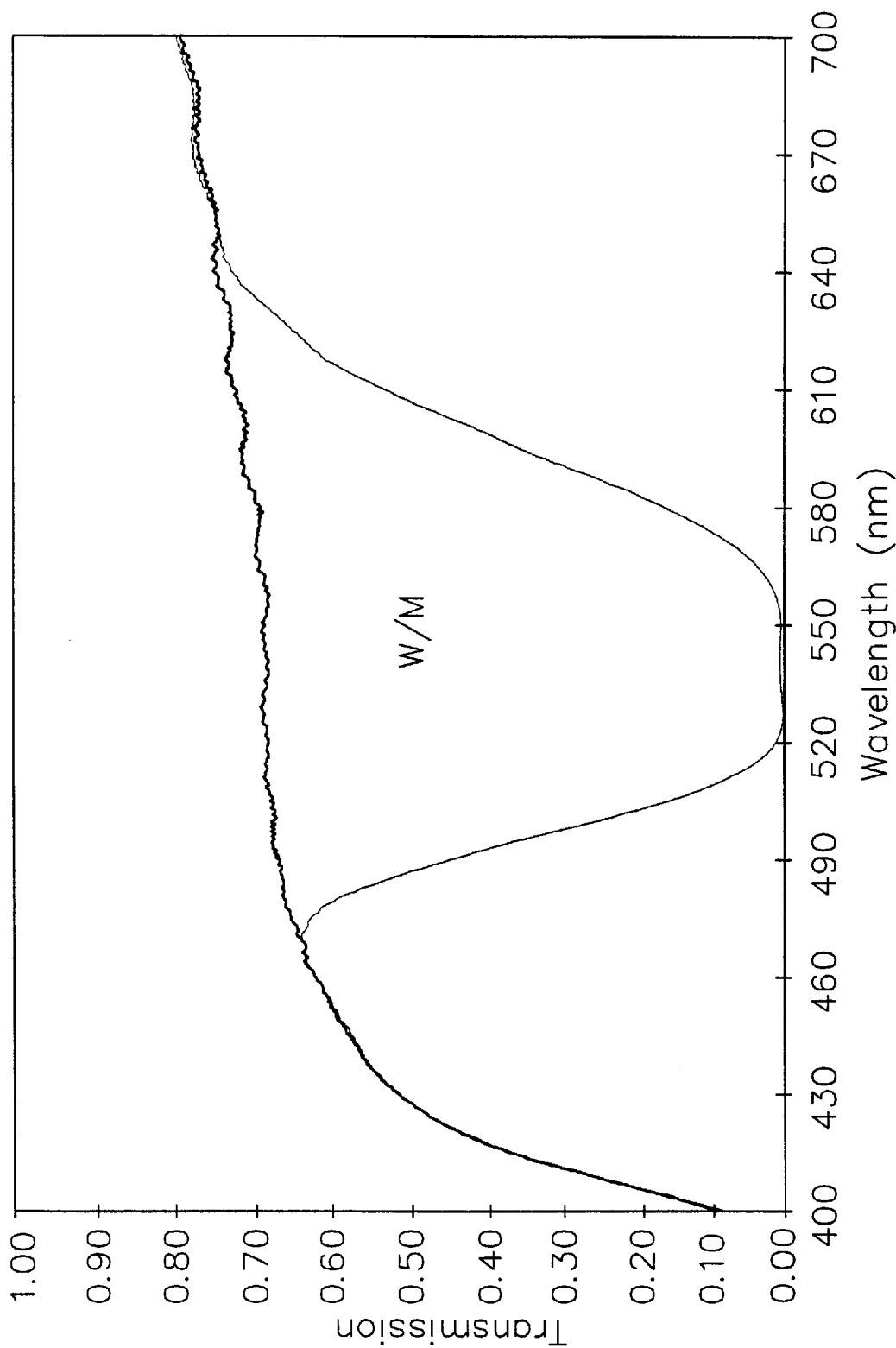
FIG. 10 is the measured transmission of a W/M filter.
Figure 11:
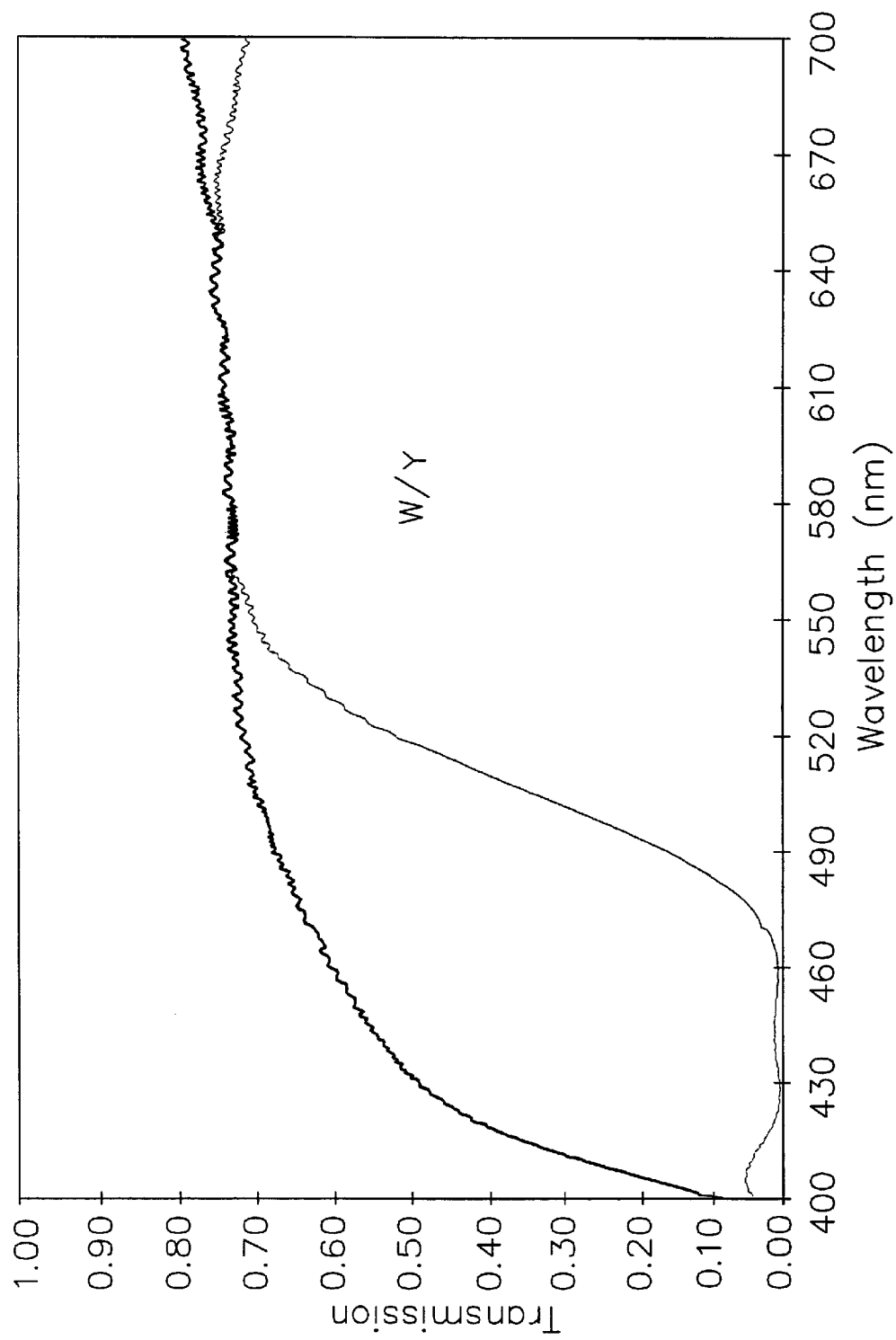
FIG. 11 is the measured transmission of a W/Y filter.
Figure 12:
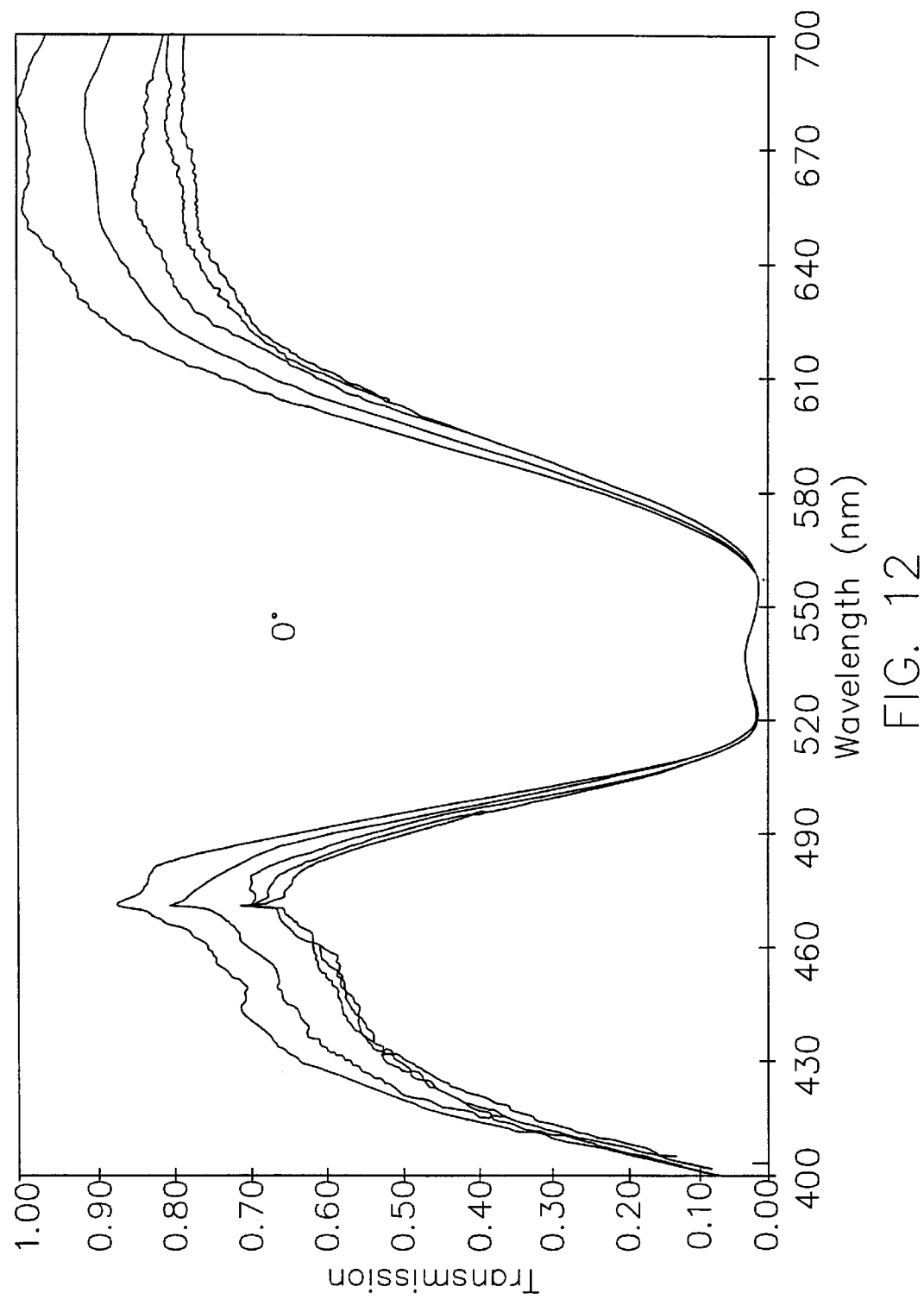
FIG. 12 shows the measured transmission of the W/M filter of FIG. 10 as a function of incidence angle for an azimuth angle of 0°.
Figure 13:
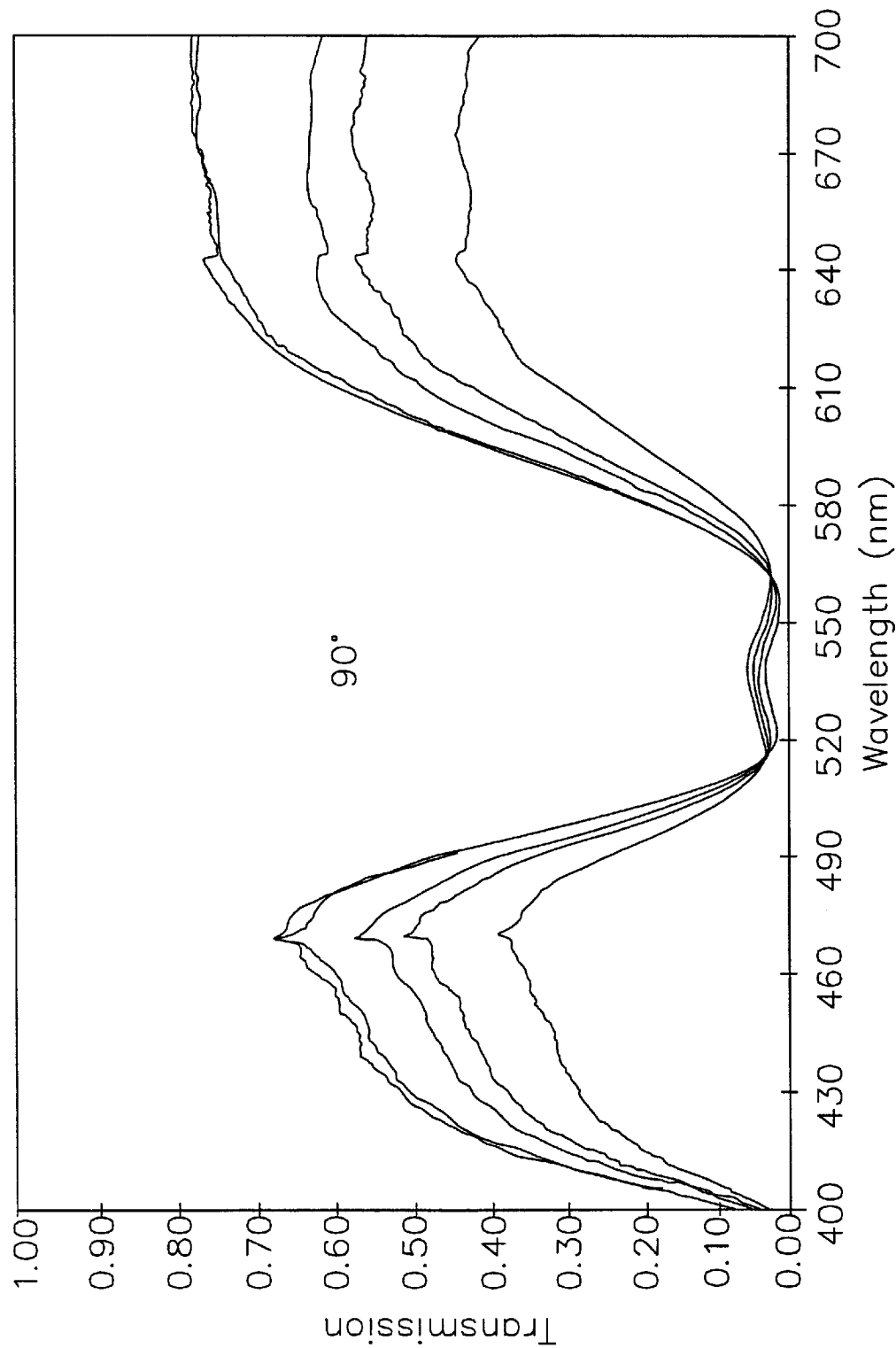
FIG. 13 shows the measured transmission of the W/M filter of FIG. 10 as a function of incidence angle for an azimuth angle of 90°.

This is demonstrated with the W/M filter of FIG. 10. For an azimuth angle of 0°, the measured change in transmission with angle of incidence is shown in FIG. 12. For incidence angle ranging as far as −50° from normal, the spectrum is remarkably unchanged. The magenta transmission decreases slightly but the green blocking remains excellent and the band positions are unchanged. The half-max of the blue/green and red/green transitions is fixed by the stack. The spectrum varies with azimuthal angle as well as with incidence angle. The worst azimuthal angle measured was 90°, as shown in FIG. 13. The 0° incident angle transmission is actually identical for either azimuthal angle, and the measured difference between FIGS. 12 and 13 is an artifact of the polarization-dependent coupling of the light source via an optical fiber. Even in the worst case of 90° azimuth angle, the blocking density is excellent and the bands are not shifted. This makes for excellent wide view-angle color switches, and display systems.

Figure 14:
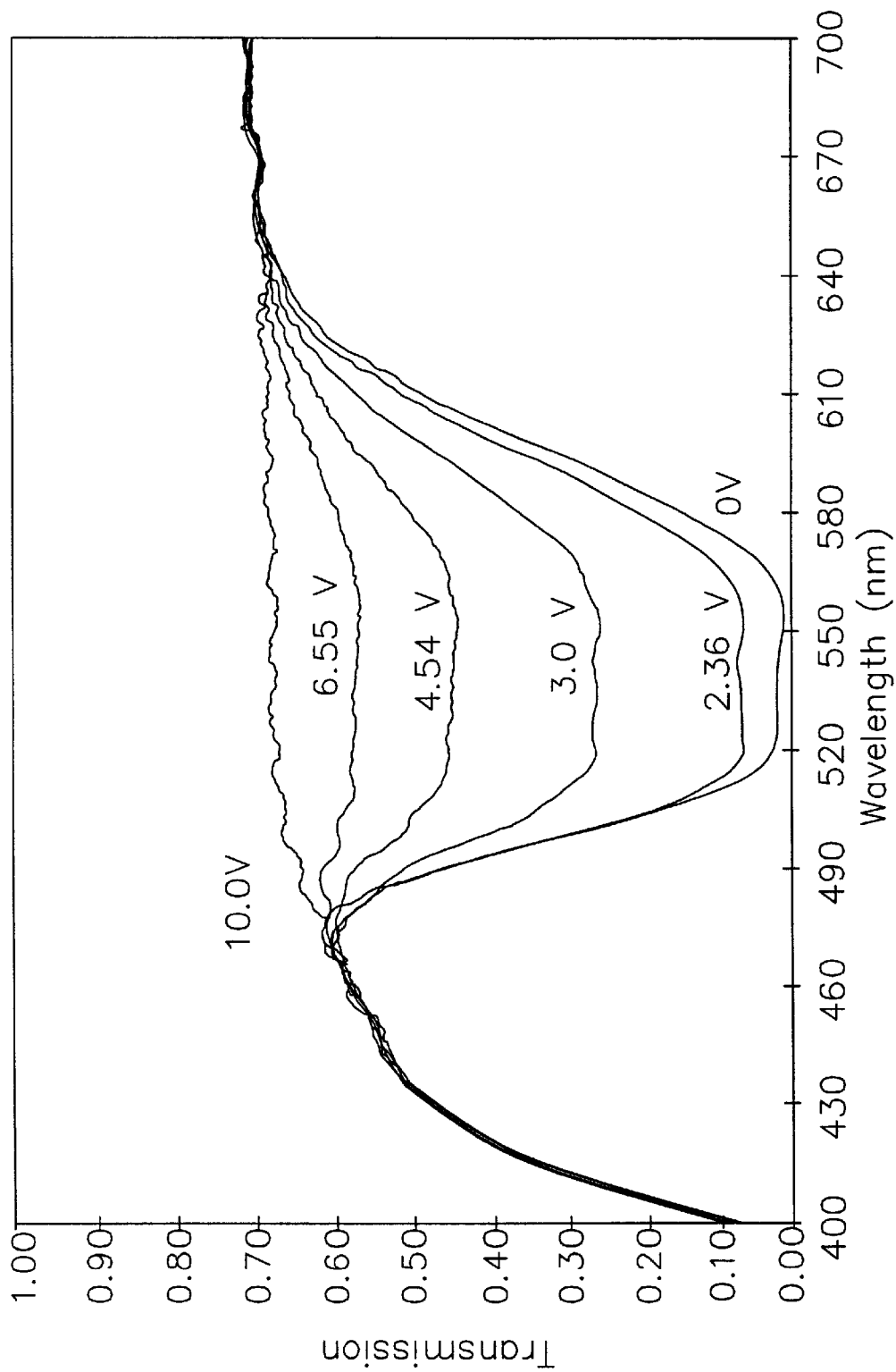
FIG. 14 shows the measured transmission of the W/M filter of FIG. 10 as a function of rms voltage applied to the LCD.

A unique feature of subtractive displays based on this invention is the ability to use an analog LCD for gray level control of the transmission of the modulated light without affecting the transmission of the unmodulated primary. This is illustrated in FIG. 14, which is the experimentally measured output of the W/M filter of FIG. 10. Transmission spectra are shown at different drive voltages. The filter is normally white and therefore fully transmits all wavelengths in the zero retardance state (10 V). As the retardance increases, the transmission of the modulated primary, green, is gradually blocked until it is minimized in the half-wave retardance state (0V). The filter demonstrates independent modulation of green light without affecting the magenta light.

Figure 15:
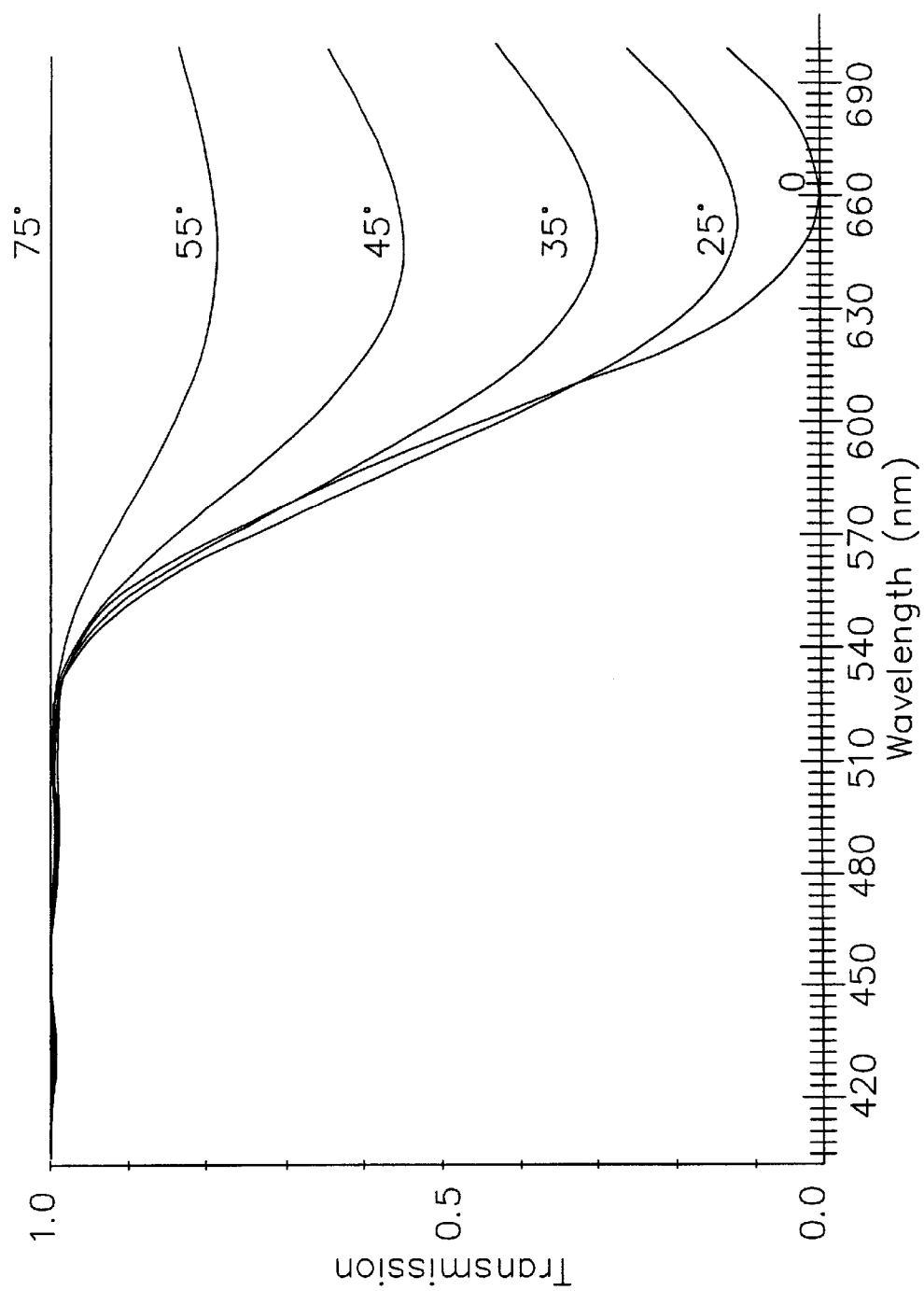
FIG. 15 shows the continuous modulation of a white/cyan filter stage.
Figure 16:
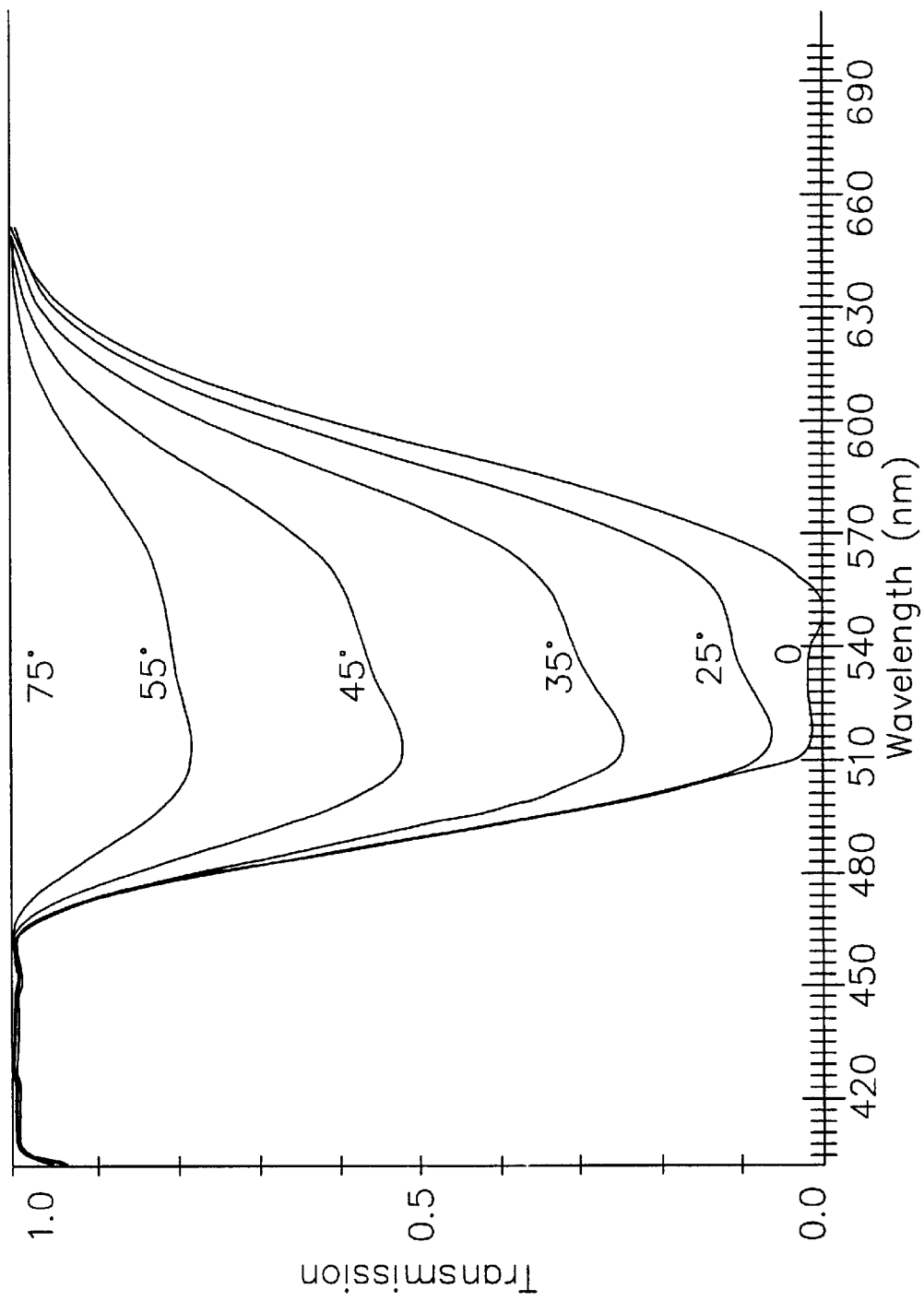
FIG. 16 shows the continuous modulation of a white/magenta filter stage.
Figure 17:
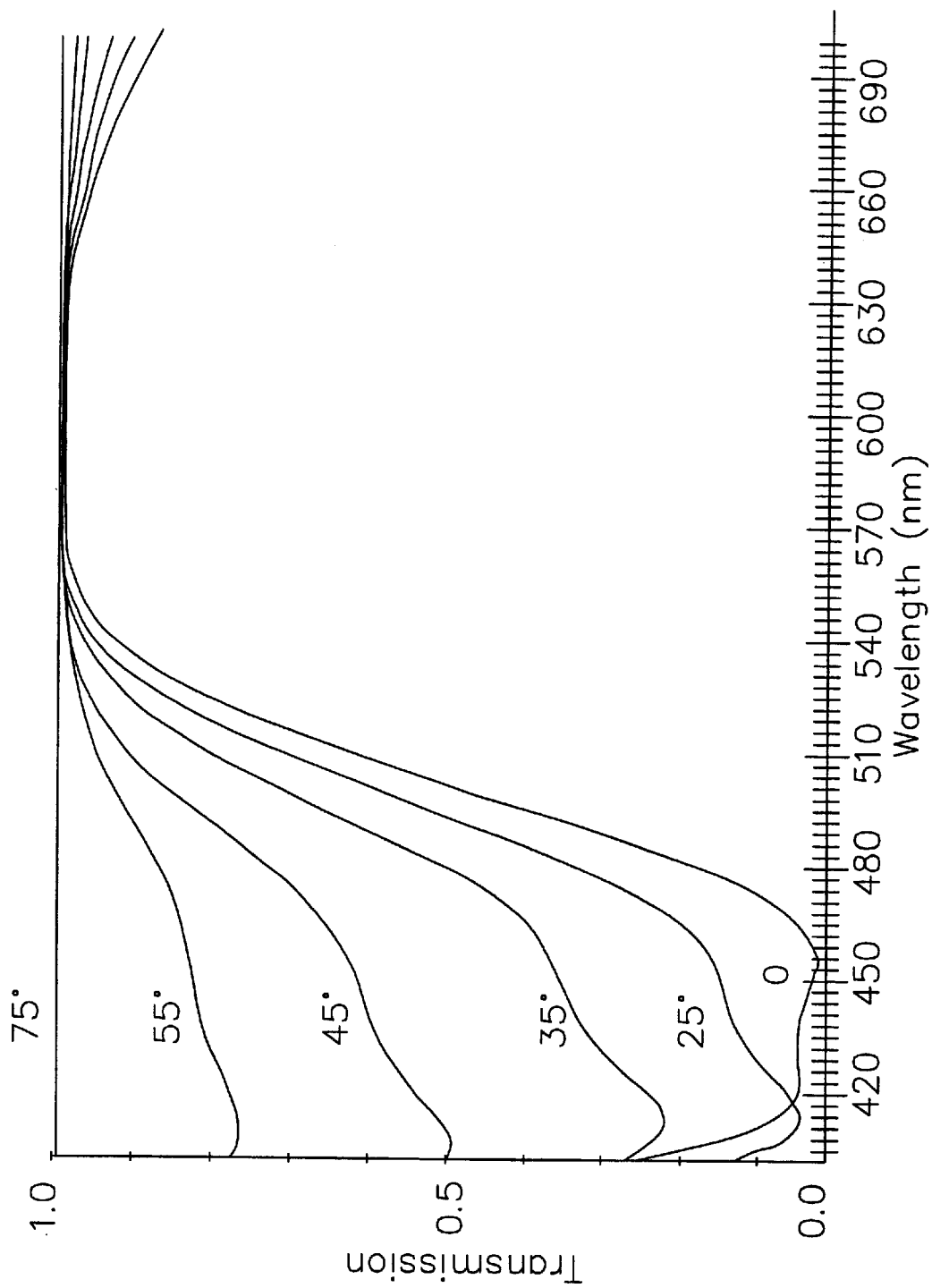
FIG. 17 shows the continuous modulation of a white/yellow filter stage.

Gray scale modulation is further demonstrated in FIGS. 15–17 for W/C, W/M and W/Y filters, respectively, wherein the transmission of the additive primaries R, G and B is controlled with complete independence from the complementary subtractive primaries. The designs of these filters are given in the first three entries in Table VI. The retarders are Nitto Denko polycarbonate films. The optical modulator is a zero-twist nematic oriented at 0°, and continuously variable between zero and half-wave ($\pi$) retardance. The out of plane tilt angle of the nematic is labeled in the spectra, with 0° corresponding to half-wave retardance and 75° corresponding to approximately zero retardance. While 90° would be more nearly zero retardance, it is difficult to achieve this tilt due to surface pinning effects. A passive retarder can be used to compensate for residual retardance.

Figure 18:
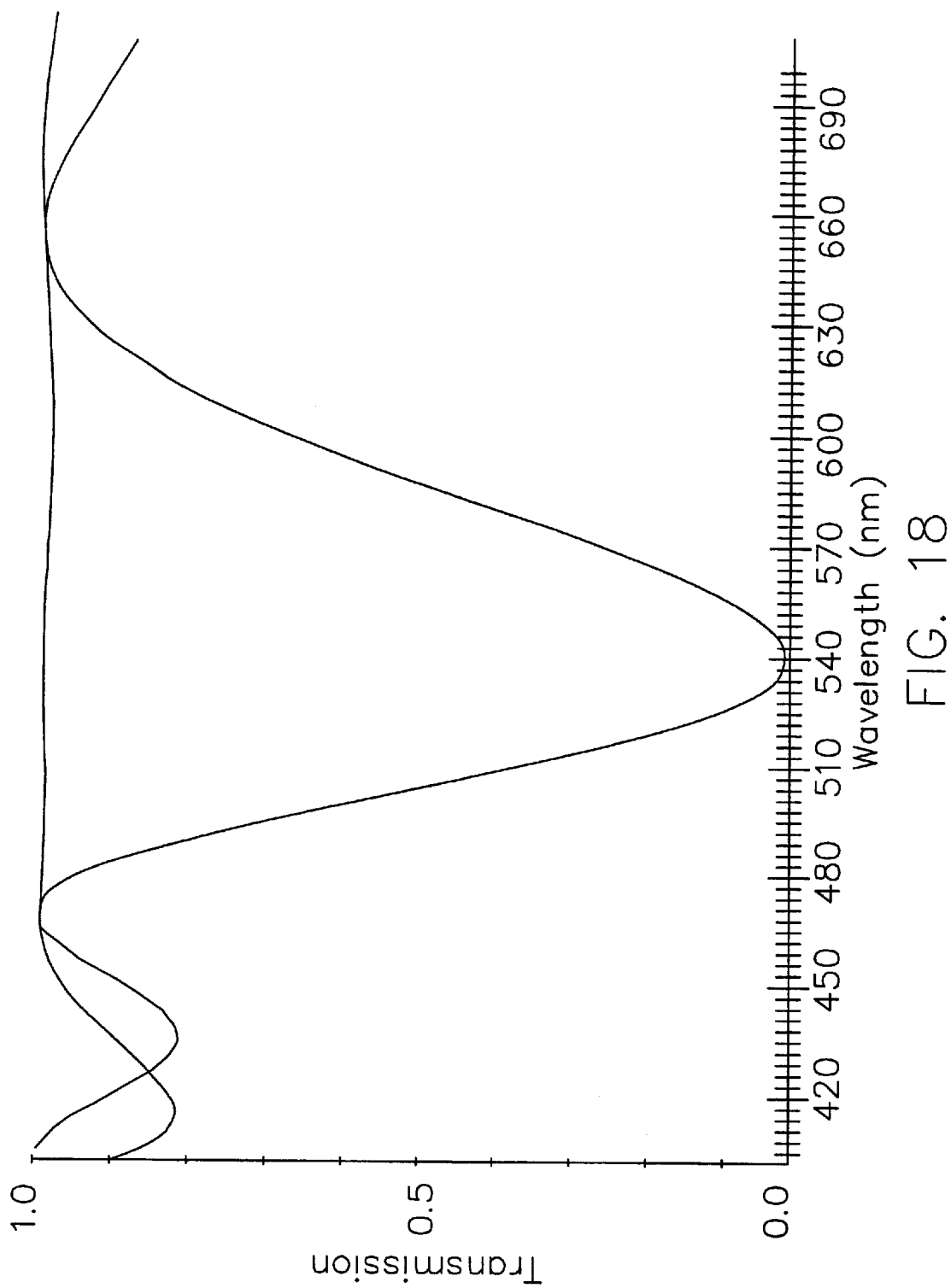
FIG. 18 shows the extreme switching states of a magenta/white filter stage.

A M/W filter is shown in FIG. 18 and listed at the bottom of Table VI. It is a split-element filter with the center retarder included with the first stack. In this filter the LCD is oriented at 90° rather than 0°. For the other filters, the filter function is identical for retarder orientations of 0 and 90°. For the split-element design, because of the asymmetry the spectra are not identical, although both orientations are functional. For this particular filter, evaluation of the two orientations indicated that 90° orientation provides a better output. The filter can be varied continuously between the two extreme switching states shown in FIG. 18. Because this filter is NF, the white spectrum suffers from chromaticity.

A unique characteristic of the subtractive filters of this invention, as shown in FIGS. 15–17, is that the unmodulated spectrum $\overline{F}$ is fully transmitted, independent of the voltage-controlled modulation of the F spectrum. As a result, two or more filter stages can be used in series, each stage providing independent analog control of one additive primary without affecting the other two. A one stage filter has two outputs, an additive or subtractive primary and either black (crossed polarizers) or white (parallel polarizers). A two stage filter can provide four outputs, three primary colors (two additive and one subtractive or one additive and two subtractive) and either black or white. A three stage filter can provide eight outputs, three additive primaries, three subtractive primaries, black and white. If the modulators are analog, the filters can additionally provide gray scales between the color extremes. In a multiple stage filter the chromaticity can be reduced as described in U.S. patent application Ser. No. 08/758,122, filed Nov. 25, 1996, which is incorporated by reference herein in its entirety. A multiple stage filter is also described in U.S. patent application Ser. No. 08/645,580, filed May 14, 1996, which is also incorporated by reference herein in its entirety.

Figure 19:
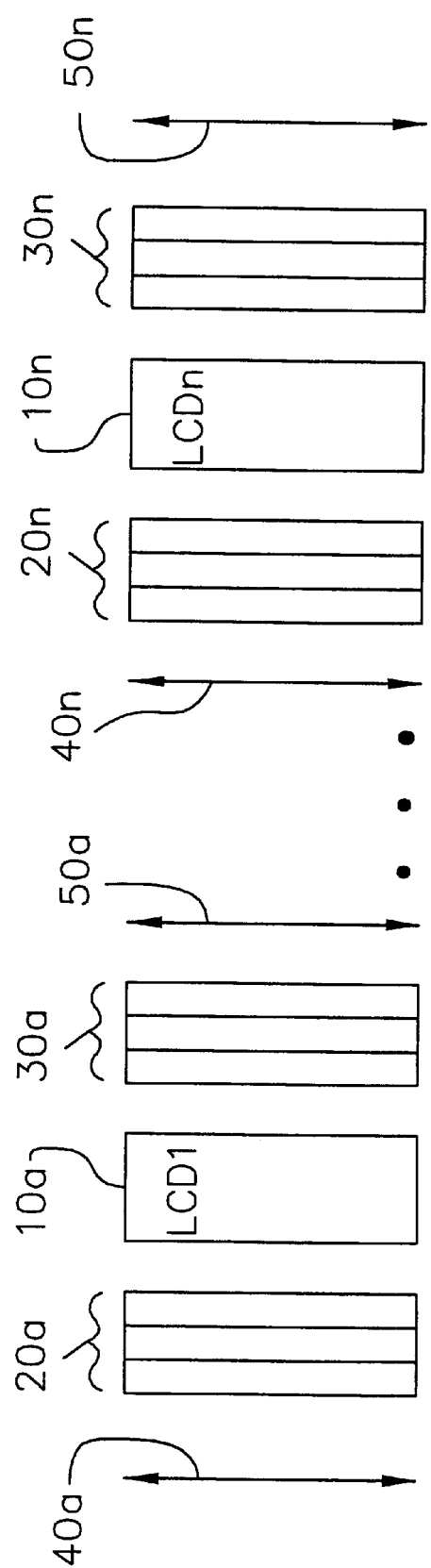
FIG. 19 is a multiple stage filter with polarizers between stages.

The filters can be combined utilizing an entrance and exit polarizer in each stage, as shown in FIG. 19. In this case, the filter output is the product of the outputs of each individual stage. The first stage comprises retarder stacks 20*a* and 30*a*, LCD 10*a*, and polarizers 40*a* and 50*a*. There are n stages with polarizers between each stage, ending with the nth stage comprising retarder stacks 20*n* and 30*n*, LCD 10*n*, and polarizers 40*n* and 50*n*. The output polarizer of each stage serves as the input polarizer for the next. For example, if there were only two stages 50*a* and 40*n* would be the same polarizer.

Figure 20:
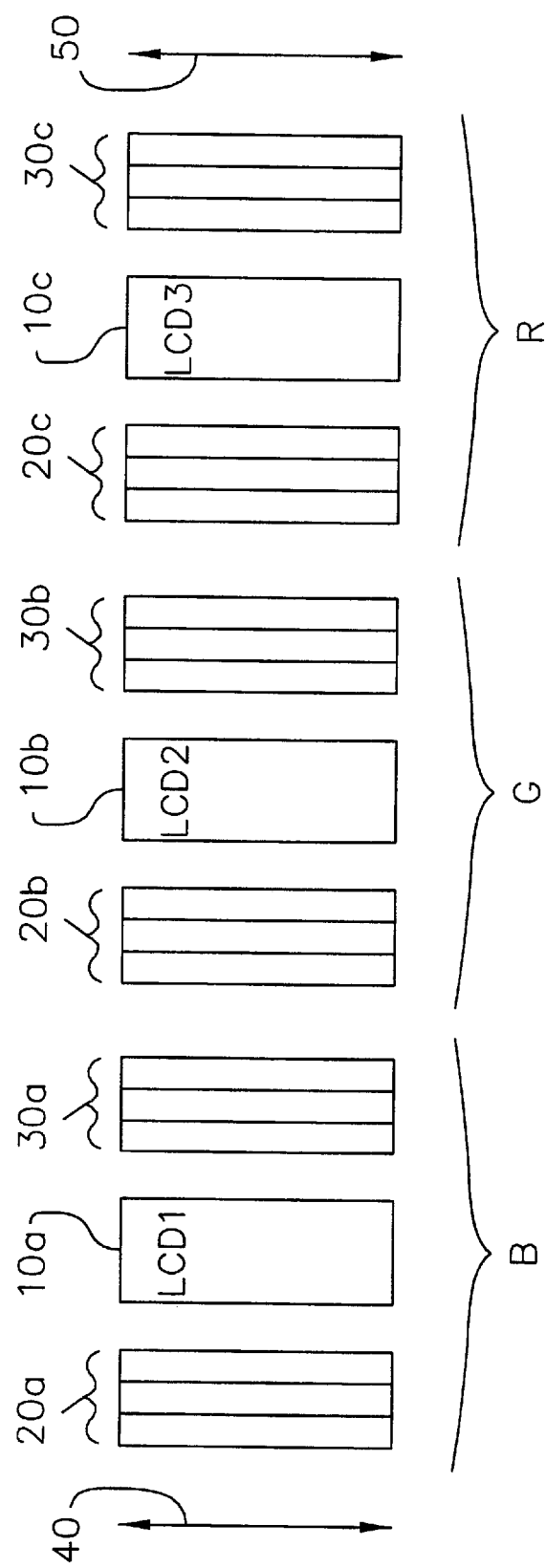
FIG. 20 is a filter comprised of blue, green and red modulating stages with no internal polarizers.

By proper selection of the filter stages and their relative orientations it is possible to combine two or more stages without the need for internal polarizers between the stages, as shown in FIG. 20. Since polarizers can be a major source of light loss, the multiple stage filters without internal polarizers can have significantly increased throughput, particularly for reflection-mode color switches and displays.

The three stage filter of FIG. 20 has stages which independently modulate blue, green and red light, placed between polarizers 40 and 50. In this embodiment, the first stage modulates blue light and is therefore either a W/Y or Y/W filter stage. The stage comprises first retarder stack 20*a*, second retarder stack 30*a*, and LCD 10*a*. The retarder stacks and LCD can be any of the designs of this invention. The second stage, comprising retarder stacks 20*b* and 30*b* and LCD 10b, modulates green light and is therefore a W/M or M/W filter. The third stage, comprising retarder stacks 20c and 30c and LCD 10c, modulates red light and is therefore a W/C or C/W filter.

Figure 21:
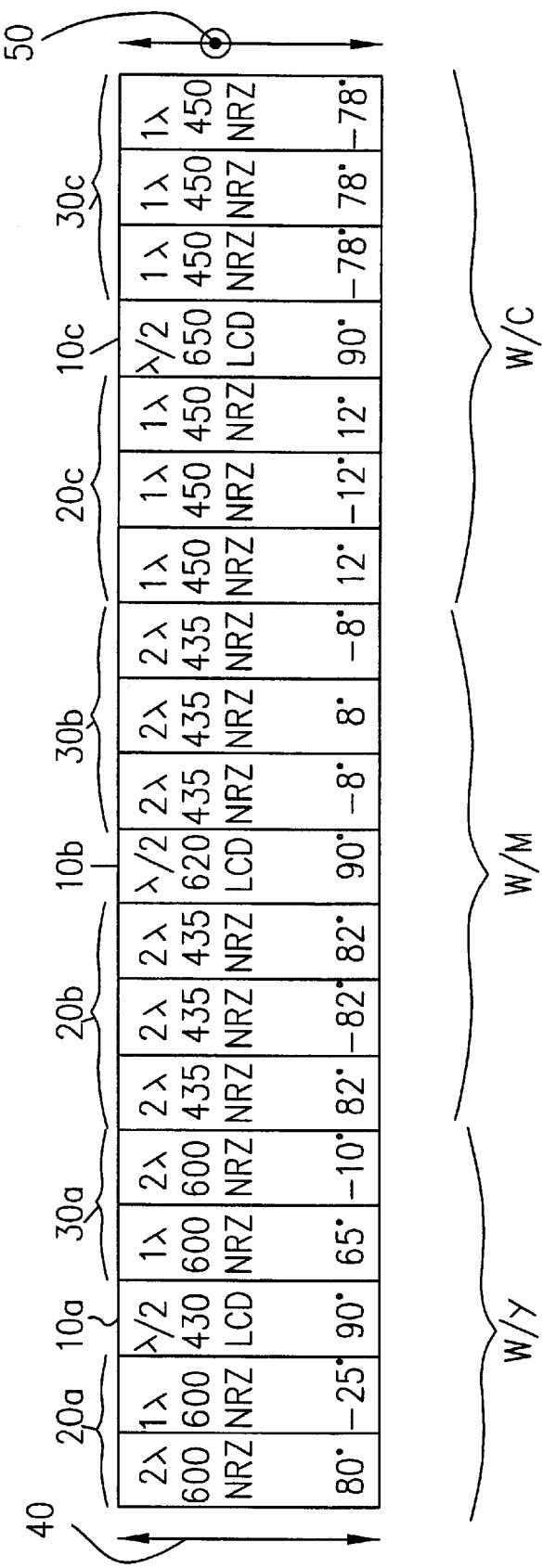
FIG. 21 is a specific three stage filter design.

A specific three-stage filter is illustrated in FIG. 21. These are the same filter stages as FIGS. 9–11, but combined in series without internal polarizers. The output colors are given in Table VII. For each stage a zero refers to the unenergized (modulating) LCD state, and a one refers to the energized (isotropic) state. When all three stages are in their modulating states, the first blocks blue, the second blocks green and the third blocks red, resulting in a black output when used with parallel input and output polarizers. When the third stage LCD is switched to the isotropic state, it no longer blocks red and the filter output is red. When all three LCDs are switched to their isotropic states, the output is white.

The white output can be three times as bright as either a spatially multiplexed filter or display, wherein subpixels of red, green and blue combine to make white, or a temporally multiplexed filter or display, wherein the output of the pixel switches between red, green and blue to make white. In the filter of this invention, the full white spectrum can be transmitted over the entire space and time.

In general, if the polarizers are crossed instead of parallel, the complementary spectrum is obtained. For example, a cyan/white filter with parallel polarizers is instead a red/black filter with crossed polarizers. For the case where three stages are cascaded without internal polarizers, a white state can be achieved even with crossed polarizers. Because no colors are blocked by internal polarizers, the full complementary spectrum is available on the orthogonal axis. The crossed polarizer outputs are included in Table VII. The state (000) gives white instead of black, (001) gives cyan instead of red, and so on.

An advantage of a crossed polarizer filter is the improved optical density of the black state. The black state is output when all three LCDs are in their energized, isotropic, switching states and therefore have minimal chromaticity. It is generally preferable to suffer some loss of throughput in the white state in exchange for increased blocking in the dark state.

Figure 22A:
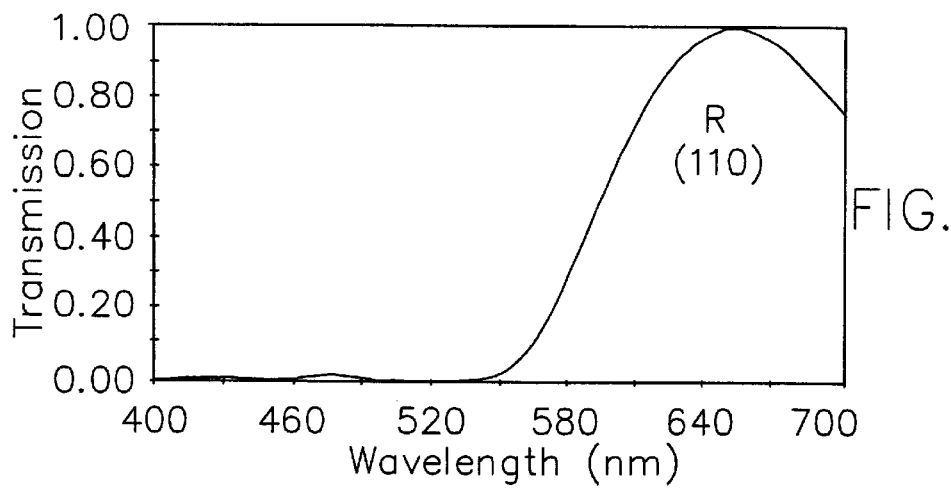
FIGS. 22a–c, is the (a) red, (b) green and (c) blue outputs of the filter of FIG. 21.
Figure 22B:
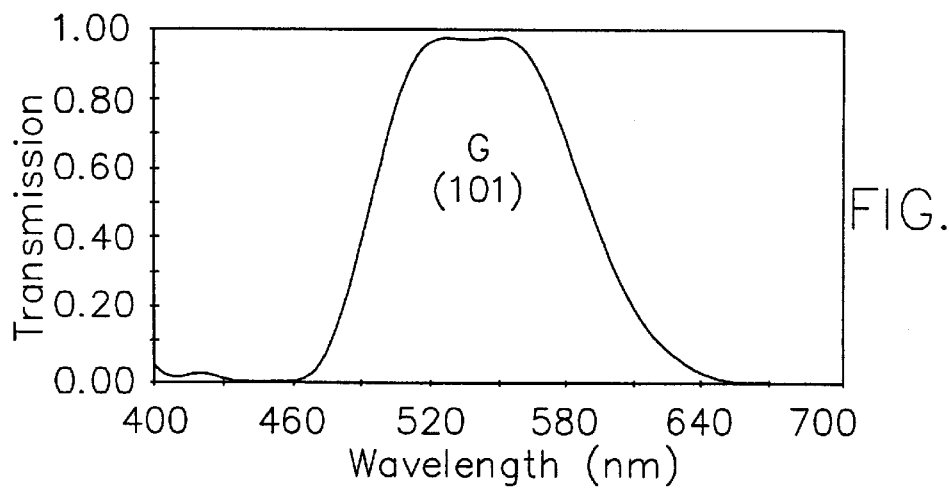
Figure 22C:
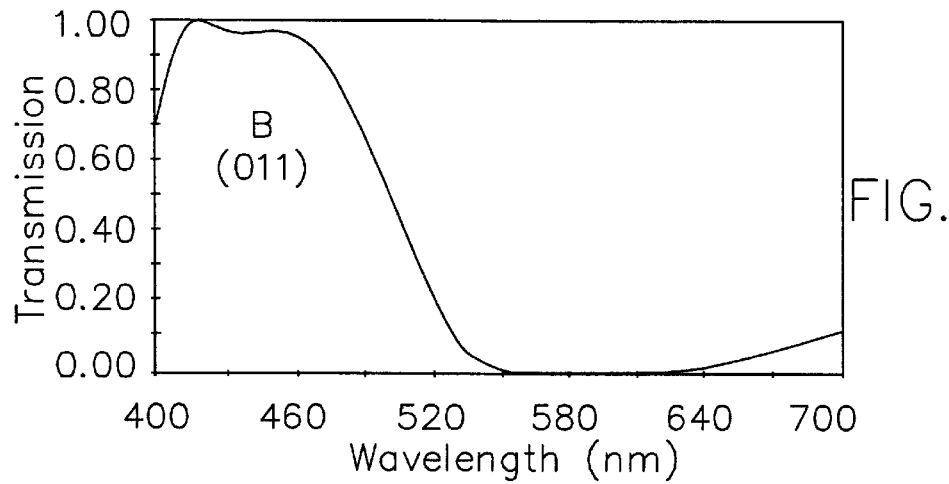
Figure 23A:
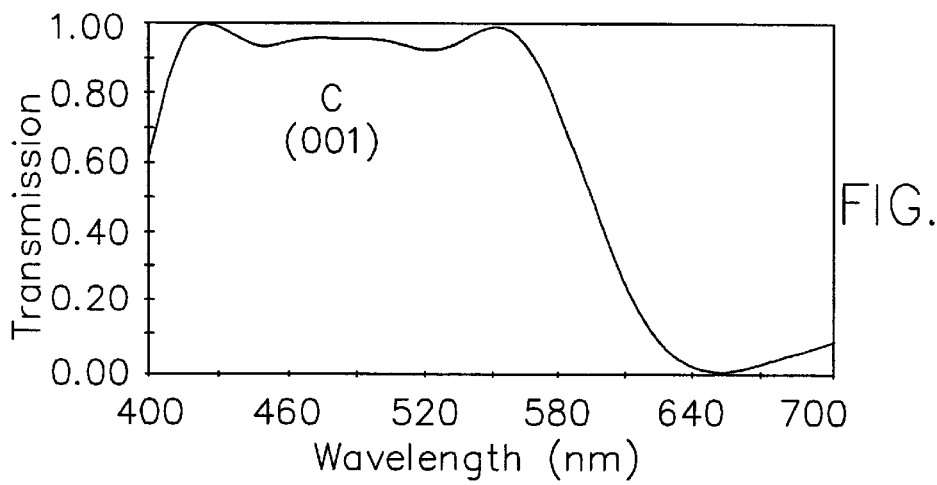
FIGS. 23a–c, is the (a) cyan, (b) yellow and (c) magenta outputs of the filter of FIG. 21.
Figure 23B:
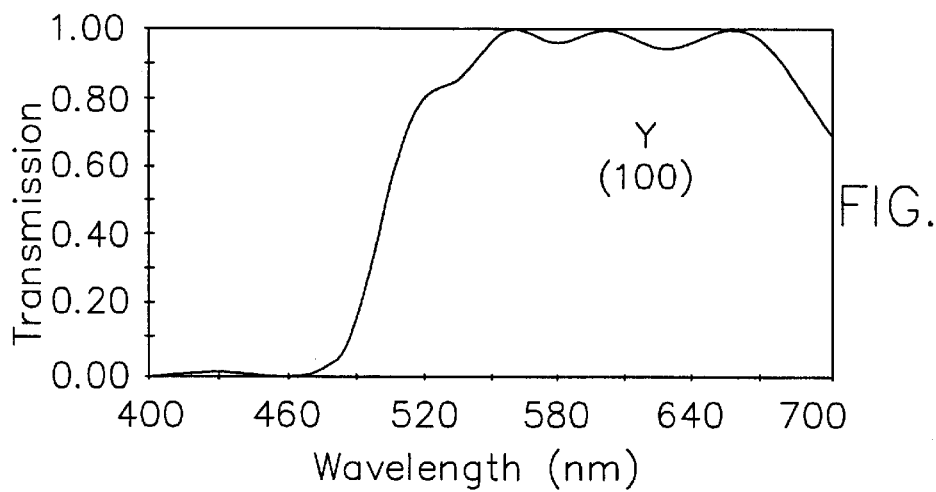
Figure 23C:
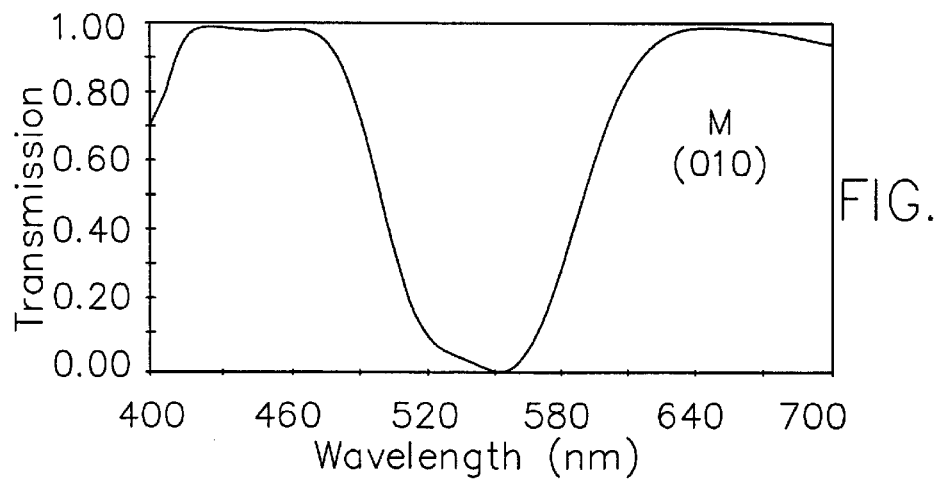
Figure 24:
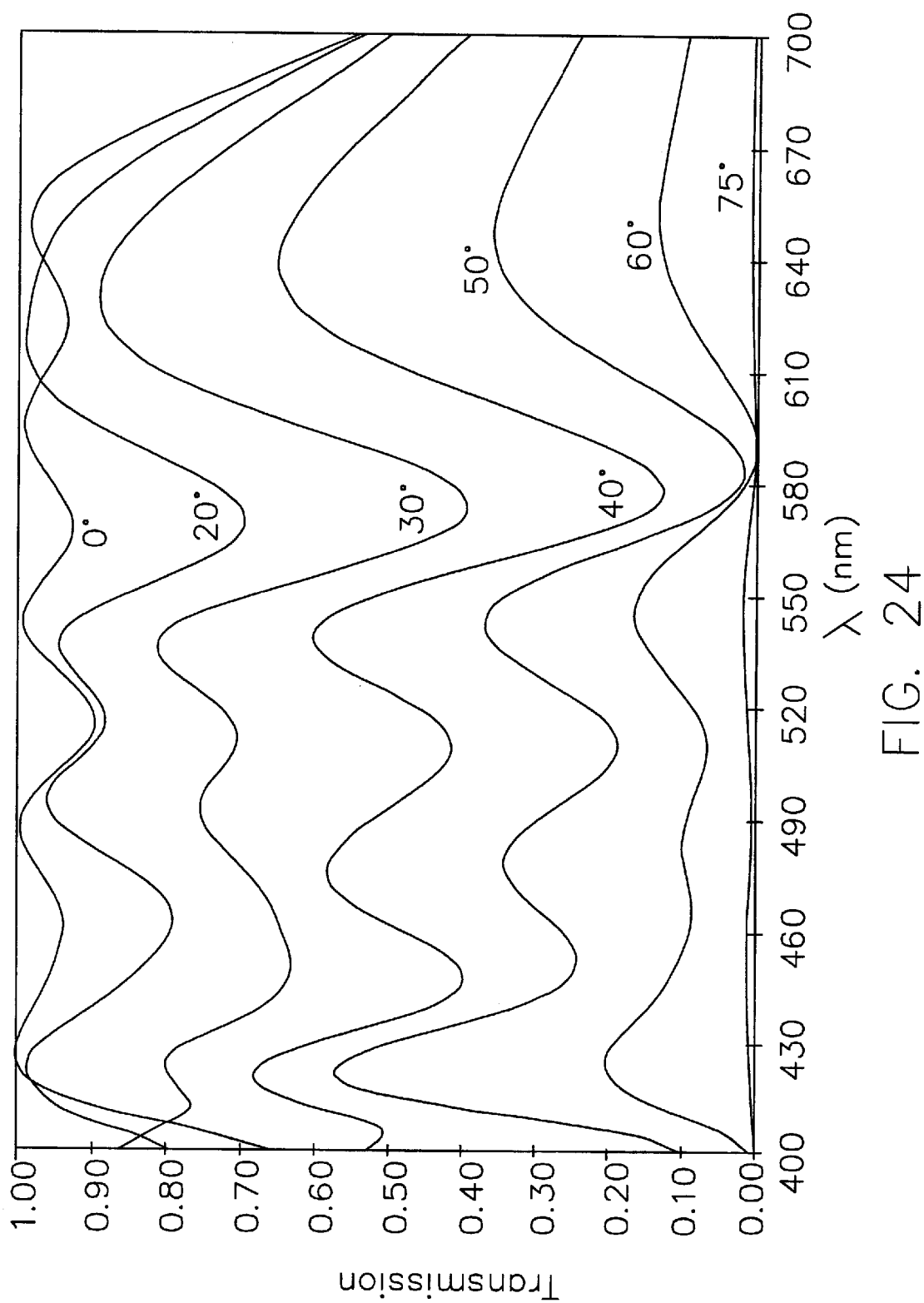
FIG. 24 is white, black and gray scale output of the filter of FIG. 21.

For the filter of FIG. 21 having crossed polarizers, the additive primary outputs are shown in FIG. 22 and the subtractive primaries in FIG. 23. Excellent spectra for all six primaries are provided by a single filter, with analog control of each primary available. In addition, white, black and gray outputs are provided, as shown in FIG. 24. Tilt angles from 0 to 75° are illustrated, corresponding to retardances of $\lambda/2$ through slightly greater than zero. Note the excellent black state achieved. To achieve gray scale modulation over the entire visible spectrum, as shown in FIG. 24, the tilt angles of all three LCDs are varied simultaneously.

Figure 25A:
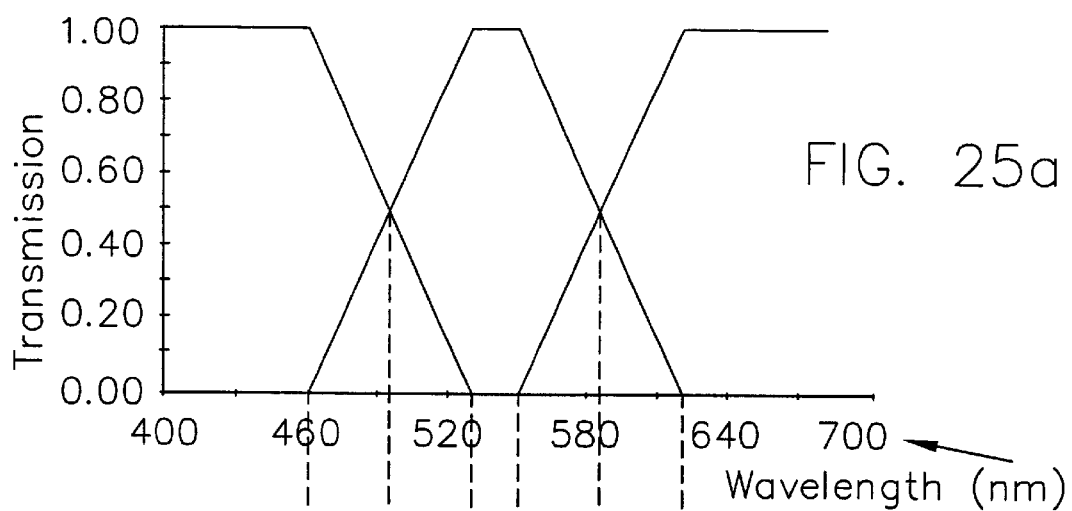
FIGS. 25a–c, shows (a) red, green and blue transmission spectra of a three stage filter, and the dark states achieved with (b) polarizers between stages and © no internal polarizers.

Eliminating internal polarizers, can improve the black state with parallel polarizers, by allowing the stacks to cooperate in blocking the inter-primary bands. Alternatively there is less ripple on the white state with crossed polarizers. To see this, consider a subtractive display or color shutter consisting of a stack of C/W, M/W, and Y/W switches. Arbitrarily, take the transition band of the yellow and magenta stages, and that of the magenta and cyan stages to overlap at the half-maximum transmission points. The individual additive primary spectra are illustrated in FIG. 25a.

Figure 25B:
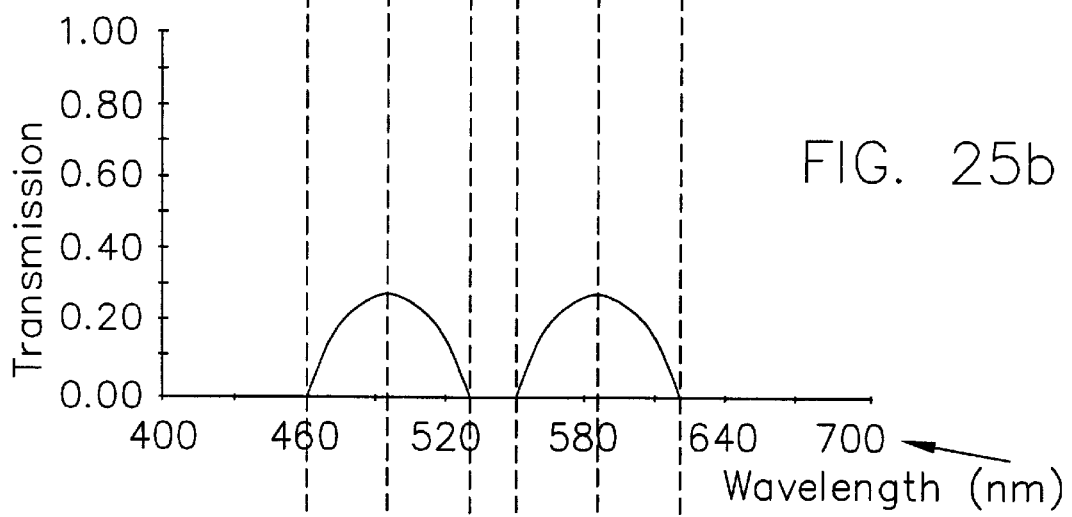

Initially, consider the case with parallel neutral polarizers between each switch, as shown in FIG. 19. Since neutral polarizers separate the stages, the dark state is the product of the C, M and Y spectra produced by each stage. Since the spectra overlap at the half-maximum maximum, the leakage at the center of the transition band is 25%, as shown in FIG. 25b. This, depending on the characteristics of the source spectrum, can represent a significant loss in density of the dark state. It also represents a blue/green side-lobe of the red output and a yellow side lobe of the blue output.

There are solutions that reduce the level of these inter-primary leakages. For instance, the region of overlap can be reduced by shifting the color polarizer spectra further apart. In order to ensure that, for instance, green is fully passed by the yellow stage and blue is fully passed by the magenta stage, this often means that the transition slope must be increased. This represents additional retarders, and the associated cost. Alternatively, light in the inter-primary bands can in principle be removed using passive notch filters. This also represents additional filtering, along with the associated insertion loss and cost. An even better solution, but not often viable, is to use a source that simply emits no light in the inter-primary bands.

Figure 25C:
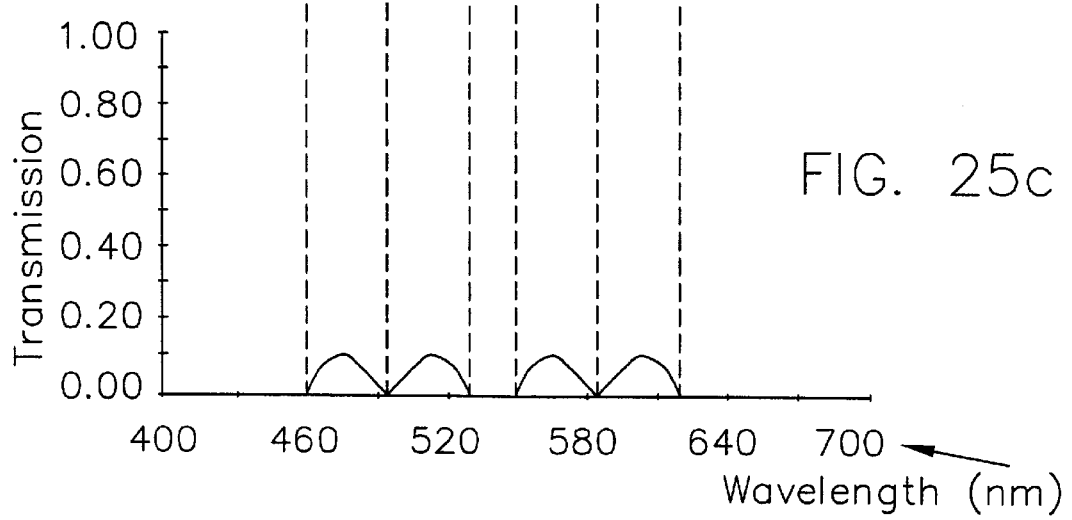

Another approach to the problem is to remove the polarizers between the stages, as illustrated in FIG. 20. An additional payoff is the elimination of the loss associated with two neutral polarizers. The challenge is to identify a scheme whereby the stacks work together to improve the rejection in the inter-primary bands, rather than to compound the problem. The solution can be illustrated by considering the state of polarization of light at the half-max overlap wavelengths between yellow and magenta or magenta and cyan stages. Light exiting either stack is in general polarized intermediate between the orthogonal linear states at the overlap wavelengths. This represents the set of polarization states that have arbitrary ellipticity, with polarization ellipse orientation of ±45 degrees. Provided that the two stacks are compatible and are properly oriented, the polarization transformations from the two stacks can be cumulative, thereby orthogonally polarizing the half-max overlap wavelength. For instance, if two stacks function as circular polarizers at the half-max overlap wavelength, a combined retardance of half-wave can be achieved. This produces the desired null in the transition band. FIG. 25c shows that the result is an improvement in optical density over the output of FIG. 25b using additional polarizers. Any of these filters can also be combined in series with a shutter to provide a good dark state.

Figure 26:
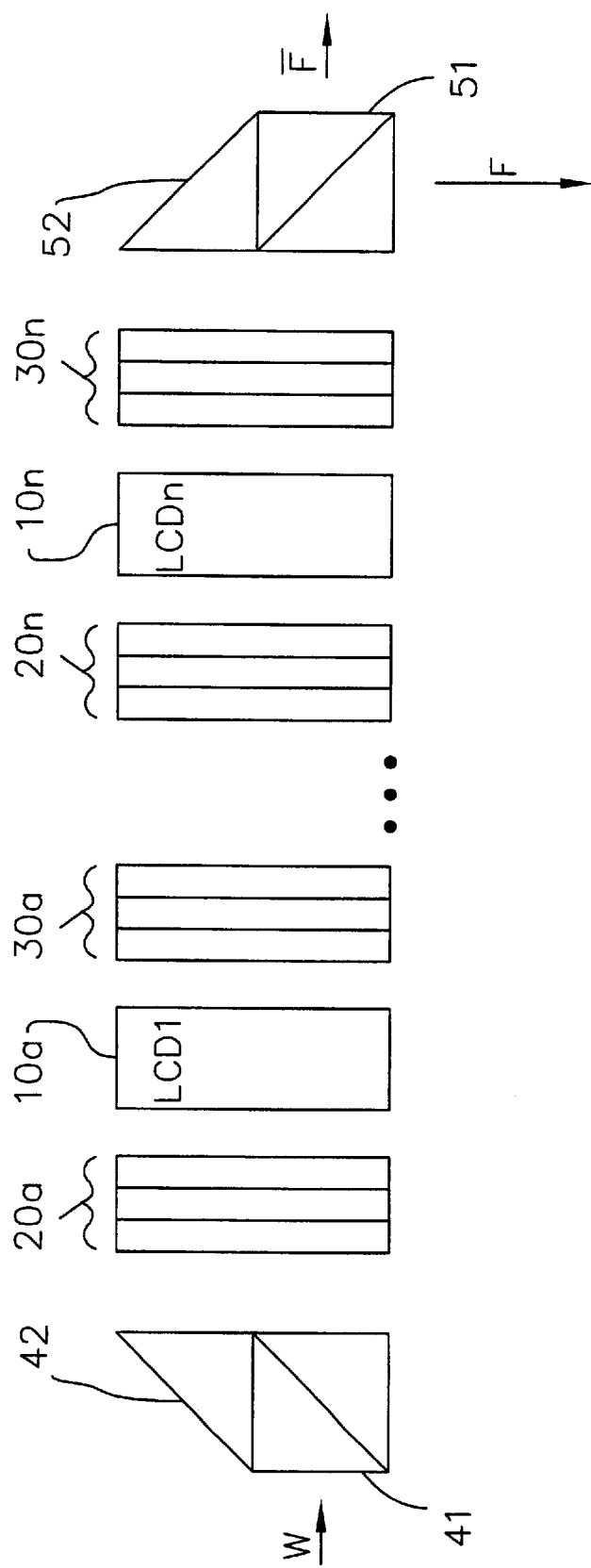
FIG. 26 is a polarization independent multistage filter.

As described above, in the multiple-stage filter without internal polarizers the full complementary spectrum is available, enabling the use of crossed polarizers. This feature also allows polarization diversity filtering, as shown in FIG. 26. In polarization diversity filtering the input and exit polarizers are replaced by polarization separators and combiners. Unpolarized white light is incident on polarizing beam splitter 41. One linear polarization is transmitted and the orthogonal polarization is reflected up to prism 42. The two orthogonal polarization states propagate independently through the structure and are recombined by exit prism 52 and polarizing beam splitter 51. For light in both beam paths, the modulated spectrum exits in one direction, for which the input and exit polarizations are parallel, and the complementary crossed polarizer spectrum F exits in another direction. In the polarization insensitive filter, rather than losing half the incident light due to absorption by an entrance polarizer, all of the incident unpolarized light is filtered. This eliminates the 3 db loss in efficiency generally associated with polarization based systems. The filter having polarizing beamsplitters it is particularly suited to small aperture applications. Large apertures can be achieved with polarizing films that give polarization diversity.

Figure 27:
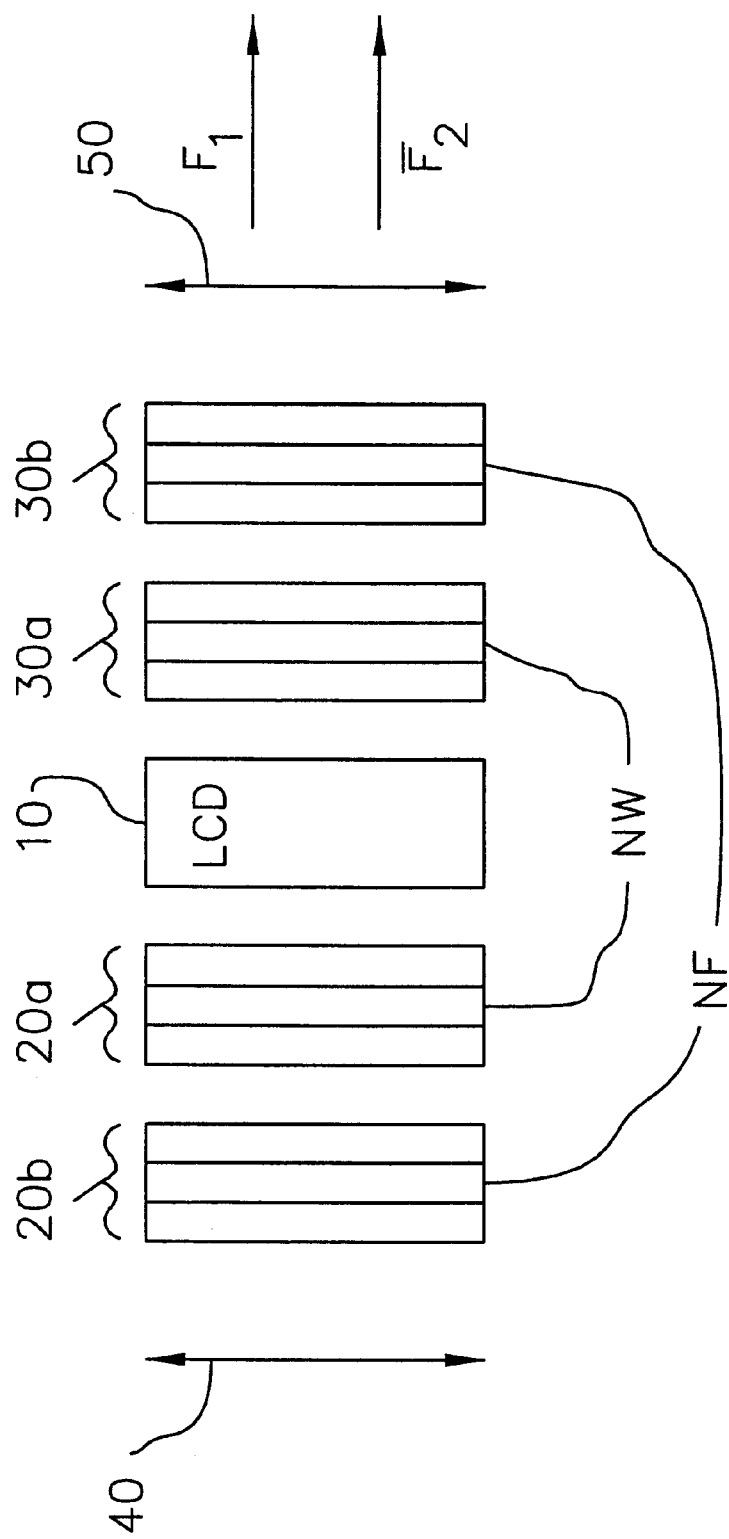
FIG. 27 is a filter having nested polarization stacks.

Multiple stage filters have been demonstrated using filter stages in series. In addition, it is feasible to modulate between two independent spectra by nesting retarder stacks within a single stage, as shown in FIG. 27. This is done by orienting one stack to be NW and the other to be NF. Stacks 20a and 30a in combination with LCD 10 form a NW filter which modulates spectrum $F_1$, thereby transmitting white when the LCD is energized (anisotropic) and $F_1$ when it is unenergized. Stacks 20b and 30b in combination with LCD 10 form a NF filter which modulates $F_2$, thereby transmitting $\overline{F}_2$ when the LCD is energized and white when it is unenergized. The nested stacks therefore transmit $\overline{F}_2$ when the LCD is energized and $F_1$ when it is unenergized. Such structures can be stacked with or without intervening polarizers, and combined with any other passive or active filtering.

Reflection mode switches can be implemented by simply following any transmission mode structure with a mirror. Alternatively, structures can be designed specifically for reflection mode operation. In addition to the design rules described previously for white/primary switches, reflection mode filters have additional symmetry requirements. Consider a design in which a single stack precedes an LCD, followed by a mirror. The unfolded version consists of two stacks, in which both stack effectively have the same orientation. A solution involving neutral polarization optics can be used to create an effectively different orientation of the second stack. For instance, an achromatic quarter-wave plate can be placed on the mirror to make the second pass through the stack to appear at a different orientation. However, this changes the action of the LCD, as the second pass through the LCD also appears to have a different orientation. Also, the additional half-wave of retardance inverts the spectrum, making subtractive-primary switches additive-primary switches and vice-versa.

If the LCD follows the achromatic quarter-wave plate, then the desired condition of doubling the action of the LCD is achieved. However, the quarter-wave plate transforms the state of polarization on the LCD, so that the combined stack may not provide isotropic/modulation states to the modulator. In order to solve this problem, either a different modulator can be used that is more compatible, or a different stack design can be employed. A solution involving the former is to use a rotative element, such as a CSLC quarter-wave retarder on the mirror. The overall modulator thus has the structure of the quarter-half-quarter variable retarder as described in U.S. Pat. No. 5,381,253, which is incorporated by reference herein in its entirety. If the modulator must remain a zero-twist nematic, then the stack design must be modified in order to provide appropriate isotropic/ modulation states to the modulator when combined with an achromatic quarter-wave plate.

Figure 28:
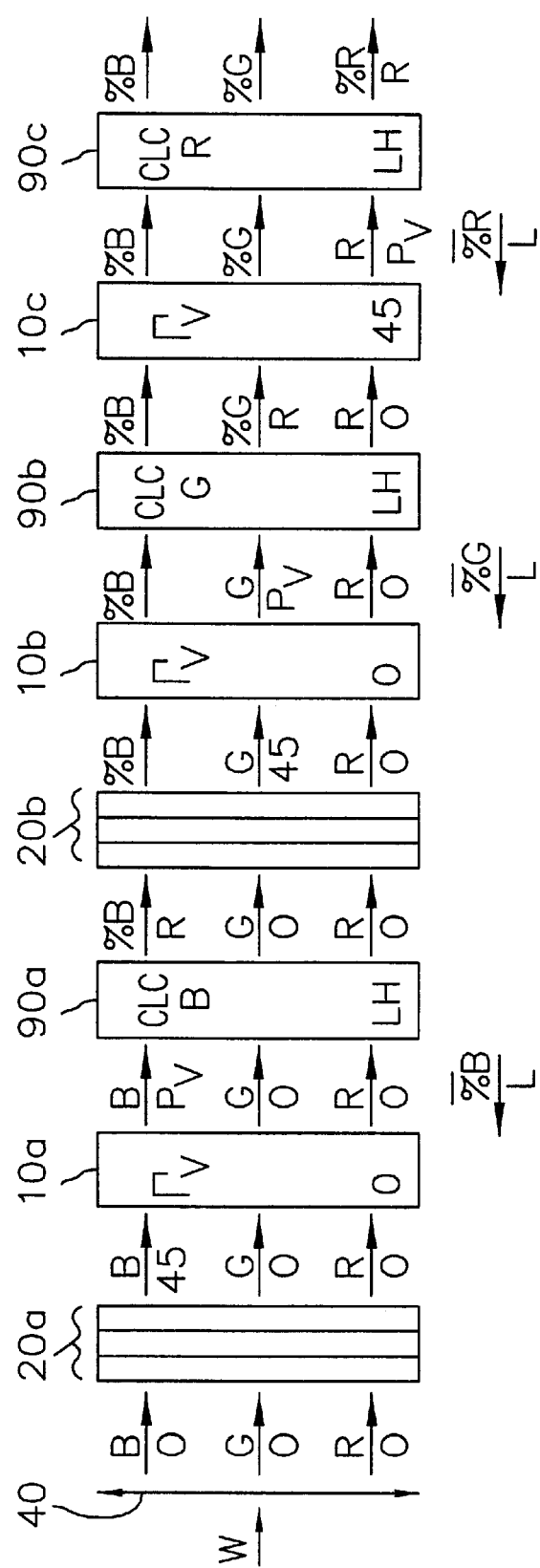
FIG. 28 is a three stage filter employing cholesteric liquid crystals for the polarization analyzers.

For the case where the analyzing polarizer is a CLC, a multiple stage filter can be designed for both transmission and reflection mode, as shown in FIG. 28. The first stage modulates blue light and comprises stack 20a, electro-optic modulator 10a and blue CLC 90a. The second stage modulates green light and comprises stack 20b, electro-optic modulator 10b and green CLC 90a. The third stage modulates red light and comprises electro-optic modulator 10c and red CLC 90c. Because the red CLC is isotropic to blue and green light, by orienting electro-optic modulator 10c so that the red light is in the modulation state, the final stage does not require a retarder stack. In the first stage, depending on the variable retardance $\Gamma_v$, a percentage of the blue light, labeled % B, is transmitted and the remainder is reflected. The reflected light is indicated by the arrows below the device structure. Because only the blue CLC selectively reflects blue light, i.e. the green and red CLCs are isotropic to blue light, the polarization of the blue light is irrelevant after this stage. The second and third stages likewise reflect and transmit portions of the green and red light.

The filters of this invention can be used in combination with any other active or passive filter. Hybrid filters can also be made with active and passive filters. For example, instead of a neutral polarizer the filter can employ a color polarizer, such as a dye type color polarizer or a polarizer retarder stack (PRS) color polarizer. In this case the "white" state contains only the wavelengths passed by the color polarizer. The white/primary filter can also be combined with a polarization interference filter.

The filters of this invention can be optically addressed. For example, the optical addressing system can include a photodetector such as a PN diode or a phototransistor which detects an optical signal, and can control the filter output in response to the optical signal. Applications of the optically addressed filter include eye protection, welding shields and color shutter glasses for 2D and 3D display of data.

The filters can be used as a single pixel or in a multi pixel array. Single pixel applications include field sequential color shutters, spectrometry, colorimetry, lighting (home, house, stage) spectroscopy and fiber optic communication. Multiple pixel applications include information display, imaging, printing, analysis and storage and communication. In multiple pixel arrays, each pixel can be controlled independently via an independent applied voltage. Each pixel can provide analog intensity control of all three additive or subtractive primaries simultaneously, thereby providing the full color spectrum, including black and white.

For compatibility with existing devices, the pixels can have subpixels for each color, for example W/R, W/G and W/B pixels. The subpixels can be patterned, for example, in stripes or square patterns such as the Bayer Mosaic or other color filter array patterns (CFAs). Each pixel of this invention comprised of subpixels has the advantage over prior spatial multiplexed filters that each subpixel can transmit the entire white spectrum rather than only one third of it, thereby increasing the white brightness by a factor of three.

Display applications include front and rear projection displays, virtual displays and direct view displays. Displays can be used in a variety of applications, such as head-up displays in transportation vehicles including automobiles, trucks and airplanes, boardroom projectors, desktop computing, home theater, stage lighting, handheld games, arcade games (3D and 2D), laptop displays, handheld pagers, personal display assistants, global positioning displays, instrumentation such as oscilloscopes and spectrum analyzers, web browsers, telecommunicators, head-mounted displays and displays brought to the eye for virtual reality, augmented reality, portable wearable computers, simulators, camcorders and display glasses, goggles or shutters.

For display applications, the multi pixel filter can be used in combination with emissive displays such as cathode ray tubes (CRT), electroluminescent (EL) displays, active matrix electroluminescent (AMEL) displays, field emission displays (FED) and plasma displays. They can also be used with modulator displays including transmissive displays such as TFT-LCD and polysilicon LCD, reflective displays such as liquid crystal on silicon (LCOS), digital mirror devices (DMDs) and diffractive grating devices, and passive matrix displays such as STN devices.

Electronic imaging applications include pagefed and document scanners, internet cameras and document scanners, digital cameras for studio photography, microscopy, multispectral imaging, documentation such as photo-ID cameras, amateur electronic photography, and other applications including fluorescence spectrometry, colorimetry, and medical imaging used with for example endoscopes and other medical diagnostic equipment.

To form imaging devices, the filter of this invention can be combined with still or video cameras using Charged Coupled Devices, Charge Integrating Devices or Complementary Metal Oxide Semiconductor single pixel or multi-pixel imagers.

Figure 29:
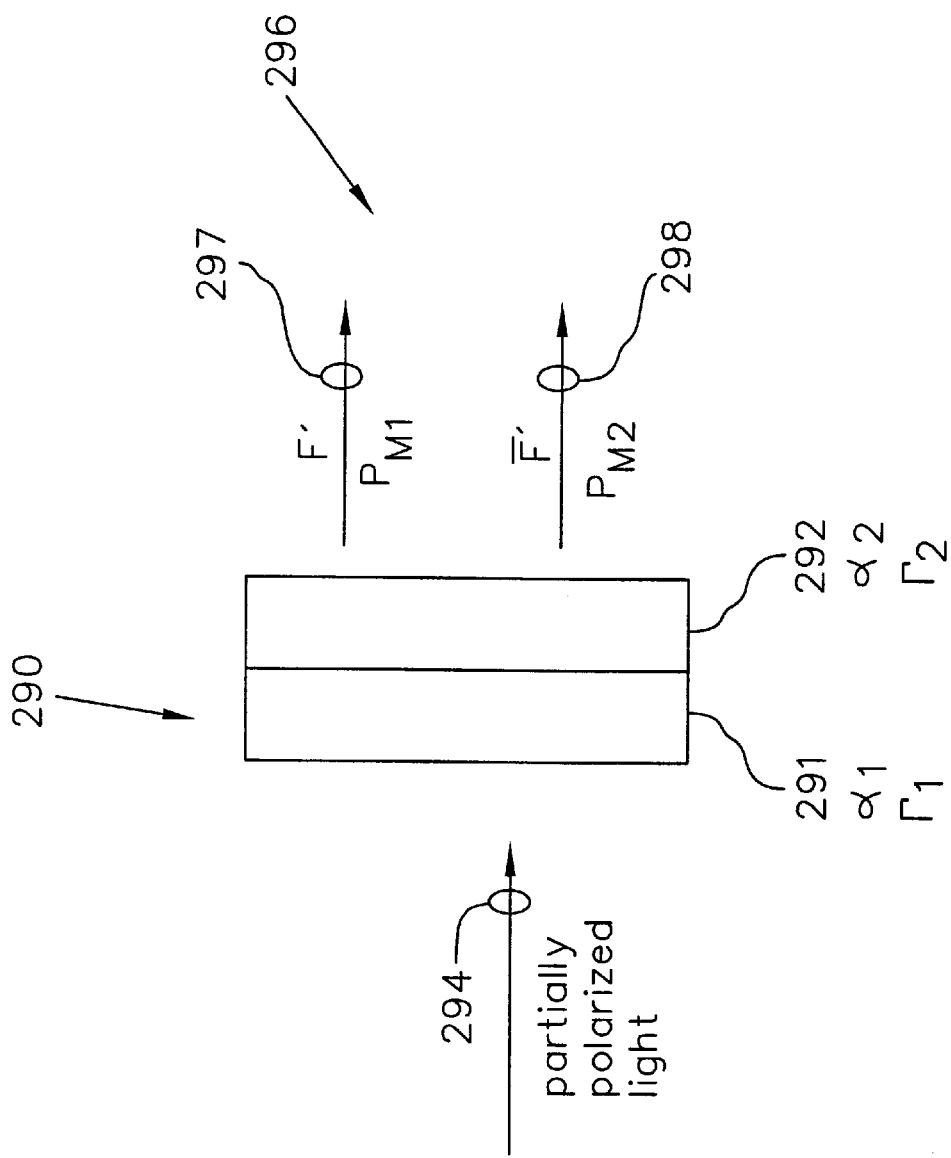
FIG. 29 shows a stack which includes a first and second retarder having a fist and second orientation, as well as a first and second retardance.

FIG. 29 shows a stack 290 which includes a first retarder 291 and a second retarder 292 having a first orientation $\alpha_1$ and a second orientation $\alpha_2$, respectively, as well as a first retardance $\Gamma_1$ and a second retardance $\Gamma_2$, respectively. FIG. 29 shows partially polarized light 294 input to stack 290. Partially polarized light 294 can be in any frequency spectrum of electromagnetic radiation and can be partially elliptically polarized with any ellipticity, orientation, or handedness. Partially polarized light consists of a polarized and an unpolarized component. The unpolarized component is passed unchanged. In the Figures, we refer to the action of the elements acting on the polarized component of the light. The polarized component can have any polarization, including any orientation ellipticity, and handedness. See, for example, Chapter 1 of "Optical Waves in Layered Media" Copyright 1988, John Wiley & Sons, New York, incorporated by reference herein. By partially polarized light it is meant light which is not completely unpolarized.

Stack 290 transforms partially polarized light 294 in a known manner depending on the values of first and second orientations $\alpha_1$ and $\alpha_2$ as well as first and second retardances $\Gamma_1$ and $\Gamma_2$. First and second orientations $\alpha_a$ and $\alpha_2$ are measured with respect to the polarization of partially polarized light 294. If partially polarized light 294 is elliptically polarized, then $\alpha_1$ and $\alpha_2$ can be defined either the axis of the input or output polarization ellipse.

Stack 290 transforms partially polarized light 294 into second polarization transformed light 296. In particular, partially polarized light 294 is received by first retarder 291 and is transformed into initially transformed light (not shown). The initially transformed light output from first retarder 291 is then input to second retarder 292. Second polarization transformed light 296 includes a first portion of light 297 and a second portion of light 298. First portion of light is 297 has a first polarization $P_{M1}$ and second portion of light 298 has a second polarization $PM_2$. Also, first portion of light 297 has a first spectrum F' and second portion of light 298 has a second spectrum $\overline{F}'$.

Stack 290 is a light preconditioning device for preconditioning light as an input to some type of light modulation device (not shown). In a special case, first spectrum F' and second spectrum $\overline{F}'$ can be complements of each other and together comprise the spectrum of partially polarized light 294, and accordingly correspond to spectrum F and complementary spectrum $\overline{F}$ of FIG. 1. First spectrum F' has first polarization $P_{M1}$ which is modulated more than second spectrum $\overline{F}'$ with second polarization $P_{M2}$. Once partially polarized light 294 is provided, and the modulator (not shown) characteristics are known, first orientation $\alpha_1$ and first retardance $\Gamma_1$, as well as second orientation $\alpha_2$ second retardance $\Gamma_2$ can be determined in accordance with the above discussion. Additional retarders can be added to stack 290 to achieve specified performances as discussed above.

In a special case, first output light 297 has a polarization $P_{M1}$ which is affected or modulated by the modulator, whereas second output light 298 with polarization $P_{M2}$ is not modulated by the modulator as discussed, for example, with reference to FIG. 1 and elsewhere. Throughout the discussion that follows, the term orthogonal when referenced to states of polarization does not necessarily refer to two linear states that are perpendicular to each other, but instead refers generally to any two polarization states including elliptical polarization states which have the following property. If a first polarizer has a first eigenstate corresponding to the first polarization and a second polarizer has an eigenstate corresponding to the second polarization and if unpolarized light is input to the first polarizer and the second polarizer, no light is output from the second polarizer. That is, the first and second polarizers are "crossed" in a general sense. Hence, in the special case of linearly polarized light, the first polarization and the second polarization are orthogonal when they are perpendicular. In the special case of circularly polarized light, the first polarization and the second polarization are orthogonal when the handedness of the first polarization is opposite the handedness of the second polarization, i.e., the first polarization could be clockwise and the second polarization could be counter clockwise, or vice versa. Finally, in the case of elliptic polarization (of which circular polarization is a special case), the first polarization would have a major and minor axes that are respectively perpendicular to the major and minor axes of the second polarization.

Referring back to FIG. 29, first polarization $P_{M1}$ and second polarization $P_{M2}$ cannot be equal and may or may not be orthogonal. Partially polarized light 294 may or may not be visible light. As discussed above, stack 290 and in particular, first retarder 291 and second retarder 292 can be polymer retarders, liquid crystal polymer retarders, form birefringent material, polymer birefringent retarders, liquid crystal polymer retarders, birefringent- crystals, liquid crystals, etc. Stack 290 can and does include all the possible materials and retarders discussed above with respect to stack 20 of FIG. 1. Hence, first orientation $\alpha_1$ and second orientation $\alpha_2$ are not equal, but first retardances $\Gamma_1$ and second retardance $\Gamma_2$ may or may not be equal depending on the polarization of partially polarized light 294 and the desired polarization $P_{M1}$ and $P_{M2}$ of first output light 297 and second output light 298, respectively.

Figure 30A:
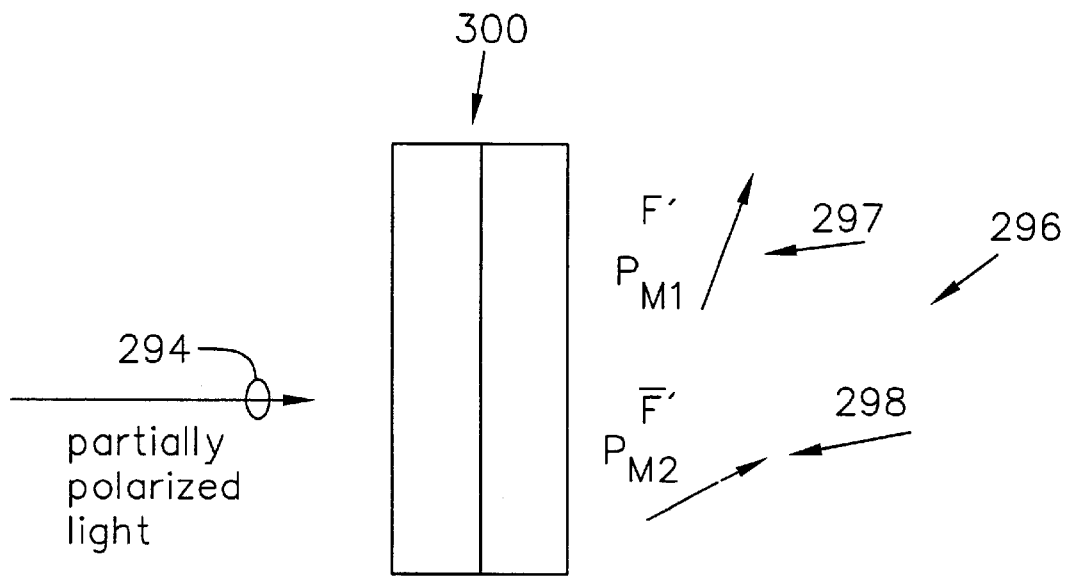
FIGS. 30a and 30b shows two general examples of partially polarized light input to stacks corresponding to the stack of FIG. 29.
Figure 30B:
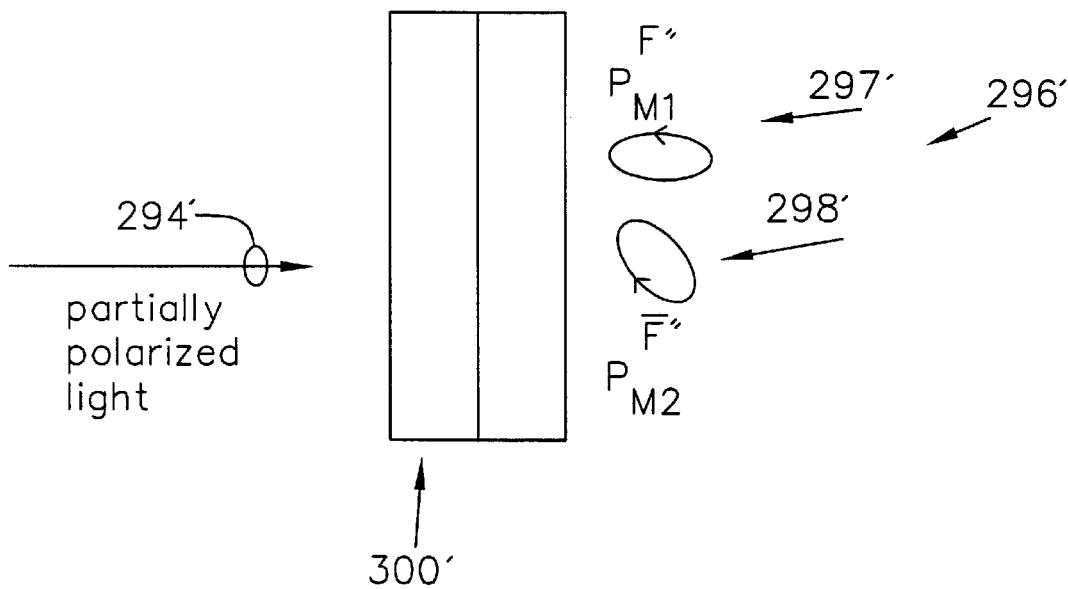

FIG. 30a and 30b show two general examples of partially polarized light 294 and 294' input to stacks 300 and 300' corresponding stack 290 of FIG. 29. Here, second polarization transformed light 296 includes first spectrum F' having polarization PM$_1$' and second spectrum $\overline{F}$' having polarization $P_{M2}$ wherein $P_{M1}$ and $P_{M2}$ are linear polarizations and are not necessarily perpendicular. Second polarization transformed light 296' includes first spectrum F" having polarization $P_{M1}$ and second spectrum $\overline{F}'''$ having polarization $P_{M2}$ where first polarization $P_{M1}$ second polarization $P_{M2}$ are not necessarily orthogonal.

Figure 31A:
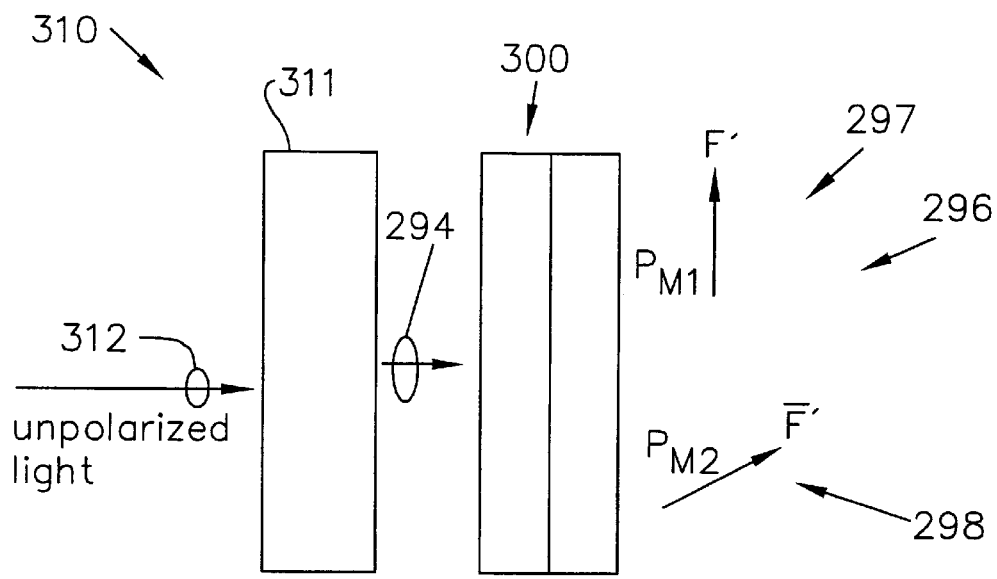
FIGS. 31a and 31b shows stacks with the addition of polarizers.
Figure 31B:
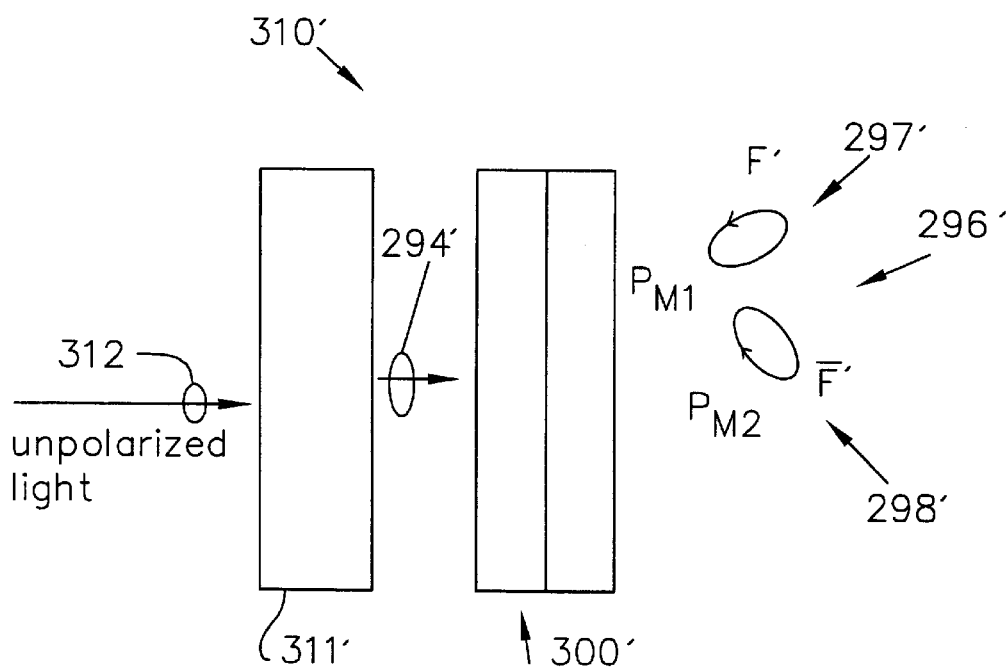

FIGS. 31a and 31b show stacks 300 and 300' with the addition of polarizers 311 and 311', respectively. FIG. 31a corresponds to the situation in which second transformed output light 296 includes a first portion 297 and a second portion 298 which are linearly polarized with first polarization $P_{M1}$ and second polarization $P_{M2}$. FIG. 31b corresponds to the case in which the second transformed output light includes a first portion of light 297 and a second portion of light 298 which are elliptically polarized with polarizations first polarization $P_{M1}$ and second polarization $P_{M2}$, respectively. In both cases, unpolarized light 312 is polarized at least partially by polarizers 311, and 311' to yield partially polarized light 294 and 294' corresponding to FIGS. 30a and 30b. Polarizers 311 and 311' can be the same as polarizer 40 in FIGS. 4a and 4b again, polarizers 311 and 311' can include absorptive type polarizers such as dichroics, or dye-based polarizers or non-absorptive including cholesteric LC's, cholesteric polymer LC's, retarder-based polarizers and splitters. Polarizers 311 and 311' can also include non-absorptive type polarizers such as polarizing dielectric films including those used in polarizing beamsplitters, calcite, quartz, scattering polarizers, prismatic polarizer, stacked cholesteric with lambda/4 plates, or other cholesteric type polarizers.

Figure 32A:
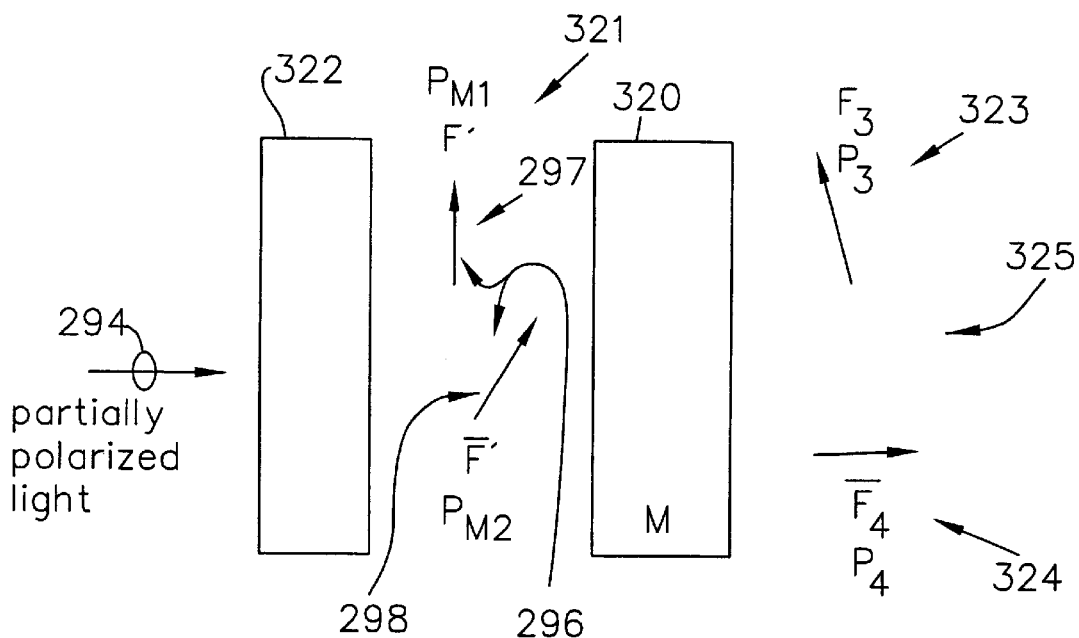
FIGS. 32a and 32b shows a device for manipulating partially polarized light and outputting resulting modulator output light.
Figure 32B:
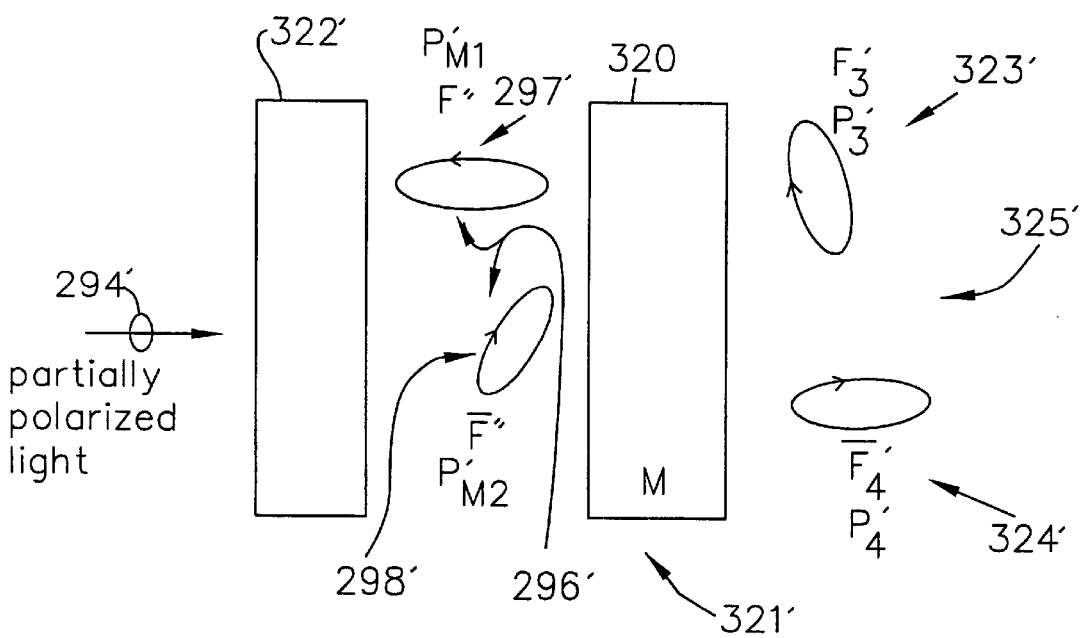

FIGS. 32a and 32b show a device 321 for manipulating partially polarized light 294 and 294' and outputting resulting modulator output light 325 and 325', respectively. Referring to FIG. 32a, manipulating device 321 includes retarder 322 and modulator 320. Retarder 322 is similar to above discussed retarder 291 and has an orientation $\alpha_1$ with respect to partially polarized light 294 has retardance $\Gamma_1$. Partially polarized light 294 passes through retarder 322 and is transformed to transformed light 296 having a first portion 297 with first polarization $P_{M1}$ and a first spectrum F' as well as a second portion 298 having a second polarization $Pm_2$ and a second spectrum $\overline{F}'$. Transformed light 296 is then input to modulator 320 which modulates first portion 297 in a different way than it modulates second portion 298. In a special case, second polarization $P_{M2}$ can be selected to correspond to a state in which modulator 320 appears isotropic to second portion 298 regardless of the voltage driving modulator 320. In that case, which corresponds to the above discussion, second polarization $P_{M2}$ remains unchanged or unaffected as transformed light 296 passes through modulator 320, regardless of the state of modulator 320 (e.g., regardless of the driving voltage applied to modulator 320). Here, if second portion 298 is in such an isotropic state, then first portion 297 must not be in such an isotropic state (e.g., it must be modulated by an applied driving voltage).

In an alternative embodiment, first portion 297 with first polarization $P_{M1}$ should be modulated by modulator 320 in a manner different from second portion 298 with polarization $P_{M2}$. As can be seen in the figure, first portion 297 with polarization $P_{M1}$ is received and modulated by modulator 320 to yield a first portion 323 of modulator output light 325 having a third spectrum $F_3$ and a third polarization $P_3$. Also, second portion 298 having second polarization $P_{M2}$ and $P_{M2}$ second spectrum $\overline{F}'$ is received by modulator 320 which outputs second portion 324 of modulator output light 325 having a fourth spectrum $\overline{F}_4$ and a fourth polarization $P_4$. Generally speaking, the manner in which first portion 297 is affected by modulator 320 is not the same as the manner in which second portion 298 is affected by modulator 320 for all voltages (there may be certain voltages in which both are affected in the same manner).

FIG. 32b corresponds to FIG. 32a but with elliptically polarized light instead of linearly polarized light input to modulator 320. In particular, transformed light 296' includes first portion 297' with a first polarization $P_{M1}'$ and a first spectrum F'', and a second portion 298' with a second polarization $P_{M2}'$ and a second spectrum $\overline{F}'$. First portion 297' of transformed light 296' is received by modulator 320 and transformed to a third portion 323' of modulator output light 325' having a third polarization $P_3'$ and a third spectrum $F_3'$. Second portion 298' of transformed light 296' is transformed by modulator 320 to yield a second portion 324' of modulator output light 325' having a fourth polarization $P_4'$ and a fourth spectrum $\overline{F}_4'$. In a special case, polarization $P_{M2}'$ is in an isotropic state of modulator 320 such that second portion 298' of transformed light 296' is not affected or not modulated by modulator 320. In that case, first portion 297' of transformed light 296' is modulated by modulator 320 regardless of any driving voltage applied to modulator 320.

Modulator 320 can be an electro-optic modulator, a magneto-optic modulator or any other optical unit that can modulate light. Hence, modulator 320 can include a liquid crystal such as a nematic liquid crystal, surface mode device, a twisted nematic, a super twist nematic, an electrically controlled birefringent, optically controlled birefringent, a hybrid field effect, and hybrid aligned nematic device. Alternatively, modulator 320 can include a pi-cell, a zero twist mode cell, guest-host dye liquid crystal device. Also, modulator 320 can include a smectic liquid crystal, a chiral smectic material, and can include FmC*, a surface stabilized FLC, a volume stabilized FLC, a FmA*-electroclinic, a distorted helix ferroelectric, an anti-ferroelectric, a flexoelectric, and an achiral ferroelectric liquid crystal. Retarder 322 can be made of any of the materials used for the retarders in the above discussed stacks.

Figure 33A:
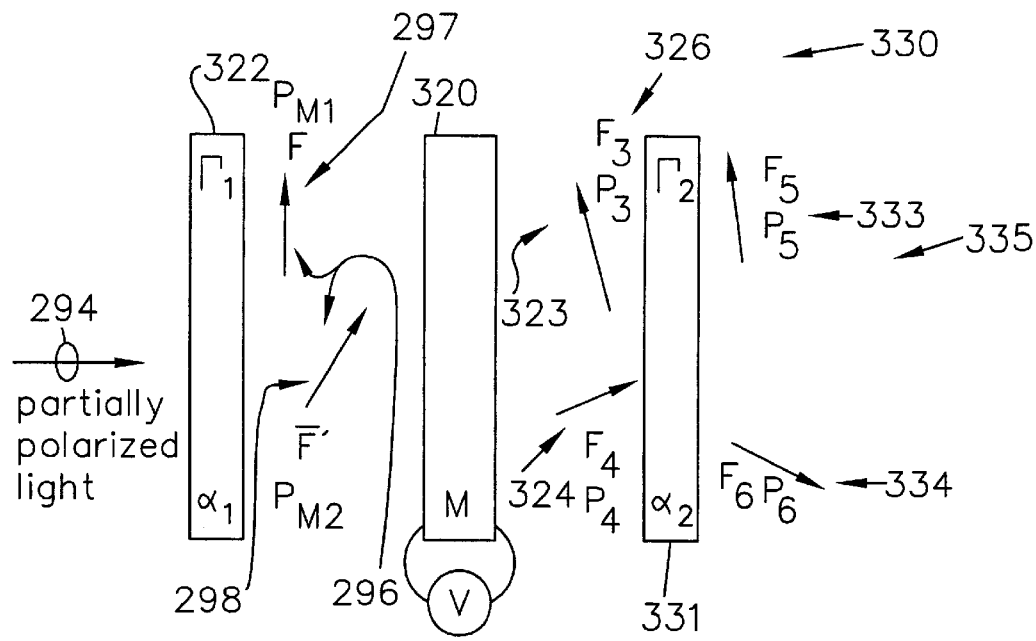
FIG. 33a shows a device for manipulating at least partially polarized light and FIG. 33b corresponds to FIG. 33a for the case in which partially polarized light is elliptically polarized.

FIG. 33a shows a device 330 for manipulating at least partially polarized light 294. In particular, device 330 includes retarder 322 and modulator 320 for FIGS. 32a and 32b. Device 330 further includes a retarder 331, wherein retarder 322 is on one side of modulator 320 and retarder 331 on the opposite side of modulator 320. Referring to FIG. 33a, partially polarized light 294 transmits through retarder 322 and modulator 320 which outputs intermediate light 326 including first portion 323 and a second portion 324. First portion 323 of intermediate light 326 has a first spectrum of $F_3$ and a third polarization $P_3$, and a second portion 324 of intermediate light 326 as a fourth spectrum $F_4$ and a fourth polarization $P_4$ as discussed above with reference to FIG. 32a. First portion 323 of intermediate light 326 transmits through second retarder 331 which transforms first portion 323 of intermediate light 326 into 333 of output light 335. First portion 333 of output light 335 has a fifth spectrum $F_5$ and a sixth polarization $P_5$. Also, second portion 324 of intermediate light 326 passes through second retarder 331 which transforms it into second portion 334 of output light 335 having a sixth spectrum $F_6$ and a sixth polarization $P_6$. First retarder 322 has a first orientation $\alpha_1$ and a first retardant $\Gamma_1$ and a second retarder 331 has a second orientation $\alpha_2$ and a second retardant $\Gamma_2$, wherein first retardant $\alpha_1$ and a second retardant $\alpha_2$ are measured with respect to a polarization direction of partially polarized light 294. As before, the manner in which modulator 320 modulates first portion 297 should not be the same as the manner in which modulator 320 modulates second portion 298.

In one particular embodiment, first orientation $\alpha_1$ and first retardant $\Gamma_1$ can be selected such that first portion 297 of transformed light 296 is modulated by modulator 320 and second portion 298 of transformed light 296 is not modulated by modulator 320, i.e., modulator 320 appears isotropic to second portion 298. In this case, second portion 324 of intermediate light 325 is not changed or modulated or affected by modulator 320. Hence, F' is approximately the same as $F_4$ and $P_{M2}$ is approximately the same as $P_4$.

In another particular embodiment, secondary orientation $\alpha_2$ and second retardance $\Gamma_2$ can be selected such that fifth polarization $P_5$ is perpendicular to sixth polarization $P_6$ and fifth spectrum $F_5$ is complementary to sixth spectrum $F_6$. In such a situation, an analyzer could be used to electively filter out either first portion 333 or second portion 334 of output light 335, to yield fifth spectrum $F_5$ or sixth spectrum $F_6$, respectively.

In another embodiment, first orientation $\alpha_1$ and first retardance $\Gamma_1$ can be selected such that modulator 320 has at least one state in which first portion 297 is modulated and second portion 298 is not modulated.

In another embodiment, first orientation $\alpha_1$ can be at an angle $\alpha$ and second orientation $\alpha_2$ can be at an orientation of $90\pm\alpha$.

In yet another embodiment, second spectrum $\overline{F}'$ of second portion 298 transmits to second portion 324 in which fourth spectrum $F_4$ is essentially the same as second spectrum $\overline{F}'$ and fourth polarization $P_4$ is essentially the same as second polarization $P_{M2}$ for all driving voltages while first portion 297 of transformed light 296 is continuously varied in accordance with the driving voltage of modulator 320 so as to yield a continuously varied first portion 323 of intermediate light 325. A special case of this would be that second orientation $\alpha_2$ and second retardance $\Gamma_2$ would be selected such that first portion 333 of output light 335 would vary from 0 to fifth spectrum $F_5$ and fifth polarization $P_5$ in a continuous manner as the driving voltage across modulator 320 is continuously varied.

Figure 33B:
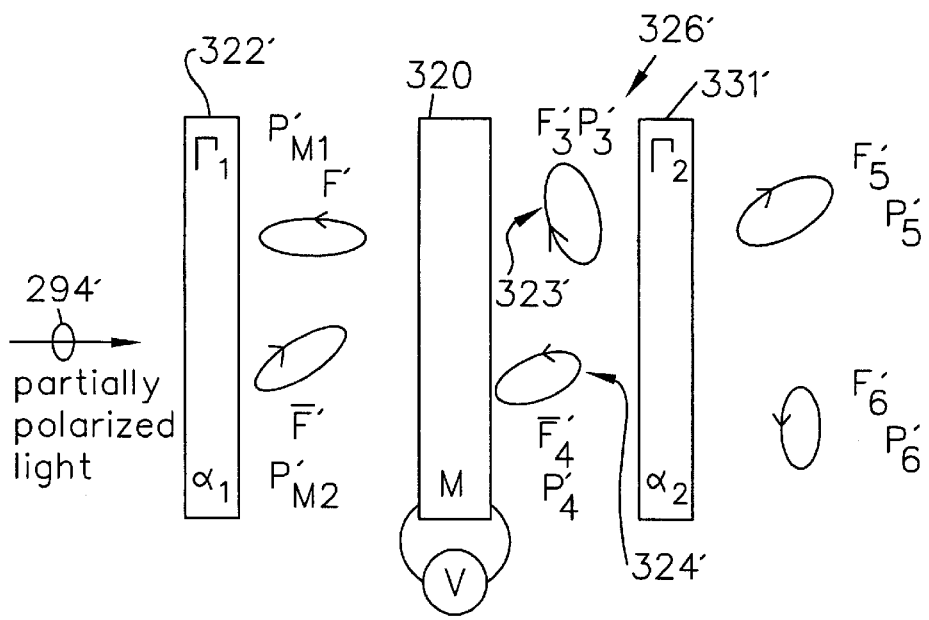

FIG. 33b corresponds to FIG. 33a for the case in which partially polarized light 294' is elliptically polarized.

Figure 34:
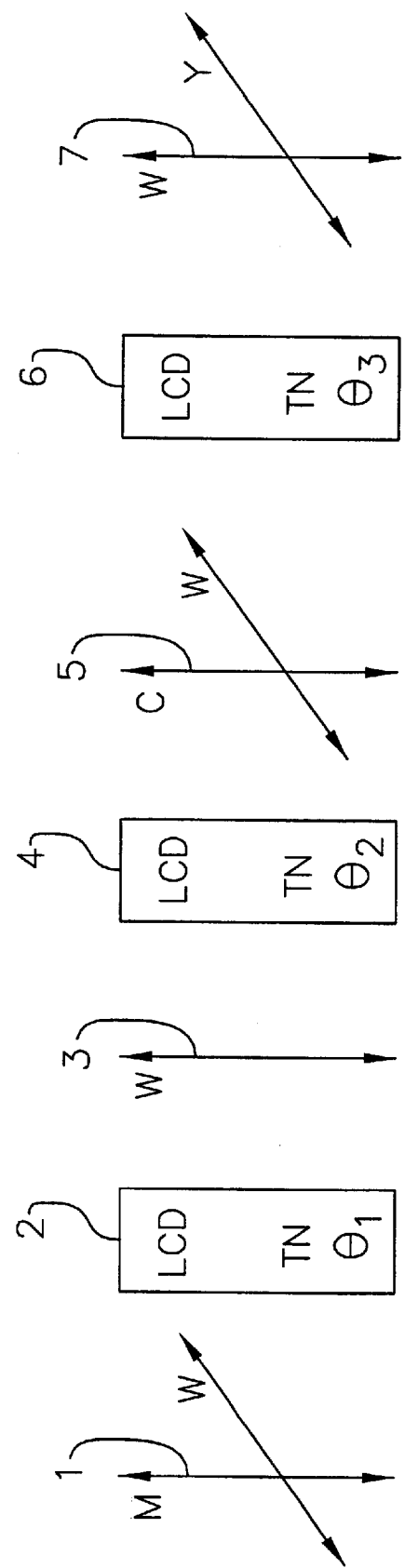
FIG. 34 is a subtractive color filter of the prior art.

FIG. 34 is a substructive color filter of the prior art.

Figure 35A:
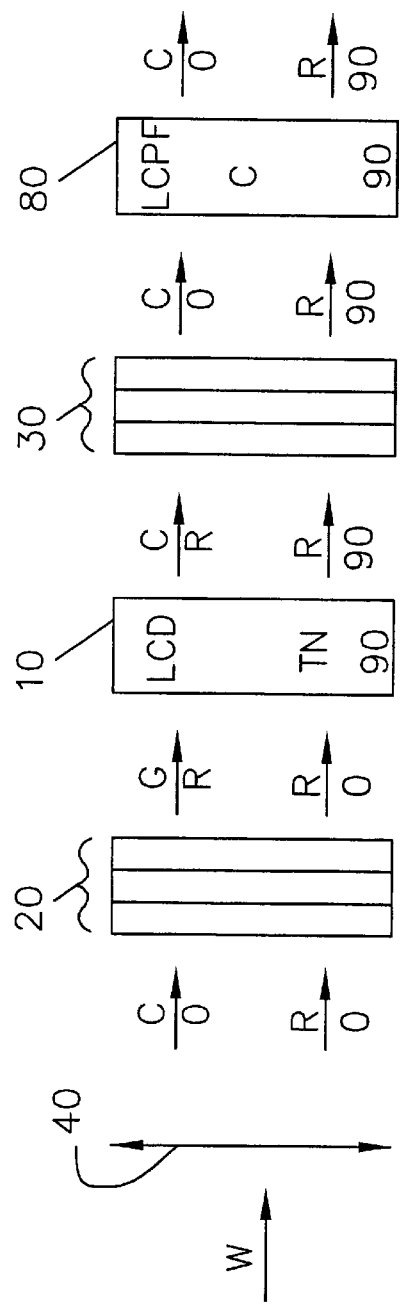
FIGS. 35a and 35b, is a filter having a twisted nematic electro-optic modulator.
Figure 35B:
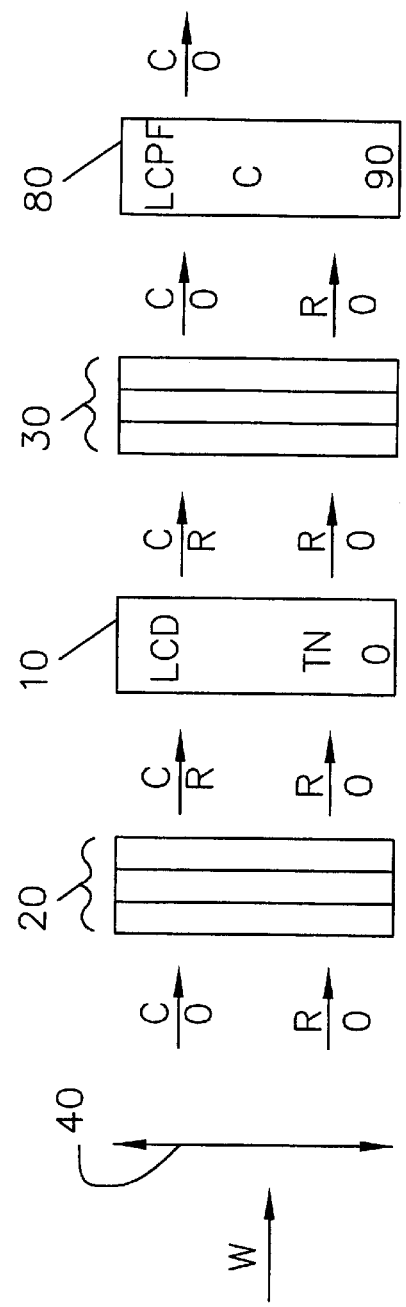

FIG. 35, comprising FIGS. 35a and 35b, is a filter having a twisted nematic electro-optic modulator.

Figure 36:
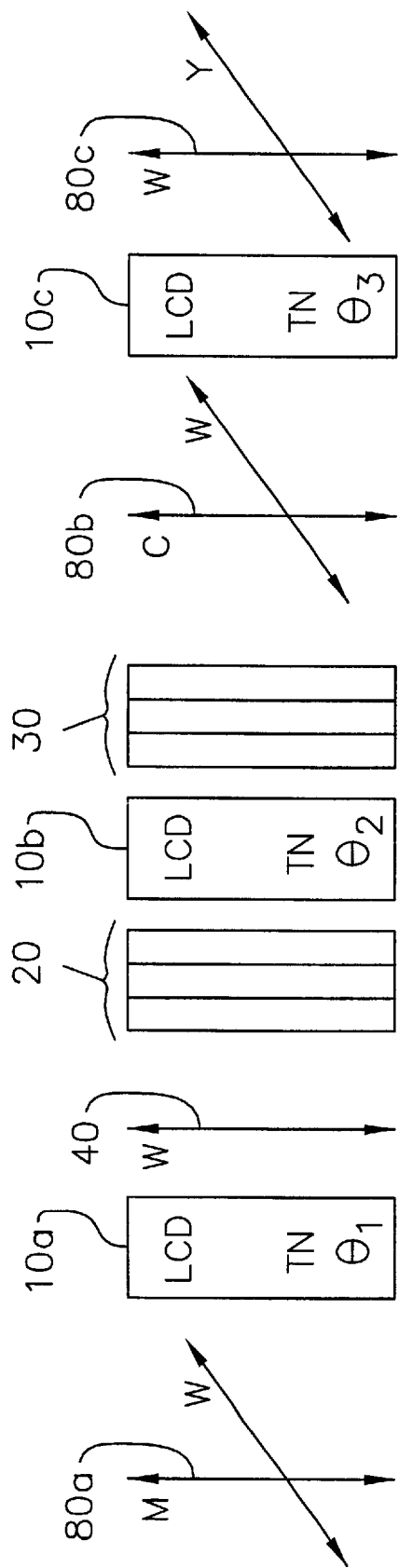
FIG. 36 is a three stage filter using the filter of FIG. 35.

FIG. 36 is a three stage filter using the filter of FIG. 35.

In a preferred embodiment, modulator 320 is switchable between a first and a second switching state wherein the first switching state corresponds to a modulation state of polarization and the second switching state corresponds to an isotropic state of polarization. In this case, first orientation $\alpha_1$ and retardance $\Gamma_1$ for retarder 322 are selected such that first spectrum F of first portion 297 of transformed light 296 has first polarization $P_{M1}$ corresponding to the modulation state of polarization of modulator 320. Also, first orientation $\alpha_1$ and first retardance $\Gamma_1$ are selected such that second spectrum $\overline{F}'$ is equal to the complementary spectrum $\overline{F}$ of first spectrum F and second polarization $P_{M2}$ corresponds to the isotropic state of polarization of modulator 320. Furthermore, second orientation $\alpha_2$ and second retardant $\Gamma_2$ are selected in a manner such that when modulator 320 is in the first switching state, fifth spectrum $F_5$ is approximately equal to first spectrum F, sixth spectrum $F_6$ is approximately equal to the complementary spectrum $\overline{F}$ and the fifth polarization $P_5$ is orthogonal to the sixth polarization P6. That is, the polarization of first portion 333 is perpendicular to the polarization of second portion 334 of output light 335.

For angles between 0 and 90°, the filter provides analog control of intensity for each color. The first stage modulates green with $T_G=\sin^2\theta_1$. The following two stages do not affect the green transmission because both the cyan and the yellow LCPF transmit green at all polarizations. The second stage modulates red with $T_R=\sin^2\theta_2$, and the red light is unaffected by the third stage. The problem arises with the blue modulation. Only third stage polarizer 7 polarizes blue light, but both LCDs 4 and 6 affect the orientation of the blue light. Therefore, $TB=\sin^2(\theta_2+\theta_3)$, and it is not controlled independently of $T_R$.

This problem can be solved with the color selective polarization modulator of this invention. FIG. 35 illustrates the polarization modulator, comprising stack 20 and modulator 10, for the case where the modulation and isotropic states of the electro-optic modulator are linear and circular polarizations, respectively. Twisted nematic liquid crystal cells fall in this class. Retarder stack 20 transforms cyan light into circularly polarized light, in this example right-handed, and leaves red light linearly polarized. When TN 10 is in the 0 state (FIG. 35a), the red light is rotated to 90° and the circularly polarized cyan light remains circular. In the 1 state (FIG. 35b), the red light remains at zero and the cyan light remains circular. Electro-optic modulator 10 can rotate the red light in an analog fashion between 0 and 90°, but the cyan light always remains circular. The polarization modulated light can be analyzed with a polarization analyzer utilizing second retarder stack 30 in combination with cyan LCPF 80. The retarder stack transforms the circular light back to linear and leaves the linear light linear. Color polarizer 80 transmits the cyan light in all switching states and transmits a variable intensity of red light.

A key feature of the polarization modulator of FIG. 35 is that it selectively modules red light but, unlike the second stage (elements 3, 4 and 5) of the Plummer device, it does not modulate blue light. The advantage of this is illustrated in FIG. 36. The first stage uses magenta LCPF 80a, LCD 10a and neutral polarizer 40 to modulate green light. Second stage elements 20, 10b and 30 modulate the polarization of red light without modulating the polarization of blue light. Since no elements beyond the first stage polarize green light, it does not matter whether green light falls in the modulation state, the isotropic state, or both, of electro-optic modulator 10b. The blue light, which is unaffected by the second state, is intensity modulated by LCD 10c in combination with yellow LCPF 80c. In this three stage filter, each primary color is independently intensity modulated.

Polarizer stack 20 circularly polarizes spectrum $\overline{F}$ and linearly polarizes spectrum F. The simplest stack is a single quarter-wave retarder oriented at 45°, with a design wavelength somewhere in spectrum $\overline{F}$. Better polarization control can be achieved with a stack which provides quarter-wave retardance spectrum F but provides quarter-wave retardance throughout spectrum F but provides full or halfwave retardance in spectrum F. Such a stack can be called a narrow and achromatic compound quarter-wave retarder. Compound achromatic retarders are described in U.S. patent application Ser. No. 08/491,593, which is incorporated by reference herein in its entirety. An embodiment of an achromatic retarder stack has three retarders of equal retardance, at angles $\pi/12$, $5\pi/12$ and $\pi/12$. The angles can be varied and the retardance of the three retarders selected to tailor the wavelength, bandwidth and transition edge of the quarter-wave retarding spectral region. Retarders at 14°, 85° and 14° are an example of a suitable stack.

The filter of FIG. 36 is but one embodiment of a filter using a TN in the polarization modulator. It uses retarder stacks in only one stage. Other filters can be designed. For example, the neutral polarizer can follow rather than precede the color selective polarization modulator. The order in which the colors are filtered can be different, although having the first stage modulate green reduces the transition edge sharpness required of the retarder stack. The stage with the color selective polarization modulator can be combined with other color shutter systems known in the art, not limited to shutter using LCPS.

The filters of this invention can be used in combination with any other active or passive filter. Hybrid filters can also be made with active or passive filter. Hybrid filters can also be made with active and passive filters. For example, instead of a neutral polarizer the filter can employ a color polarizer, such as a dye type color polarizer or a polarizer retarder stack (PRS) color polarizer. In this case the "white" state contains only the wavelengths passed by the color polarizer. The white/primary filter can also be combined with a polarization interference filter.

Figure 37:
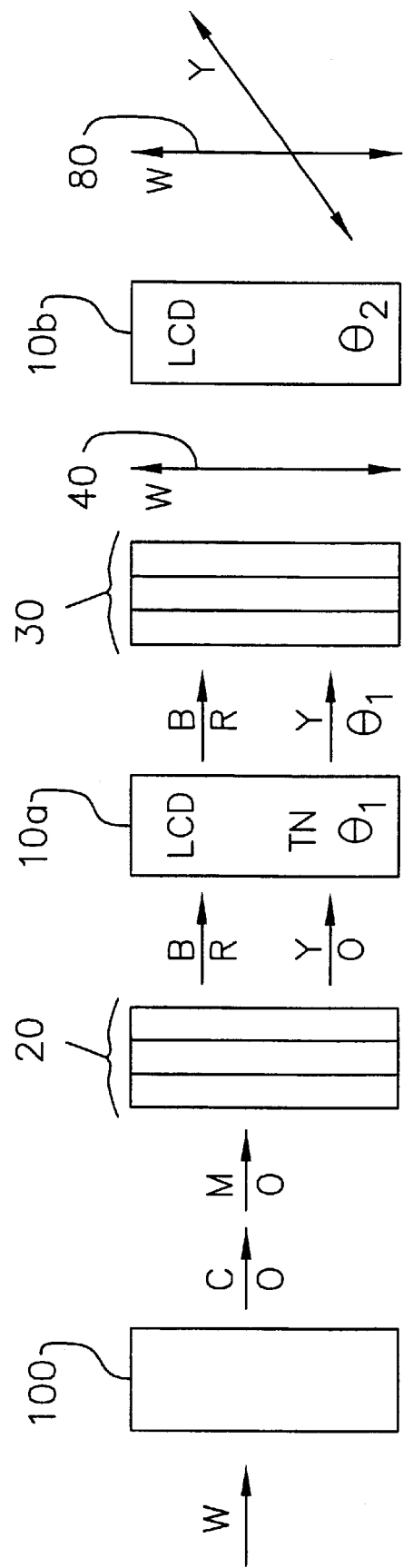
FIG. 37 shows an in-line filter using a first stage to temporally multiplex two primary colors with a second stage dedicated to the third primary color.
Figure 38:
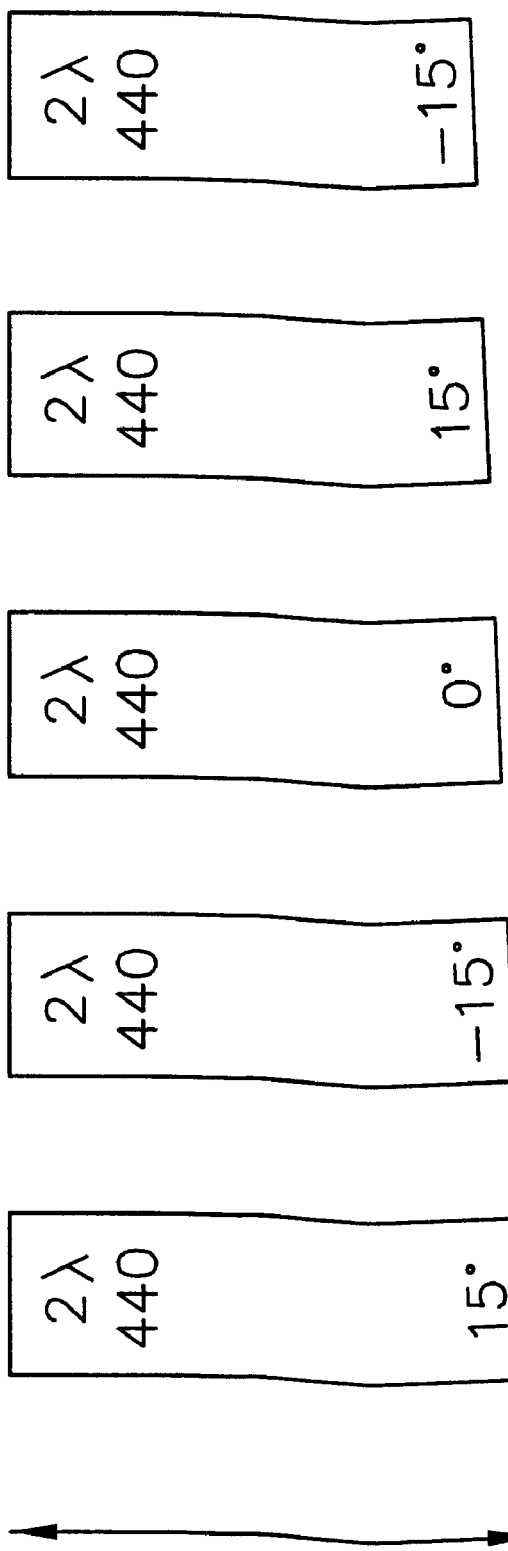
FIG. 38 shows an example of a passive prefiltering device where the boxes indicate retarders oriented at the angles shown in the bottom part of the box.
Figure 39:
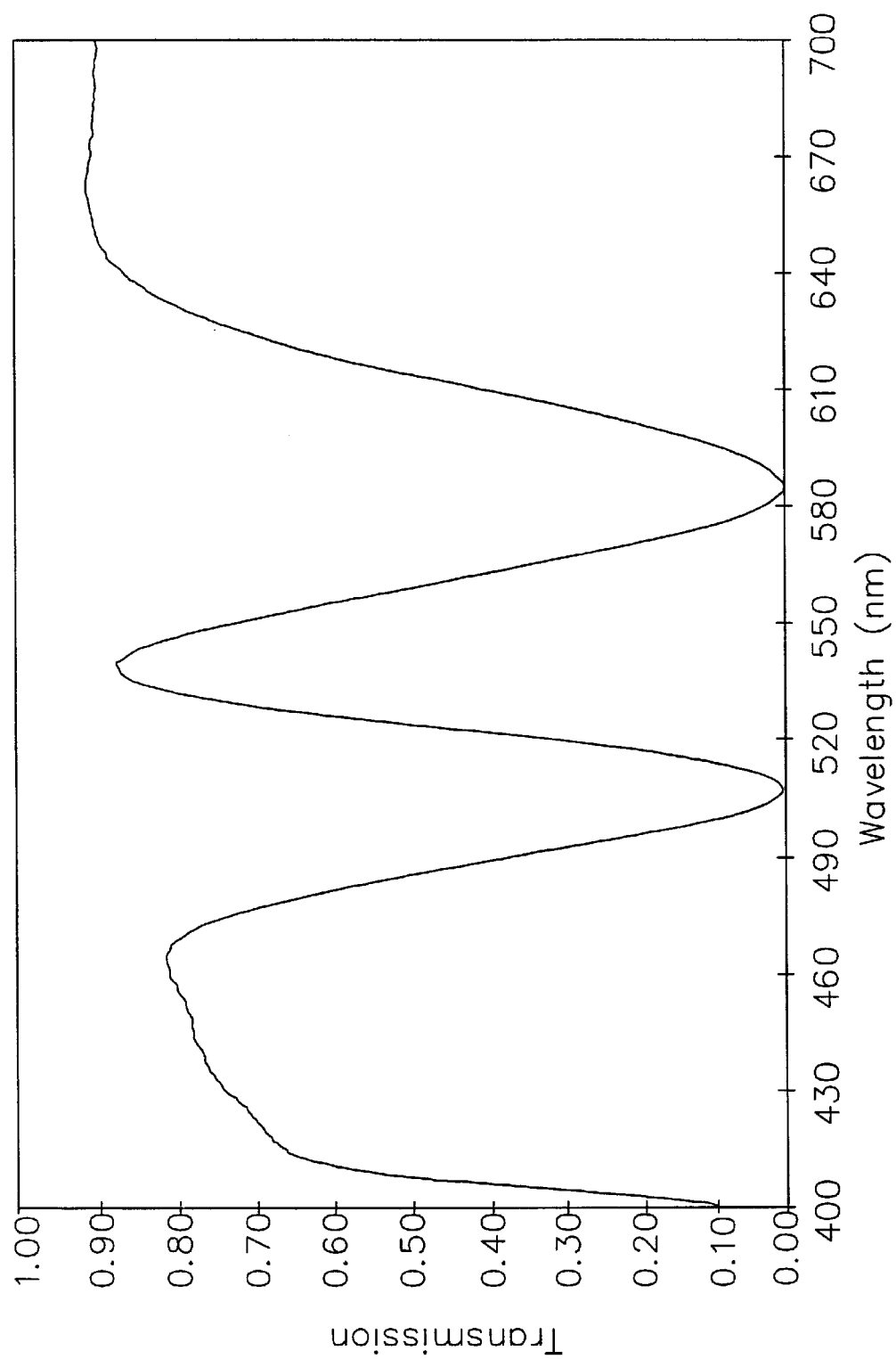
FIG. 39 shows the transmission for visible light incident upon this filter.

Another in-line filter of this invention uses a first stage to temporally multiplex two primary colors with a second stage dedicated to the third primary, as shown in FIG. 37. This is a hybrid between filters which temporally multiplex all three primaries and the subtractive filters of this invention having one stage for each primary. Color shutter 100 alternates between transmitting two subtractive primaries, in this example cyan and magenta. The additive primary which is common to these, blue, is modulated by the second stage and the other additive primaries, red and green, are alternately modulated by the first stage. The color shutter can be any shutter which switches between transmitting two subtractive primaries. It can contain a liquid crystal cell. Even if LCDs 10a and 10b are pixelated, the color shutter need not be.

To pass blue light unaltered through the first stage, it is converted to circular light by retarder stack 20, while red and green (yellow) remain linearly polarized. Electro-optic modulator 10a rotates the red and green light by $\theta_1$, but not blue, and second stack 30 restores the blue to linear polarization at 0°. Second stage modulator 10b rotates the blue light by $\theta_2$ and LCPF 80 transmits a fraction of the blue light which depends on $\theta_2$. Modulator 10b also rotates red and green light, but since LCPF 80 transmits red and green regardless of polarization, it has no effect on the red and green output.

An advantage of the two stage filters of FIG. 37 over filters which temporally multiplex all three colors is a reduction in the operating speed required to prevent perception artifacts. Since one primary is displayed all the time, there is reduced flicker. If green is the primary displayed in each frame there is increased brightness. If it is red, the color balance can be improved. Rather than temporally multiplexing the first stage using color shutter 100, the first stage can be spatially multiplexed by using a pixelated color passive color filter in combination with pixelated LCD 10a. The uniting feature is that the second stage is dedicated to one primary, and that primary is unmodulated by the first stage due to retarder stack 20. The final stage can use any means to modulate the blue light, such as a blue cholesteric, as long as the red and green are not modulated.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

TABLE I

Filter Designs

| Retarders M | Stack 1 | | Stack 2 | |
|---|---|---|---|---|
| 4 | 10, Γ | −20, Γ/2 | −70, Γ2 | 80, Γ |
| 4 | 15, Γ | −45, Γ/2 | −45, Γ/2 | 75, Γ |
| 4 | 80, Γ | 25, Γ/2 | 65, Γ/2 | 10, Γ |
| 4 | 60, Γ | −20, Γ/2 | −70, Γ/2 | 30, Γ |
| 4 | 80, Γ | −25, Γ/2 | −65, Γ/2 | 10, Γ |
| 4 | 34, Γ | 11, Γ | 79, Γ | 56, Γ |
| 4 | 45, Γ | −22, Γ | −68, Γ | 45, Γ |
| 4 | 45, Γ/2 | 15, Γ | 75, Γ | 45, Γ/2 |
| 4 | 20, Γ/2 | −10, Γ | −80, Γ | 70, Γ/2 |

TABLE II

Fan Solc Designs

α, Γ

| Retarders M | Stack 1 | | | Stack 2 | | |
|---|---|---|---|---|---|---|
| 2 | 22, Γ | | | 68, Γ | | |
| "3" | 15, Γ | 45, Γ/2 | | 45, Γ/2 | 75, Γ | |
| 4 | 11, Γ | 34, Γ | | 56, Γ | 79, Γ | |
| "5" | 9, Γ | 27, Γ | 45, Γ/2 | 45, Γ/2 | 63, Γ | 81, Γ |
| 6 | 7, Γ | 22, Γ | 37, Γ | 53, Γ | 68, Γ | 83, Γ |

TABLE III

Quasi-Folded Soc Designs

α, Γ

| Retarders M | Stack 1 | | | Stack 2 | | |
|---|---|---|---|---|---|---|
| 4 | 11, Γ | −11, Γ | | −79, Γ | 79, Γ | |
| 6 | 8, Γ | −8, Γ | 8, Γ | 82, Γ | −82, Γ | 82, Γ |
| 6 | 15, Γ | −15, Γ | 15, Γ | 75, Γ | −75, Γ | 75, Γ |
| 6 | 68, Γ | −68, Γ | 68, Γ | 22, Γ | −22, Γ | 22, Γ |

TABLE IV

Split-Element Design

α, Γ

| Retarders M | Stack 1 | | Stack 2 |
|---|---|---|---|
| 3 | 45, Γ + π/2 | 0, Γ | 45, Γ + π/2 |

TABLE V

Measured Filter Designs

| | α, Γ | | | λ (nm) | |
|---|---|---|---|---|---|
| Color | Stack 1 | LCD | Stack 2 | Stacks | LCD |
| G/W | 15, 2λ 45, 1λ | 0, λ/2 | 45, 1λ, 75, 2λ | 540 | 540 |
| W/C | 12, λ −12, λ 12, λ | 0, λ/2 | −78, λ 78, λ −78, λ | 450 | 650 |
| W/M | 82, 2λ −82, 2λ 82, 2λ | 0, λ/2 | −8, 2λ 8, 2λ −8, 2λ | 435 | 540 |
| W/Y | 80, 2λ −25, λ | 0, λ/2 | 65, λ −10, 2λ | 600 | 430 |

TABLE VI

Specific White/Subtractive-Primary Designs

| | α, Γ | | | λ (nm) | |
|---|---|---|---|---|---|
| Color | Stack 1 | LCD | Stack 2 | Stacks | LCD |
| W/C | 10, λ −12, λ 10, λ | 0, λ/2 | −80, λ 78, λ −80, λ | 450 | 660 |
| W/M | 8, λ −8, λ 8, λ | 0, λ/2 | −82, λ 82, λ −82, λ | 760 | 540 |
| W/Y | 80, 2λ −25, λ | 0, λ/2 | 65, λ −10, 2λ | 590 | 440 |
| M/W | 45, λ + λ/4 0, λ | 90, λ/2 | 45, λ + λ/4 | 540 | 540 |

TABLE VII

Three Stage Filter Output

| Stage | | | Output | |
|---|---|---|---|---|
| W/Y | W/M | W/C | ↕ | ↔ |
| 0 | 0 | 0 | Black | White |
| 0 | 0 | 1 | R | C |
| 0 | 1 | 0 | G | M |
| 1 | 0 | 0 | B | Y |
| 1 | 1 | 0 | C | R |
| 1 | 0 | 1 | M | G |
| 0 | 1 | 1 | Y | B |
| 1 | 1 | 1 | White | Black |

What is claimed is:

1. A display system, comprising:
   input optics that receive and direct at least partially polarized input light;
   an electronically controllable spectral sequencer that sequentially outputs spectra of light, the spectral sequencer including at least:
   a first retarder stack;
   a second retarder stack; and
   an electronically controllable single pixel modulator optically coupled to the first and second retarder stacks;
   only one spatial light modulator optically coupled to the electronically controllable spectral sequencer, wherein the only one spacial light modulator and the electronically controllable spectral sequencer receive the at least partially polarized input light directed by the input optics and output a plurality of modulated patterns of light with sequentially varying spectra; and
   projection optics that receive and project the plurality of modulated patterns of light onto a display surface.

2. The display system of claim 1, wherein the spectral sequencer controls the light projected onto the display surface such that the plurality of modulated patterns includes a separate modulated pattern for each of the spectra of the input light, and
   the control of the single pixel modulator is coordinated with sequential modulation of the spatial light modulator to create the separate modulated patterns.

3. The display system of claim 1, wherein the light comprises visible light.

4. The display system of claim 3, wherein the spectra are the additive primary colors.

5. The display system of claim 1, wherein the light comprises infrared light.

6. The display system of claim 1, wherein the light comprises ultraviolet light.

7. The display system of claim 1, wherein the spatial light modulator is a transmissive spatial light modulator.

8. The display system of claim 1, wherein the spatial light modulator is a reflective spatial light modulator.

9. The display system of claim 1, wherein the spatial light modulator is located optically between the input optics and the spectral sequencer.

10. The display system of claim 1, wherein the spatial light modulator is located optically between the spectral sequencer and the projection optics.

11. The display system of claim 1, wherein the spatial light modulator is located optically between a first electronically controllable single pixel modulator and a second electronically controllable single pixel modulator.

12. The display system of claim 2, wherein,
   the first retarder stack receives the input light from the input optics and provides a first transformation of the input light into transformed light having a spectrum and polarization that is different than the spectrum and polarization of the input light, and;
   the second retarder stack receives at least a portion of the transformed light and provides a second transformation that transforms the transformed light into output light with a spectrum and polarization which is substantially the same as the spectrum and polarization of the input light.

13. The display system of claim 12, wherein the plurality of spectra are the additive primary colors.

14. A display system comprising:
   input optics that receive and direct at least partially polarized input light;
   an electronically controllable spectral sequencer that sequentially outputs spectra of light, the spectral sequencer including at least:
   a retarder stack; and
   an electronically controllable single pixel modulator optically coupled to the retarder stack;
   only one spatial light modulator optically coupled to the electronically controllable spectral sequencer, wherein the only one spacial light modulator and the electronically controllable spectral sequencer receive the at least partially polarized input light directed by the input optics and output a plurality of modulated patterns of light with sequentially varying spectra; and
   projection optics that receive and project the plurality of modulated patterns of light onto a display surface.

15. The display system of claim 14, wherein the spectral sequencer controls the light projected onto the display surface such that the plurality of modulated patterns includes a separate modulated pattern for each of the spectra of the input light, and
   the control of the single pixel modulator is coordinated with sequential modulation of the spatial light modulator to create the separate modulated patterns.

16. The display system of claim 14, wherein the spectra are the additive primary colors.

17. A display system having only one spatial light modulator, the system comprising:
   a radiation source;
   input optics that direct at least partially polarized input electromagnetic radiation received from the radiation source to the spatial light modulator;
   projection optics that receive a plurality of modulated patterns of electromagnetic radiation created by the spatial light modulator and project the plurality of modulated patterns onto a display surface;
   an electronically controllable spectral sequencer that receives the input electromagnetic radiation and that sequentially outputs spectra of the received input electromagnetic radiation, the spectral sequencer having a plurality of sequencing units, each of the plurality of sequencing units comprising:
   a first retarder stack that receives the input electromagnetic radiation from the input optics and provides a first transformation of the input electromagnetic radiation into transformed electromagnetic radiation;
   a second retarder stack that receives at least a portion of the transformed electromagnetic radiation and provides a second transformation that transforms the transformed electromagnetic radiation into output electromagnetic radiation, wherein the first and second transformations polarize the output electromagnetic radiation into at least a first polarization state having a first spectrum and a second polarization state having a second spectrum; and an electronically controllable single pixel modulator optically coupled to the first and second retarder stacks, wherein the spectral sequencer controls the electromagnetic radiation projected onto the display surface such that the plurality of modulated patterns includes a separate modulated pattern for each of the spectra of the input electromagnetic radiation, and the control of each of the single pixel modulators is coordinated with sequential modulation of the spatial light modulator to create the separate modulated patterns.

18. The display system of claim 17, wherein the single pixel modulators modify the polarization of the transformed electromagnetic radiation in a known fashion, and the output electromagnetic radiation has a spectrum and polarization which is approximately the same as a spectrum and polarization of the input electromagnetic radiation.

19. A method of displaying an image, comprising:

directing at least partially polarized input light to only one spatial light modulator;

creating a plurality of modulated patterns of light by sequentially modulating the spatial light modulator and projecting the plurality of modulated patterns onto a display surface;

sequentially outputting spectra of light with an electronically controllable spectral sequencer optically coupled to the spatial light modulator, the spectral sequencer including at least:

a first retarder stack; and an electronically controllable single pixel modulator optically coupled to the first retarder stack.

20. The method of claim 19, wherein the spectral sequencer controls the light projected onto the display surface such that the plurality of modulated patterns includes a separate modulated pattern for each of the spectra of light, and the control of the single pixel modulator is coordinated with sequential modulation of the spatial light modulator to create the separate modulated patterns.

* * * * *